United States Patent
Huth et al.

(10) Patent No.: US 11,487,969 B2
(45) Date of Patent: Nov. 1, 2022

(54) APPARATUSES, COMPUTER PROGRAM PRODUCTS, AND COMPUTER-IMPLEMENTED METHODS FOR PRIVACY-PRESERVING FEDERATED LEARNING

(71) Applicant: XAIN AG, Berlin (DE)

(72) Inventors: Michael Reiner August Huth, London (GB); Leif-Nissen Lundbæk, Berlin (DE)

(73) Assignee: Xayn AG, Berlin (DE)

( * ) Notice: Subject to any disclaimer, the term of this patent is extended or adjusted under 35 U.S.C. 154(b) by 430 days.

(21) Appl. No.: 16/792,981

(22) Filed: Feb. 18, 2020

(65) Prior Publication Data

US 2021/0256309 A1    Aug. 19, 2021

(51) Int. Cl.
*G06K 9/62*    (2022.01)
*G06F 21/62*    (2013.01)

(52) U.S. Cl.
CPC ....... *G06K 9/6257* (2013.01); *G06F 21/6227* (2013.01); *G06K 9/626* (2013.01)

(58) Field of Classification Search
CPC ....... H04L 67/1029; H04L 47/10; G04S 5/02; H04W 4/02
See application file for complete search history.

(56) References Cited

U.S. PATENT DOCUMENTS

| | | | | |
|---|---|---|---|---|
| 6,259,705 B1 * | 7/2001 | Takahashi | ........... | H04L 67/1029 370/230 |
| 7,058,869 B2 * | 6/2006 | Abdel-Hafez | ........... | G01R 31/318572 714/729 |
| 7,136,062 B1 * | 11/2006 | Butler | ........... | H04L 65/403 345/422 |
| 7,167,182 B2 * | 1/2007 | Butler | ........... | H04L 63/0823 709/215 |

(Continued)

OTHER PUBLICATIONS

Bonawitz, Keith et al., *Practical Secure Aggregation for Privacy-Preserving Machine Learning*, Proceedings of the 2017 ACM SIGSAC Conference on Computer and Communications Security, CCS 2017, Oct. 30, 2017-Nov. 3, 2017, (2017) pp. 1175-1191.

(Continued)

*Primary Examiner* — Yosef Kassa
(74) *Attorney, Agent, or Firm* — Alston & Bird LLP

(57) ABSTRACT

Privacy-preserving federated learning apparatuses, systems, computer program products, and methods are provided that generate an updated global model based on a set of client models while maintaining privacy regarding the data values embodying each client model and the updated global model. In this regard, masked client models are utilized, which cryptographically obfuscate data values embodying the client model while still enabling combination, or "aggregation," of the masked client models to generate a masked updated global model. The masked updated global model similarly includes obfuscated data values embodying the (Continued)

updated global model, but may be unmasked to reveal the true values of the updated global model for use. Some embodiments utilize specific steps for communication between environments, systems, devices, and/or the like, to ensure the masked models can only be unmasked by intended entities.

20 Claims, 28 Drawing Sheets

(56) References Cited

U.S. PATENT DOCUMENTS

| | | | | |
|---|---|---|---|---|
| 7,898,977 B2 * | 3/2011 | Roese | ............... | H04L 67/51 |
| | | | | 370/254 |
| 8,886,794 B2 * | 11/2014 | Adnani | ............ | H04W 24/08 |
| | | | | 709/224 |

OTHER PUBLICATIONS

Chen, Yudong et al., *Distributed Statistical Machine Learning in Adversarial Settings: Byzantine Gradient Descent*, Proc. ACM Meas. Anal. Comput. Syst., vol. 1, No. 2, Article 44 (Dec. 2017), pp. 44:1-44:25.

McMahan, H. Brendan et al., *Federated Learning of Deep Networks using Model Averaging*, [online] [retrieved Apr. 27, 2020]. Retrieved from http://arxiv.org/pdf/1602.05629v1.pdf. (dated Feb. 17, 2016), 11 pages.

* cited by examiner

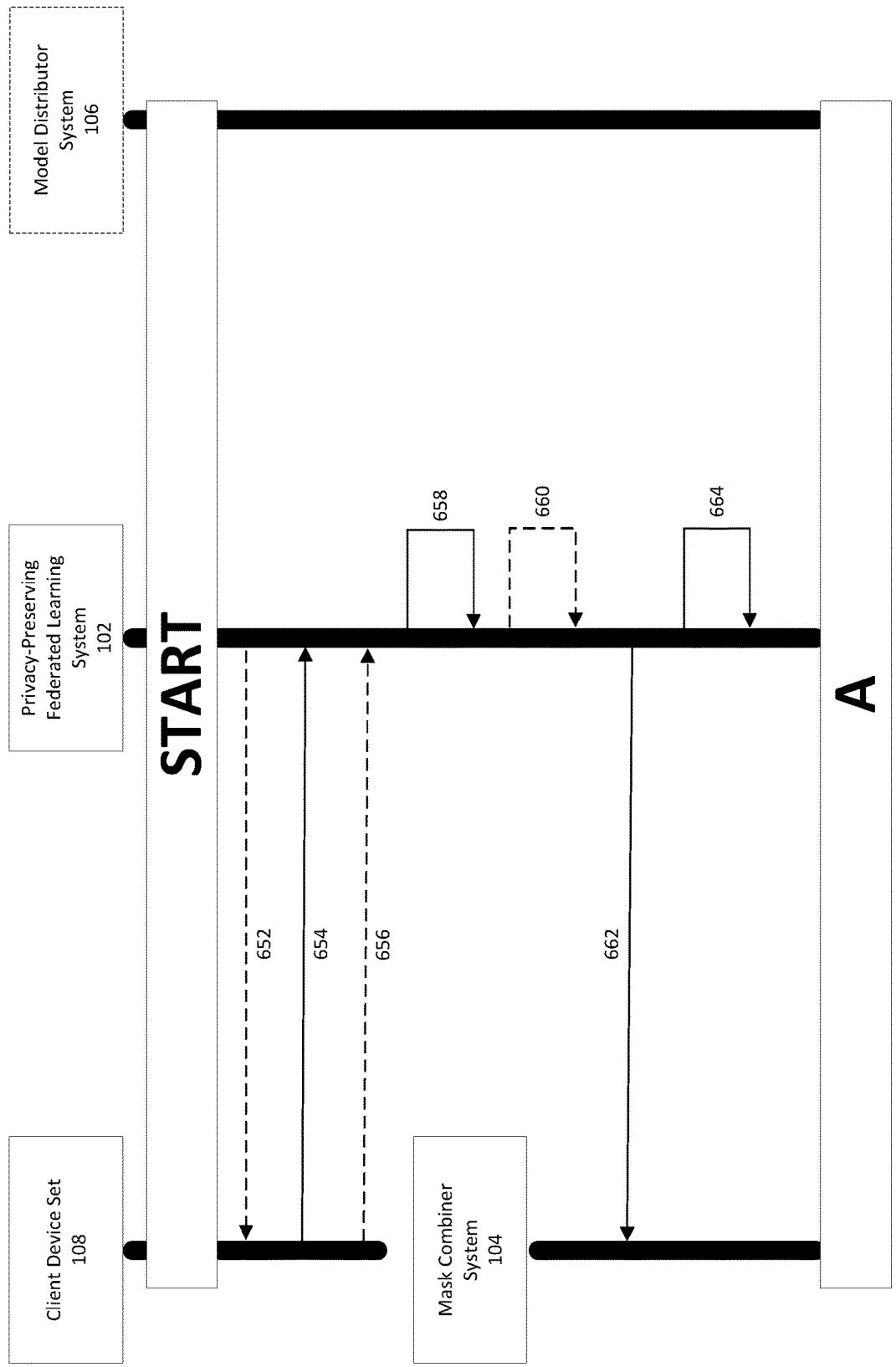

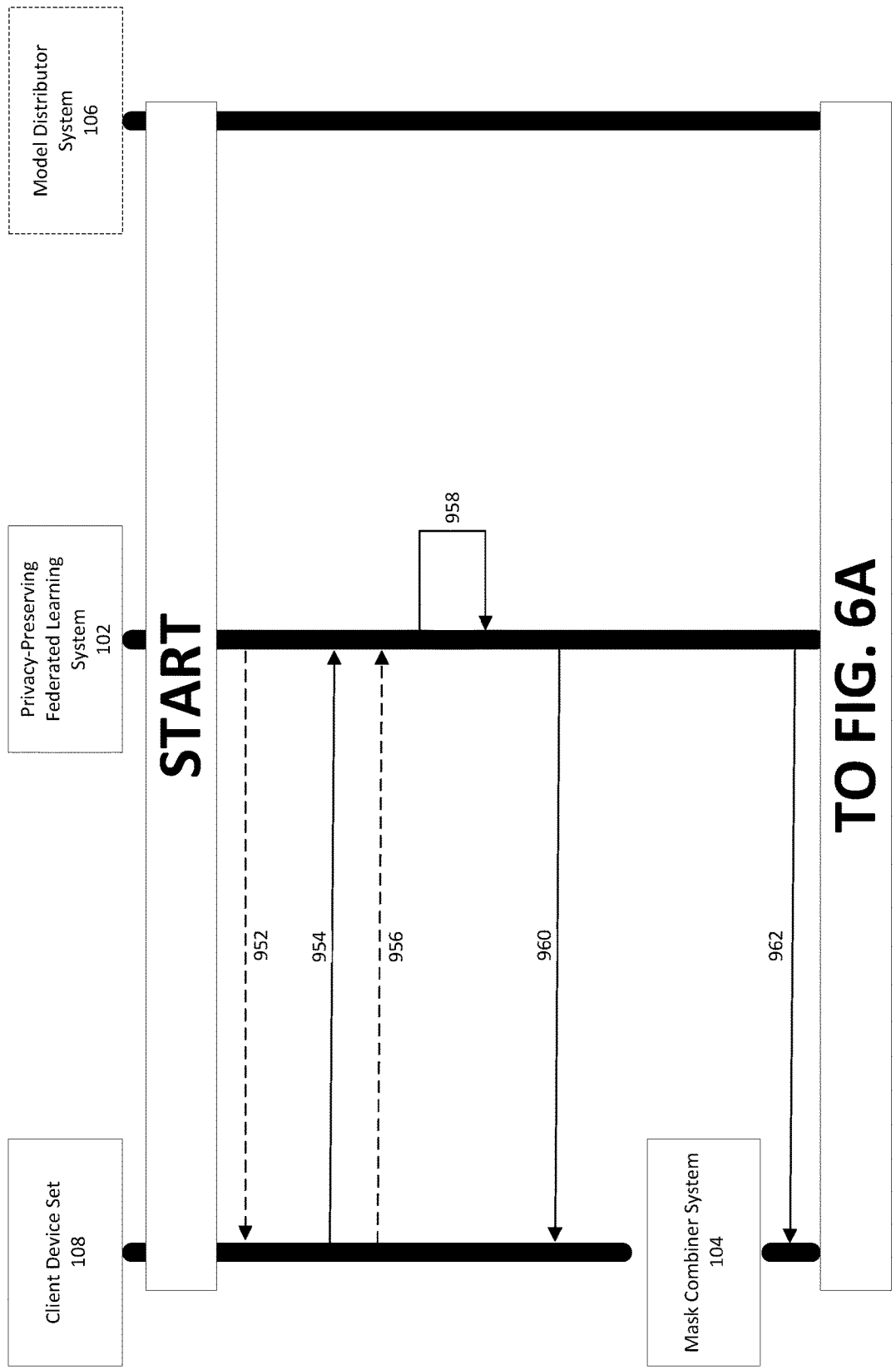

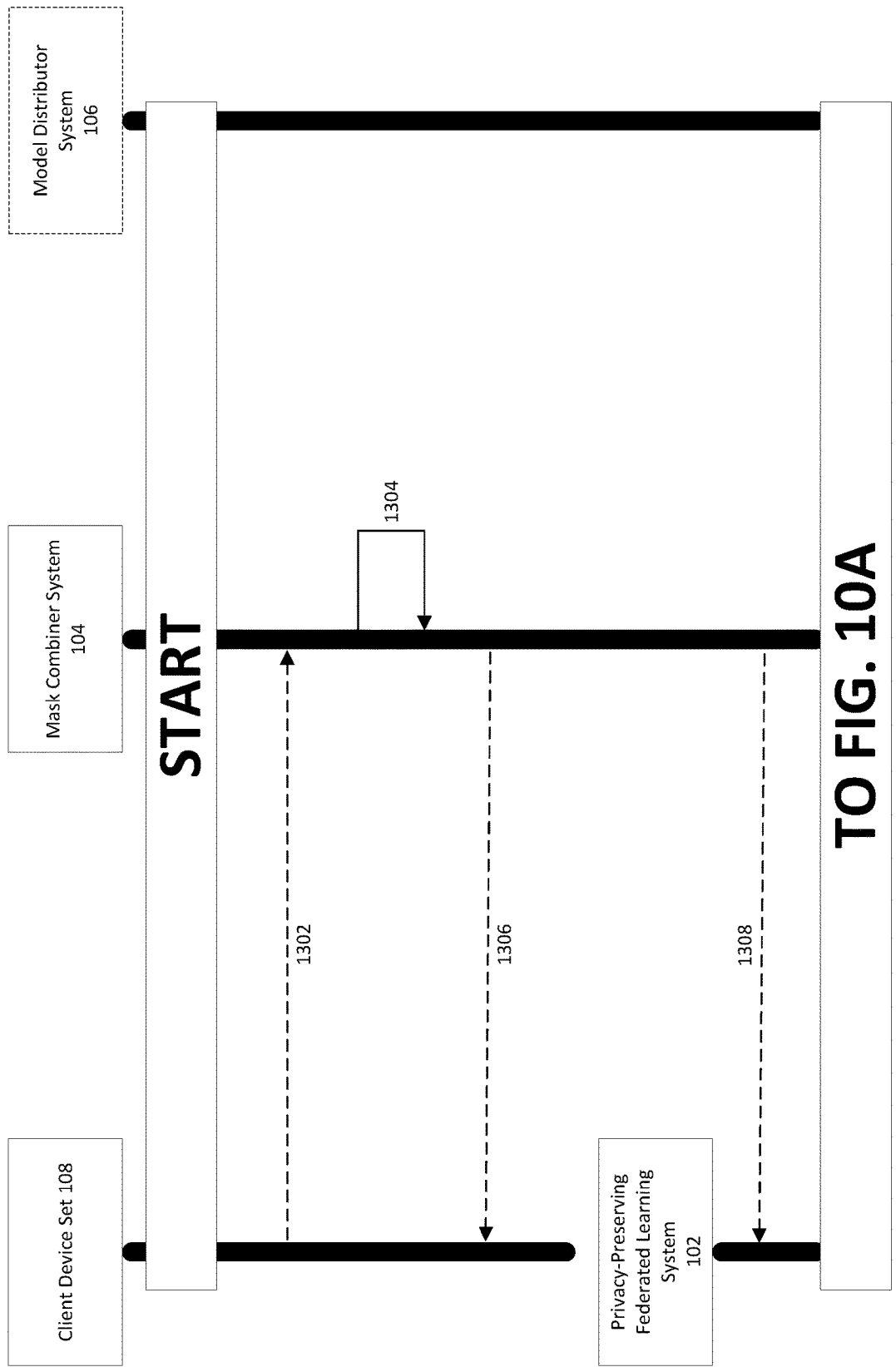

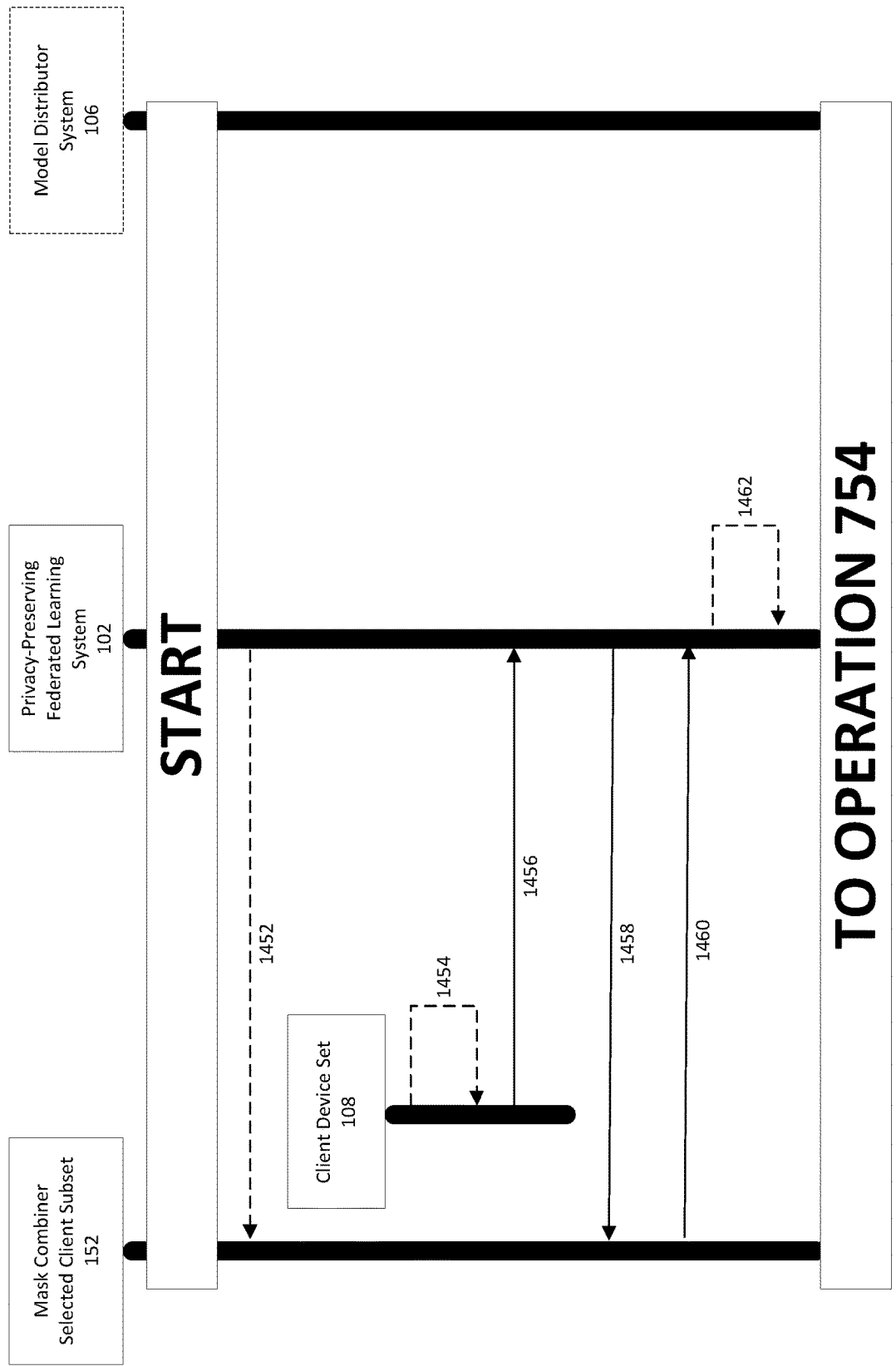

US 11,487,969 B2

APPARATUSES, COMPUTER PROGRAM PRODUCTS, AND COMPUTER-IMPLEMENTED METHODS FOR PRIVACY-PRESERVING FEDERATED LEARNING

TECHNOLOGICAL FIELD

Embodiments of the present disclosure generally relate to computer-implemented global model updating and distributing in a federated learning environment, and specifically to implementations for efficient, privacy-preserving model generation and distribution in a federated learning environment.

BACKGROUND

Federated learning enables building of a global model based on various distributed models at a client-level, for example each associated with a different participant(s). The global model may be built without exposing the data samples used in generating each of the distributed models. However, at various stages of building of the global model, a system generating the global model from the distributed models could readily generate various inferences regarding the sample data based on parameter values representing, and/or associated with, each of the distributed models or the combination thereof. Such inferences may reflect personally identifying information regarding participants, or otherwise be privacy-sensitive data that may be legally barred from exposure to third-parties or associates of a commercial connection. Applicant has discovered problems with current implementations of federated learning. Through applied effort, ingenuity, and innovation, Applicant has solved many of these identified problems by developing embodied in the present disclosure, which are described in detail below.

BRIEF SUMMARY

In general, embodiments of the present disclosure provided herein provide for privacy-preserving federated learning. Other implementations for one or more of the alternative illuminator assemblies and/or alternative illumination imaging apparatuses will be, or will become, apparent to one with skill in the art upon examination of the following figures and detailed description. It is intended that all such additional implementations be included within this description be within the scope of the disclosure, and be protected by the following claims.

In accordance with at least one aspect of the present disclosure, a computer-implemented method for privacy-preserving federated learning is provided. In at least one embodiment, the computer-implemented is executed via any combination of the computing hardware as described herein. In at least one example embodiment, the computer-implemented method comprises receiving a masked client model set, each masked client model of the masked client model set associated with a client device of a client device set, the client device set identified by a client device identifier set. The example computer-implemented method further comprises selecting an aggregation masked model set from the masked client model set, where the aggregation masked model set is associated with a selected device identifier set associated with the client device identifier set. The example computer-implemented method further comprises generating a masked updated global model based on at least the aggregation model set. The example computer-implemented method further comprises transmitting, to a mask combiner system, a selected client model indicator based on at least the selected device identifier set and the aggregation masked model set. The example computer-implemented method further comprises distributing, to the client device, the masked updated global model or an unmasked updated global model generated based on at least the masked updated global model.

In some embodiments of the example computer-implemented method, additionally or alternatively, the computer-implemented method further comprises transmitting a masked client model request to each client device of the client device set, where the masked client model set is received in response to transmitting the masked client model request to each client device of the client device set.

In some embodiments of the example computer-implemented method, additionally or alternatively, selecting the aggregation masked model set from the masked client model set comprises receiving a model quality metric set associated with the masked client model set, where each masked client model in the masked client model set is associated with a model quality metric data object in the model quality metric set; and selecting the aggregation masked model set based on at least the model quality metric set.

In some embodiments of the example computer-implemented method, additionally or alternatively, the client device identifier set comprises an anonymized device identifier set.

In some embodiments of the example computer-implemented method, additionally or alternatively, the masked client model set comprises a second masked client model set, and the computer-implemented method further comprises receiving a first masked client model set, each masked client model of the first masked client model set associated with the client device set, where the computer-implemented method comprises receiving the second client masked client model set in response to a determination the first masked client model set does not satisfy an aggregation sufficiency rule set.

In some embodiments of the example computer-implemented method, additionally or alternatively, the computer-implemented method further comprises determining the aggregation masked model set satisfies an aggregation sufficiency rule set.

In some embodiments of the example computer-implemented method, additionally or alternatively, the computer-implemented method further comprises receiving, from the mask combiner system, a secure unmasking data object; and unmasking the masked updated global model, using the secure unmasking data object, to generate the unmasked updated global model, where distributing, to the client device set, the masked updated global model or the unmasked updated global model comprises distributing, to the client device set, the unmasked updated global model.

In some embodiments of the example computer-implemented method, additionally or alternatively, distributing, to the client device, the masked updated global model or the unmasked updated global model comprises transmitting the masked updated global model to a model distributor system, where the model distributor system is configured to receive a secure unmasking data object, where transmitting the masked updated global model to the model distributor system causes the model distributor system to generate the unmasked updated global model and distribute the unmasked updated global model to the client device set.

In some embodiments of the example computer-implemented method, additionally or alternatively, distributing, to the client device, the masked updated global model or the unmasked updated global model comprises transmitting the masked updated global model to a model distributor system, where the model distributor system is configured to receive a secure unmasking data object, where transmitting the masked updated global model to the model distributor system causes the model distributor system to generate the unmasked updated global model and distribute the unmasked updated global model to the client device set.

In some embodiments of the example computer-implemented method, additionally or alternatively, the mask combiner system is embodied by a mask combiner selected client device subset associated with the client device set, and transmitting, to the mask combiner system, the selected client model indicator comprises transmitting, to the mask combiner selected client device subset, at least one request indicating each client device of the mask combiner selected client device subset was selected for generating a secure unmasking data object.

In accordance with another aspect of the present disclosure, an apparatus for privacy-preserving federated learning is provided. In at least one example of the apparatus, the apparatus includes at least one processor and at least one non-transitory memory device. The at least one non-transitory memory includes computer-coded instructions stored thereon. The computer-coded instructions, in execution with the at least one processor, configure the apparatus to perform any of the example computer-implemented methods described above. In yet another example embodiment of the apparatus, the apparatus includes any of the means described herein to perform each step of any of the example computer-implemented methods described above.

In accordance with yet another aspect of the present disclosure, a computer program product for privacy-preserving federated learning is provided. The computer program product includes at least one non-transitory computer-readable storage medium having computer program code stored thereon. The computer program code, in execution with at least one processor, is configured for performing any of the example computer-implemented methods described above.

In accordance with yet another aspect of the present disclosure, a second example computer-implemented method for privacy-preserving federated learning is provided. In at least one embodiment, the second example computer-implemented is executed via any combination of the computing hardware as described herein. In at least one example embodiment, the second example computer-implemented method comprises identifying a received client mask information set associated with a client model set, the client model set associated with a client device set. The second example computer-implemented method further comprises receiving, from a privacy-preserving federated learning system, a selected client model indicator indicating at least one selected client model from the client model set. The second example computer-implemented method further comprises generating a secure unmasking data object associated with the selected client model indicator based on at least the received client mask information set. The second example computer-implemented method further comprises transmitting the secure unmasking data object to an unmasking system, where the secure client mask data object is configured to cause the unmasking system to unmask a masked updated global model using the secure unmasking data object for distribution to the client device set.

In some embodiments of the second example computer-implemented method, additionally or alternatively, the second example computer-implemented method further comprises identifying the unmasking system, where the unmasking system comprises the privacy-preserving federated learning system or a model distributor system.

In some embodiments of the second example computer-implemented method, additionally or alternatively, transmitting the secure unmasking data object to the unmasking system occurs in response to a determination that the selected client model indicator satisfies an aggregation sufficiency rule set.

In some embodiments of the second example computer-implemented method, additionally or alternatively, the selected client model indicator comprises a second client device indicator indicating a second at least one client model from the client model set, and the second computer-implemented method further comprises receiving, from the privacy-preserving federated learning system, a first selected client model indicator indicating a first at least one client model from the client model set; determining the first selected client model indicator does not satisfy an aggregation sufficiency rule set; and transmitting at least one learning round failure data object.

In some embodiments of the second example computer-implemented method, additionally or alternatively, the client mask information set comprises at least one client mask information data object, each client mask information data object comprising at least a randomized element data object, and generating the secure unmasking data object comprises generating the secure unmasking data object based on at least the randomized element data object for each client mask information data object of the client mask information set and an additional element data object.

In some embodiments of the second example computer-implemented method, additionally or alternatively, identifying the received client mask information set associated with the client model set comprises receiving a client mask information data object from each client device of the client device set.

In some embodiments of the second example computer-implemented method, additionally or alternatively, identifying the received client mask information set associated with the client model set comprises retrieving, from at least one datastore, a client mask information data object for each client device of the client device set.

In some embodiments of the second example computer-implemented method, additionally or alternatively, the computer-implemented method further comprises causing updating of the client model set, where each client model of the client model set is associated with a client device of the client device set.

In accordance with yet another aspect of the present disclosure, a second apparatus for privacy-preserving federated learning is provided. In at least one example of the second apparatus, the apparatus includes at least one processor and at least one non-transitory memory device. The at least one non-transitory memory includes computer-coded instructions stored thereon. The computer-coded instructions, in execution with the at least one processor, configure the second example apparatus to perform any of the second example computer-implemented methods described above. In yet another example embodiment of the apparatus, the second apparatus includes any of the means described herein to perform each step of any of the second example computer-implemented methods described above.

In accordance with yet another aspect of the present disclosure, a third computer program product for privacy-preserving federated learning is provided. The second example computer program product includes at least one non-transitory computer-readable storage medium having computer program code stored thereon. The computer program code, in execution with at least one processor, is configured for performing any of the second example computer-implemented methods described above.

In accordance with yet another aspect of the present disclosure, a third example computer-implemented method for privacy-preserving federated learning is provided. In at least one embodiment, the third example computer-implemented is executed via any combination of the computing hardware as described herein. In at least one example embodiment, the third example computer-implemented method comprises transmitting, to a mask combiner selected client device subset associated with a client device set, at least one request indicating each client device of the mask combiner selected client device subset was selected for generating a secure unmasking data object. The third example computer-implemented method further comprises receiving a client mask information set associated with the mask combiner selected client device subset. The third example computer-implemented method further comprises transmitting at least one client mask information data object of the client mask information set to at least one client device of the mask combiner selected client device subset for use in generating at least a secure unmasking data object for use in unmasking a masked updated global model associated with the client device set. The third example computer-implemented method further comprises performing one of: (1) distributing, to the client device set, the masked updated global model; or (2) both generating an unmasked updated global model based on at least the masked updated global model and the secure unmasking data object for use in unmasking the masked updated global model, and distributing the unmasked updated global model to the client device set.

In some embodiments of the third example computer-implemented method, additionally or alternatively, the client mask information set comprises at least one encrypted client mask information data object.

In some embodiments of the third example computer-implemented method, additionally or alternatively, receiving the client mask information set comprises receiving a client mask information data object from each client device of the mask combiner selected client device subset.

In some embodiments of the third example computer-implemented method, additionally or alternatively, transmitting the at least one client mask information data object of the client mask information set to the at least one client device of the mask combiner selected client device subset for use in generating at least the secure unmasking data object for use in unmasking the masked updated global model associated with the client device set comprises transmitting, to the at least one client device, a client mask information subset of the client mask information set, where the client mask information subset comprises each client mask information data object associated with a client device other than the at least one client device.

In some embodiments of the third example computer-implemented method, additionally or alternatively, generating the unmasked updated global model based on at least the masked updated global model and the secure unmasking data object for use in unmasking the masked updated global model associated with the client device set comprises receiving the secure unmasking data object from the at least one client device; and unmasking the masked updated global model using the secure unmasking data object to generate the unmasked updated global model.

In some embodiments of the third example computer-implemented method, additionally or alternatively, generating the unmasked updated global model based on at least the masked updated global model and the secure unmasking data object for use in unmasking the masked updated global model associated with the client device set comprises receiving a set of secure unmasking data objects from the at least one client device; selecting the secure unmasking data object for use in unmasking the masked updated global model based on the set of secure unmasking data objects; and unmasking the masked updated global model using the secure unmasking data object to generate the unmasked updated global model.

In some embodiments of the third example computer-implemented method, additionally or alternatively, the masked updated global model or unmasked updated global model is distributed to the client device set via transmission to a model distributor system.

In accordance with yet another aspect of the present disclosure, a third example apparatus for privacy-preserving federated learning is provided. In at least one example of the apparatus, the third example apparatus includes at least one processor and at least one non-transitory memory device. The at least one non-transitory memory includes computer-coded instructions stored thereon. The computer-coded instructions, in execution with the at least one processor, configure the third example apparatus to perform any of the third example computer-implemented methods described above. In yet another example embodiment of the apparatus, the apparatus includes any of the means described herein to perform each step of any of the third example computer-implemented methods described above.

In accordance with yet another aspect of the present disclosure, a third example computer program product for privacy-preserving federated learning is provided. The third example computer program product includes at least one non-transitory computer-readable storage medium having computer program code stored thereon. The computer program code, in execution with at least one processor, is configured for performing any of the third example computer-implemented methods described above.

BRIEF DESCRIPTION OF THE DRAWINGS

Figure 1A:
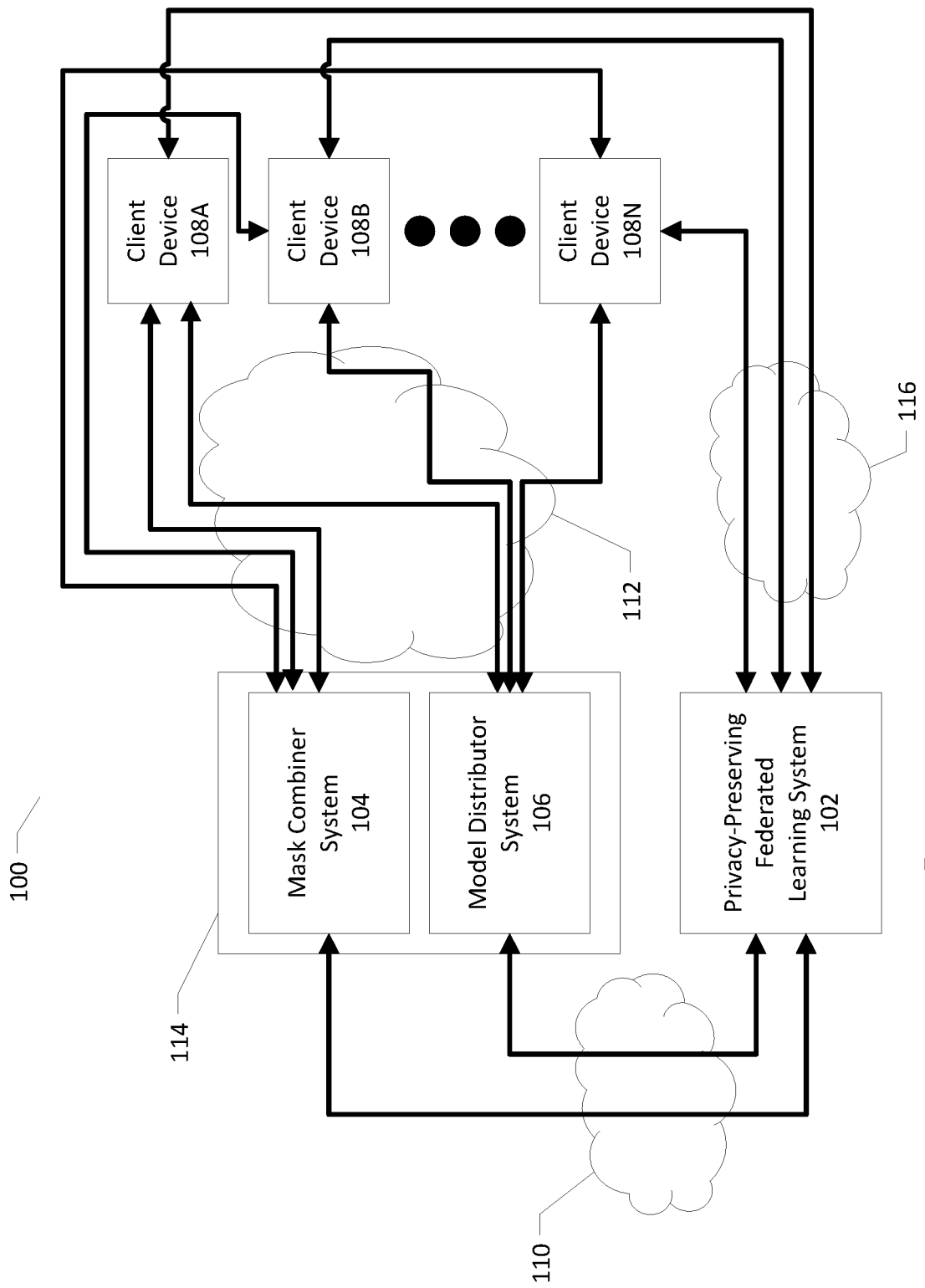
Figure 1B:
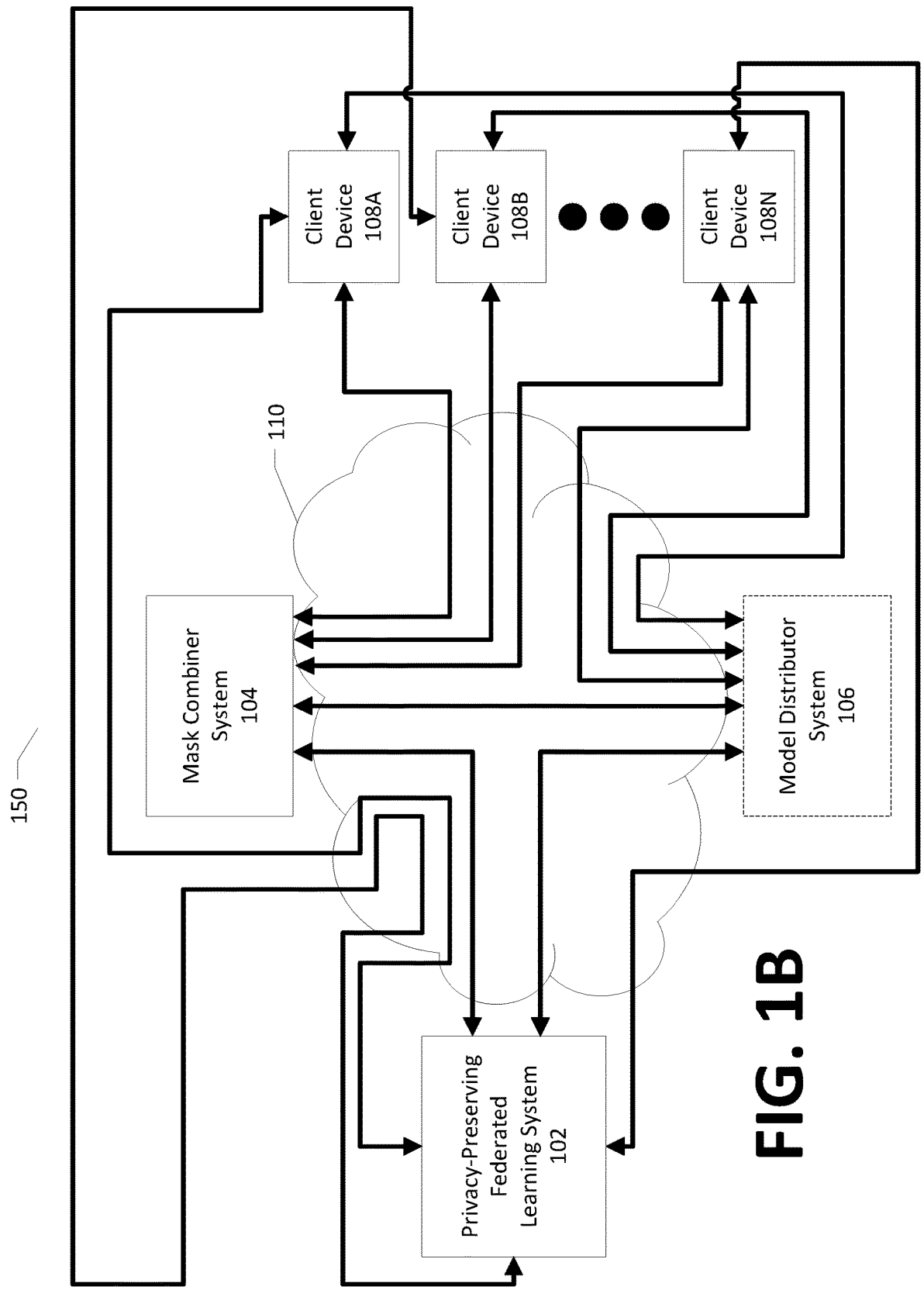
Figure 1C:
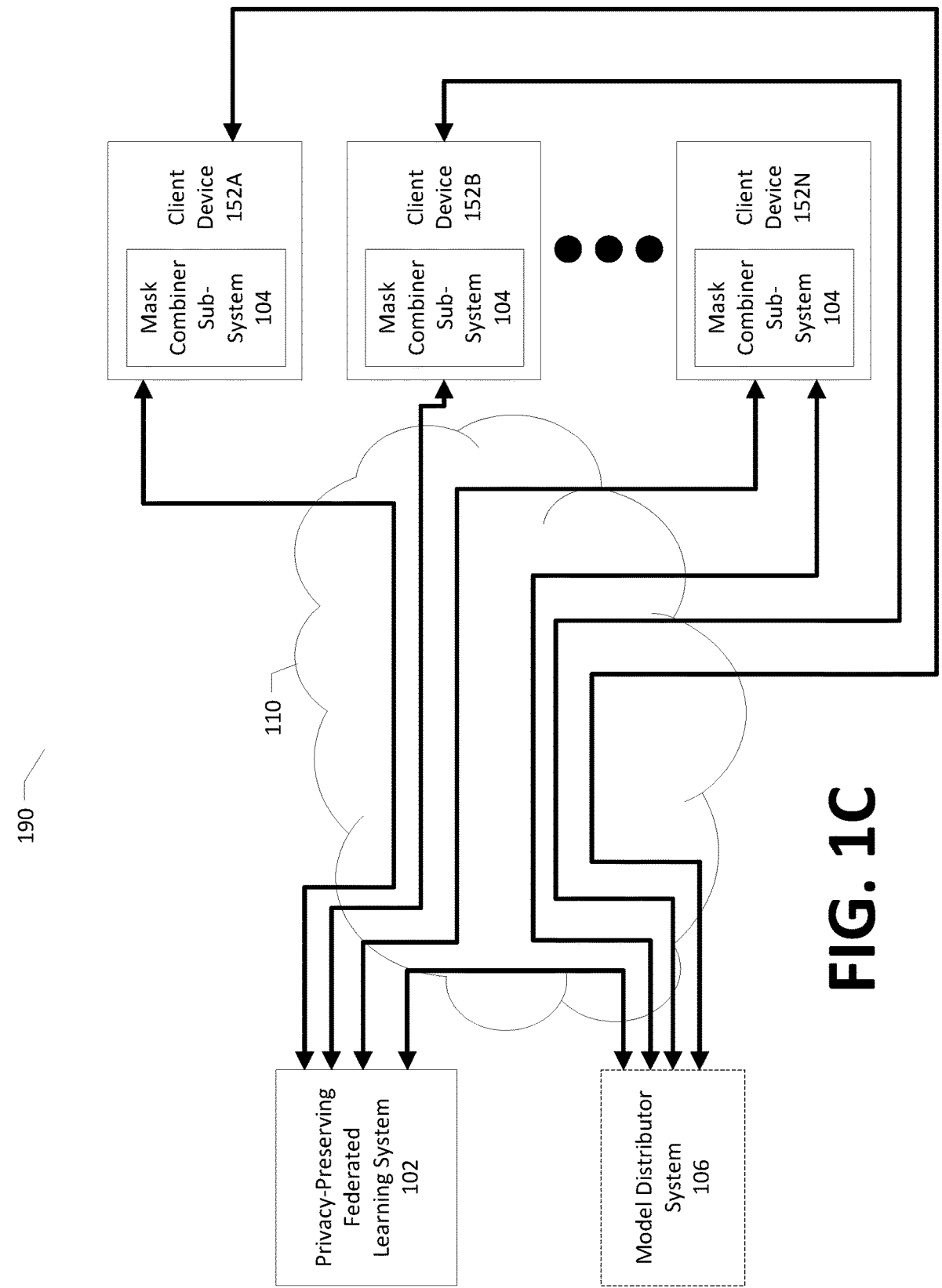
Figure 2:
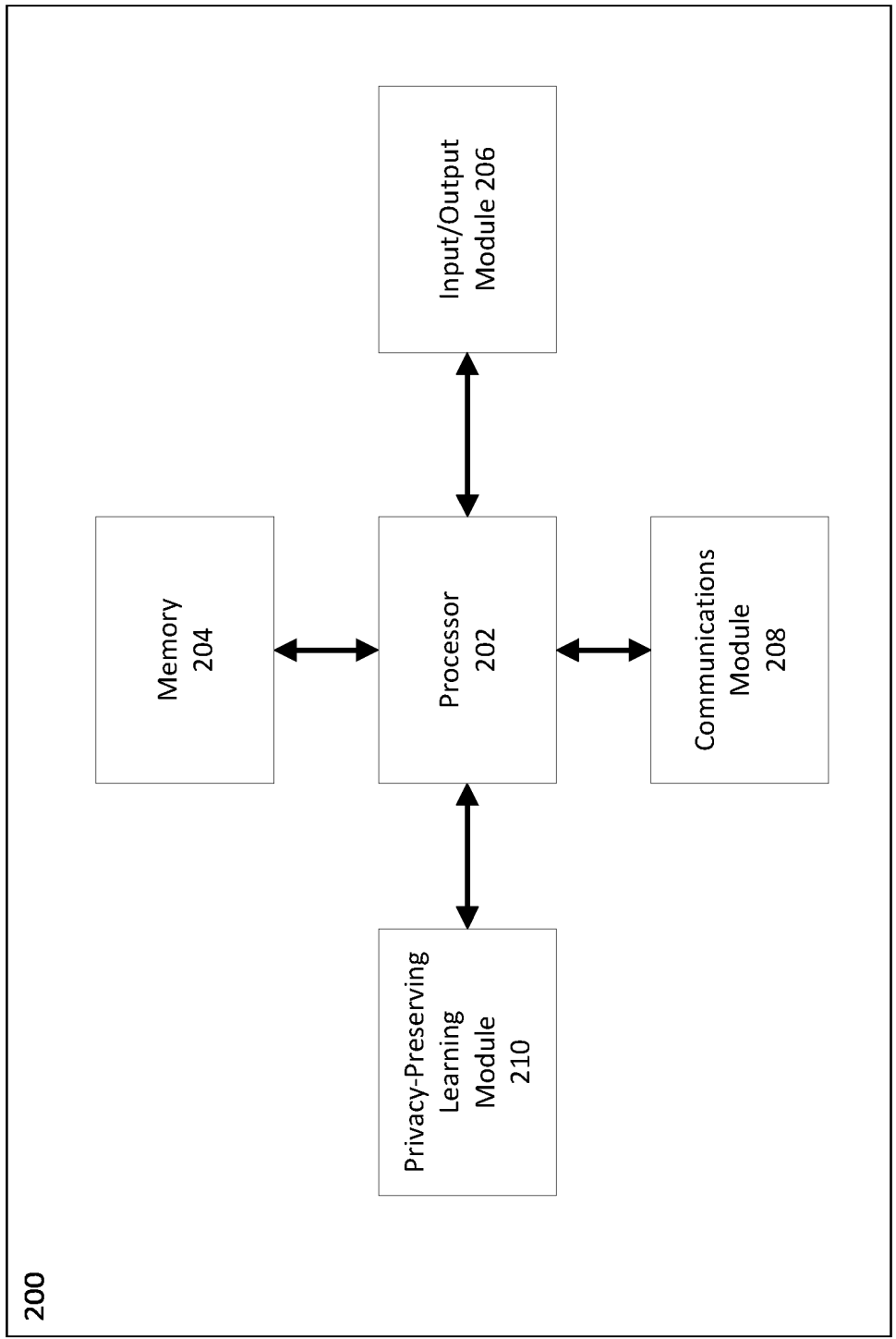
Figure 3:
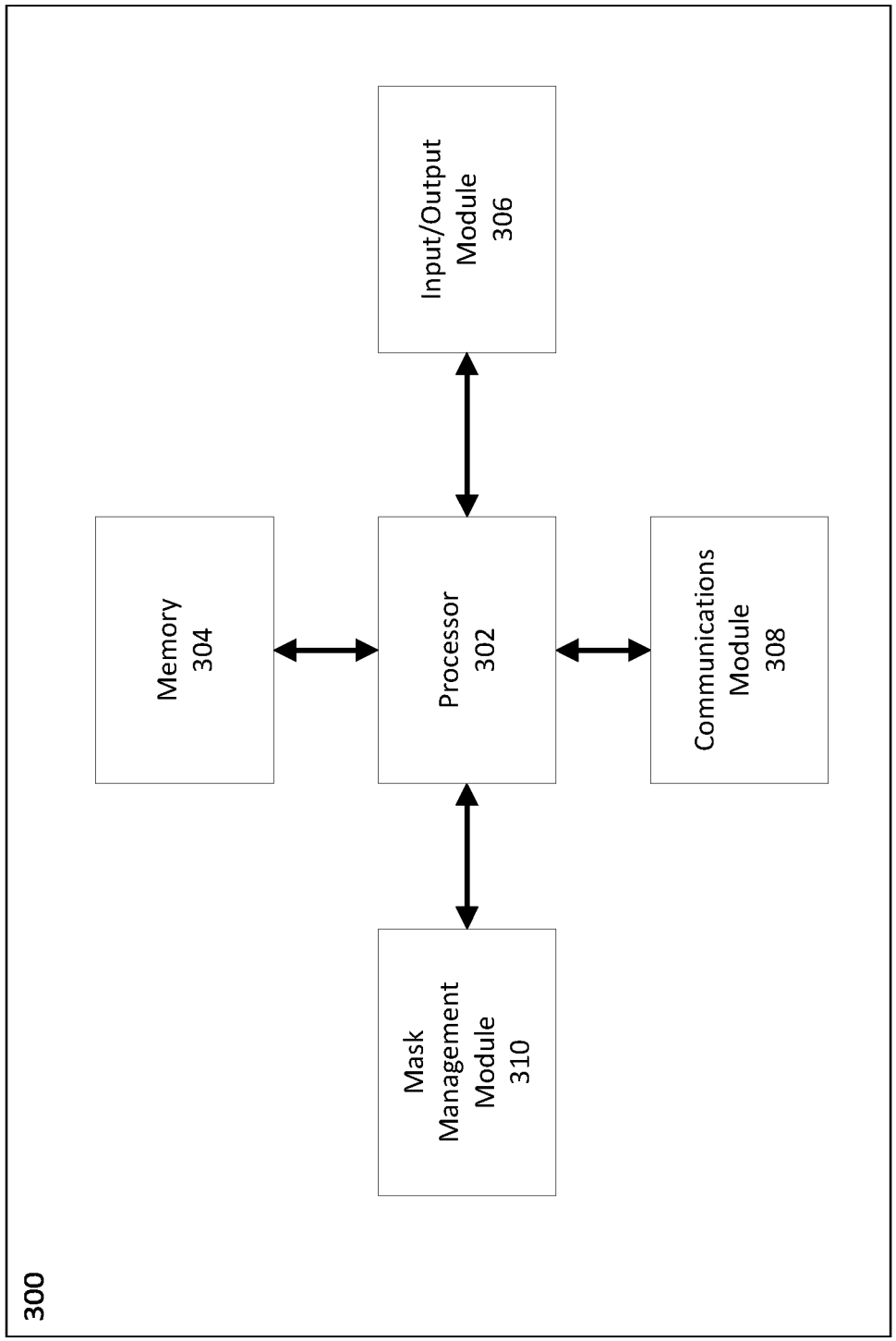
Figure 4:
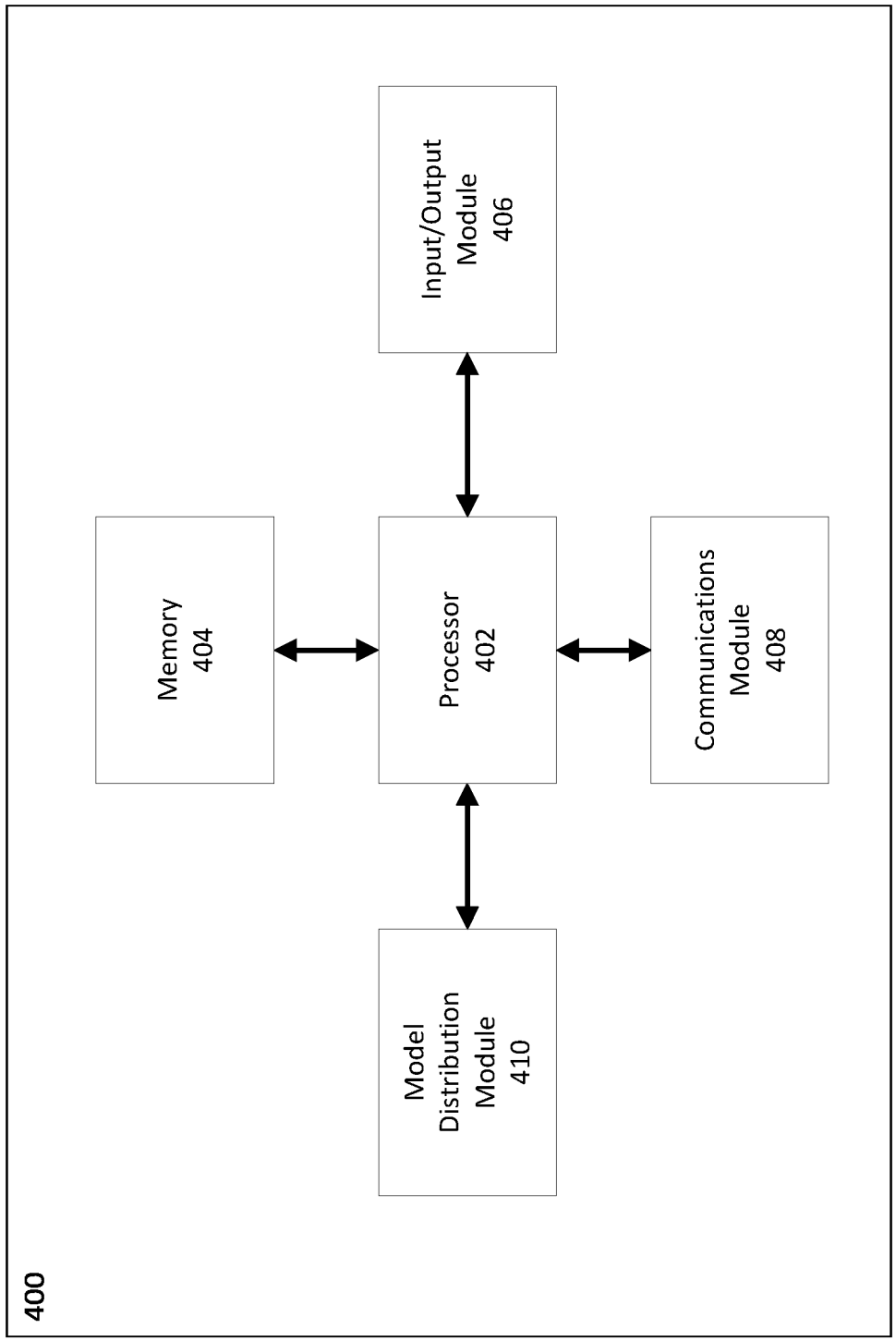
Figure 5A:
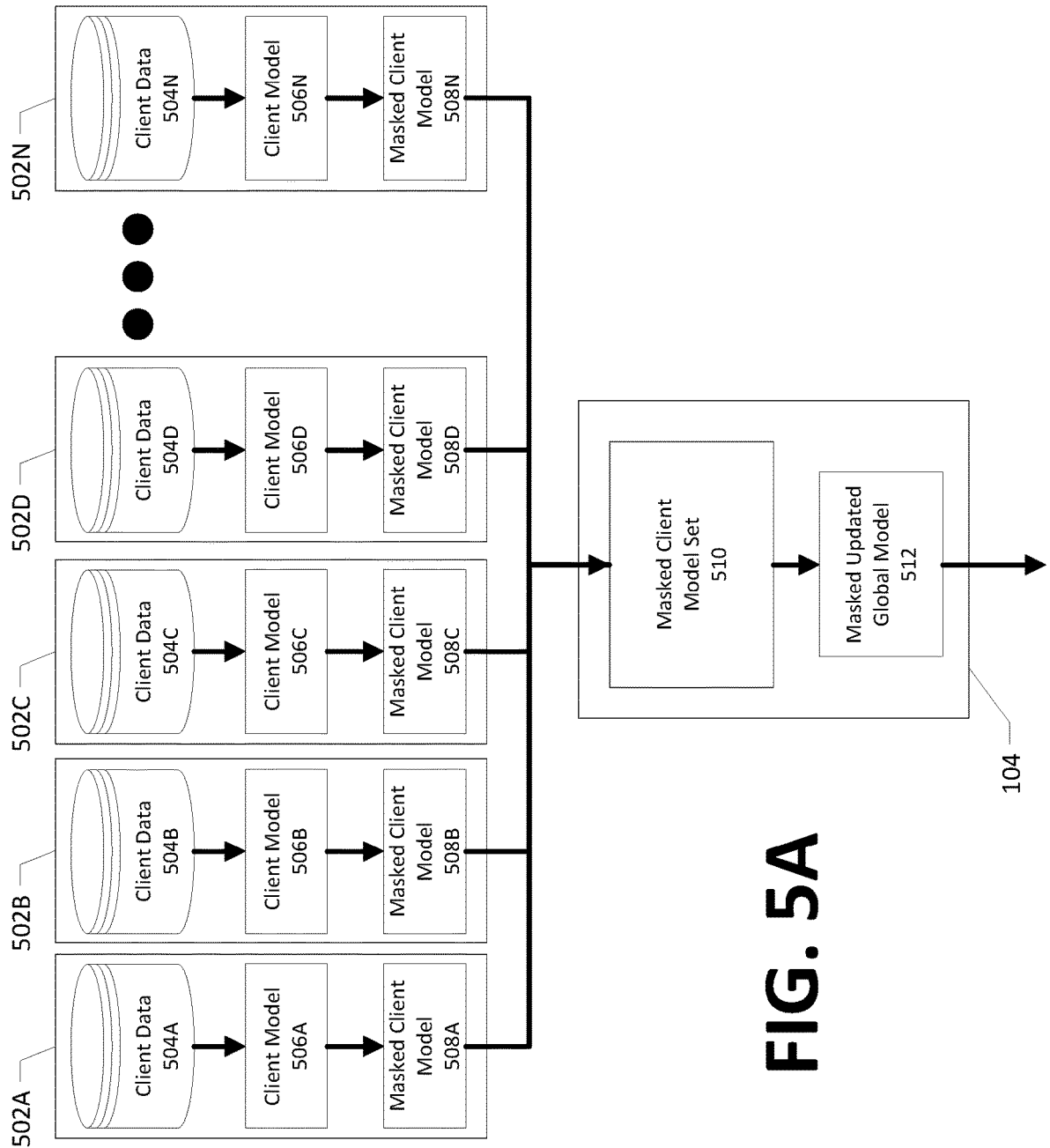
Figure 5B:
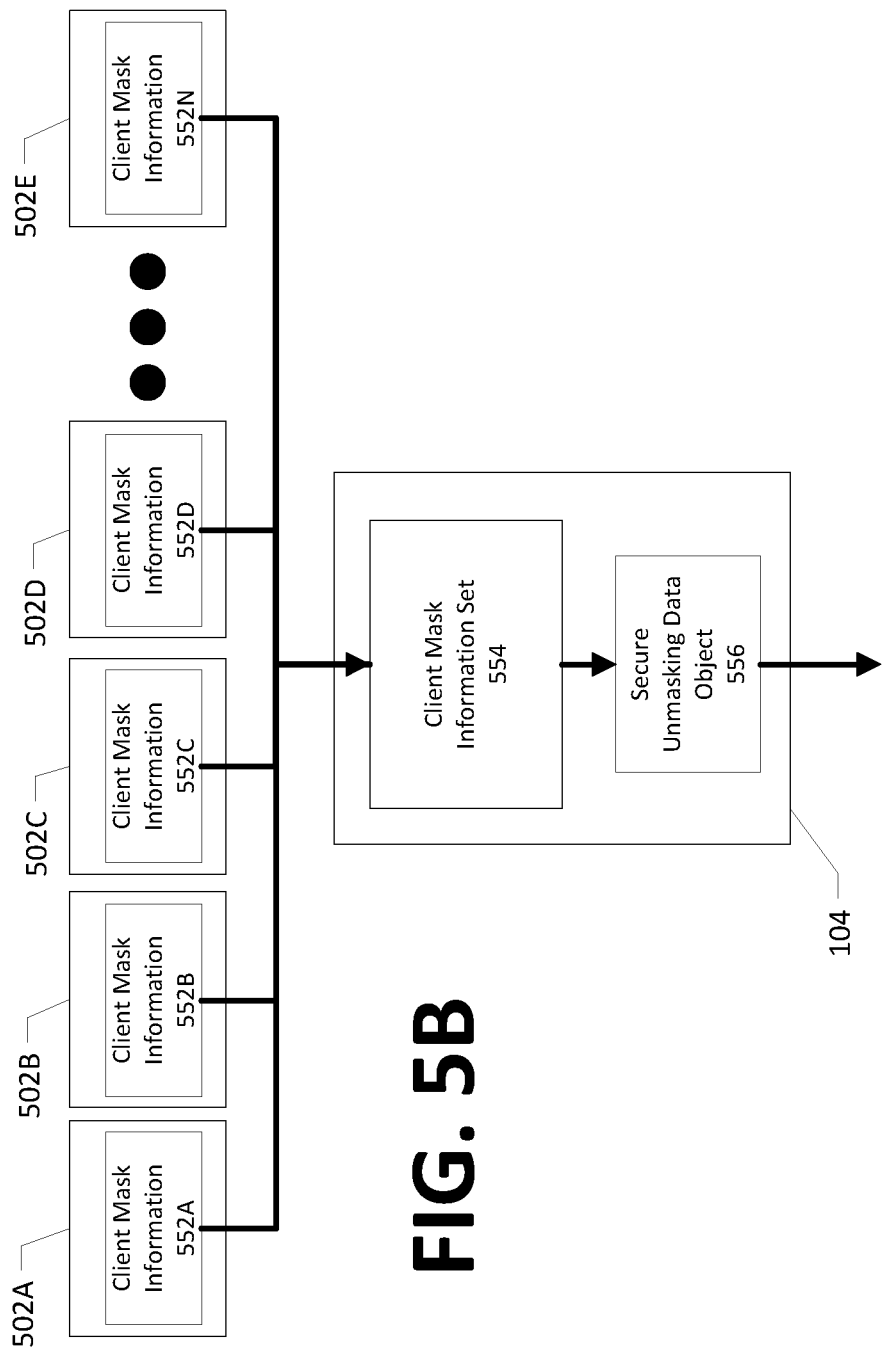
Figure 6B:
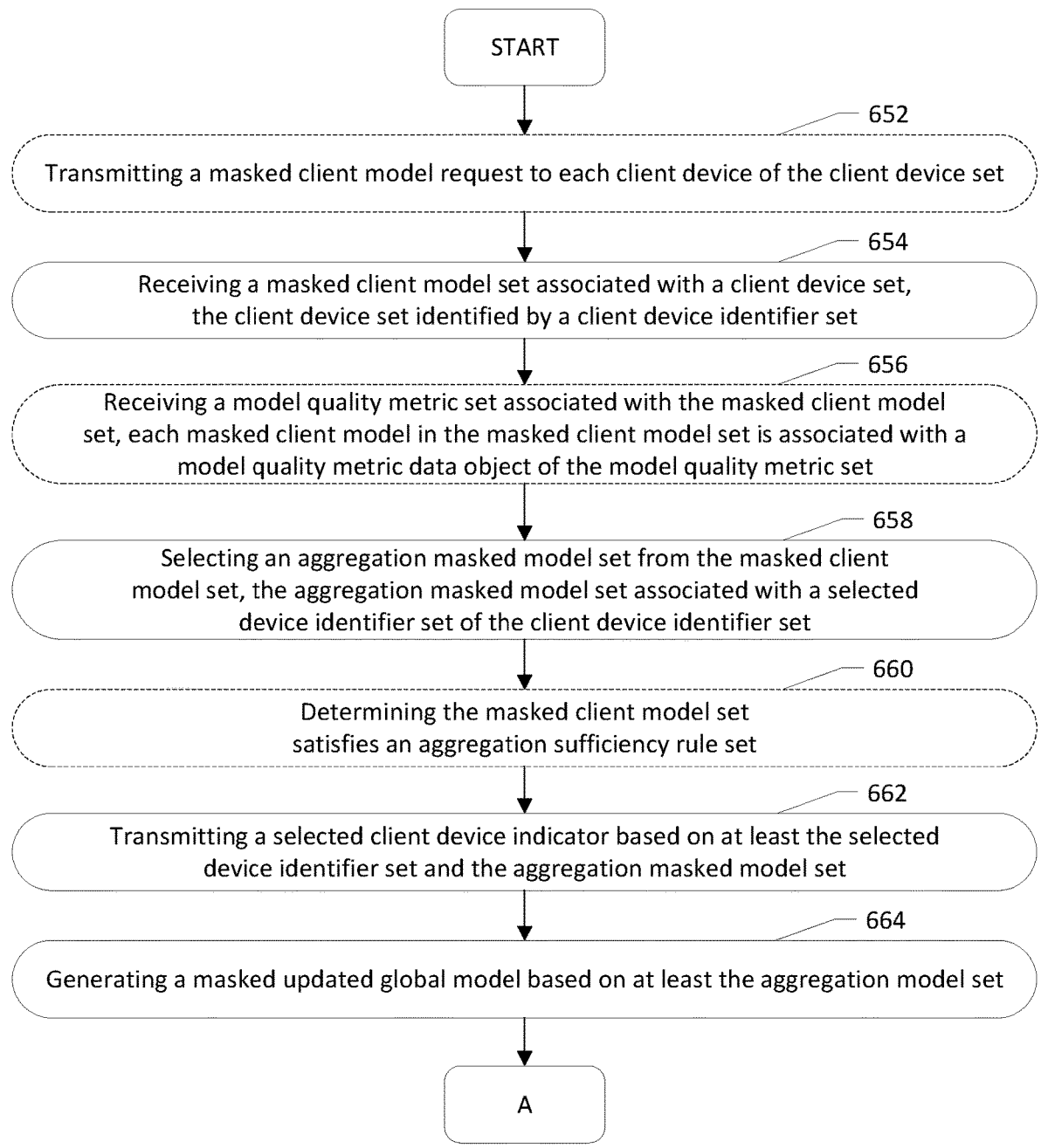
Figure 6C:
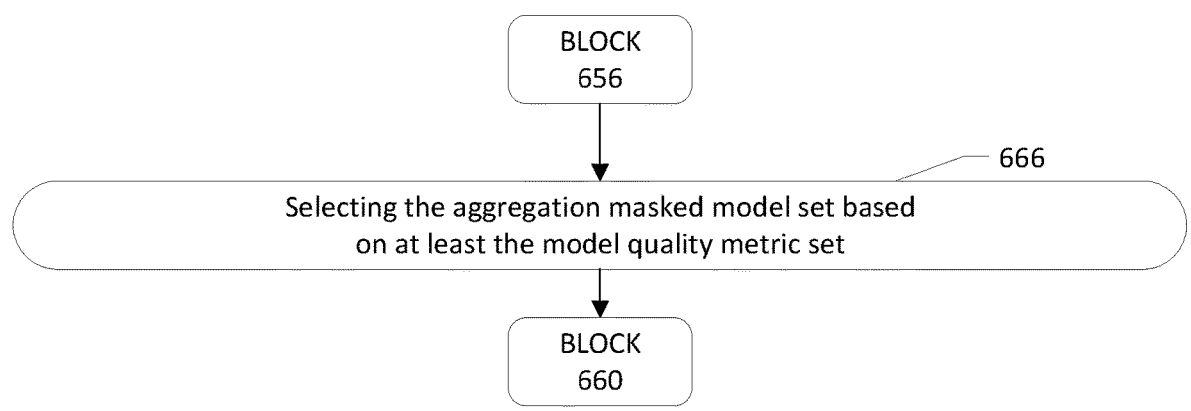
Figure 7A:
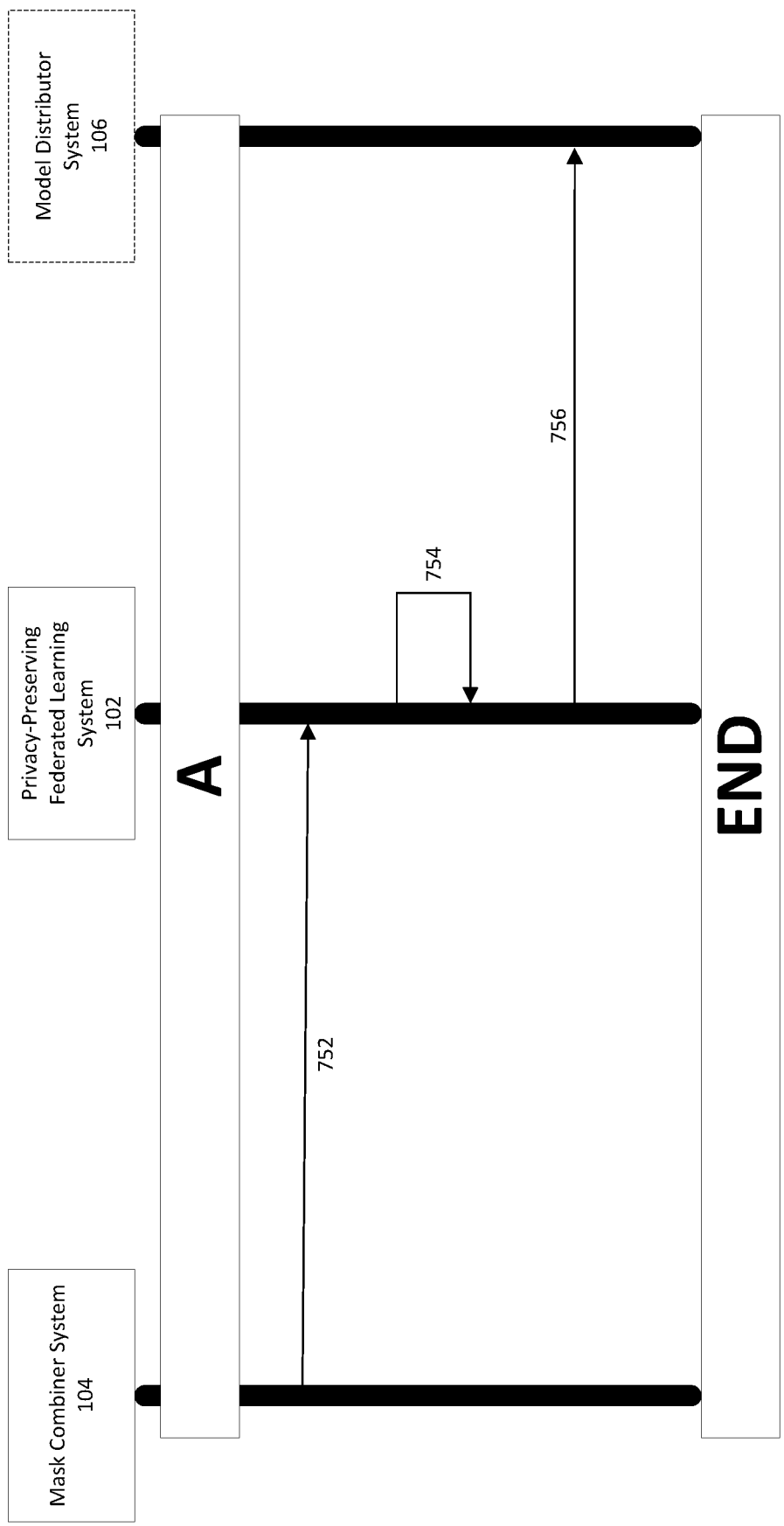
Figure 7B:
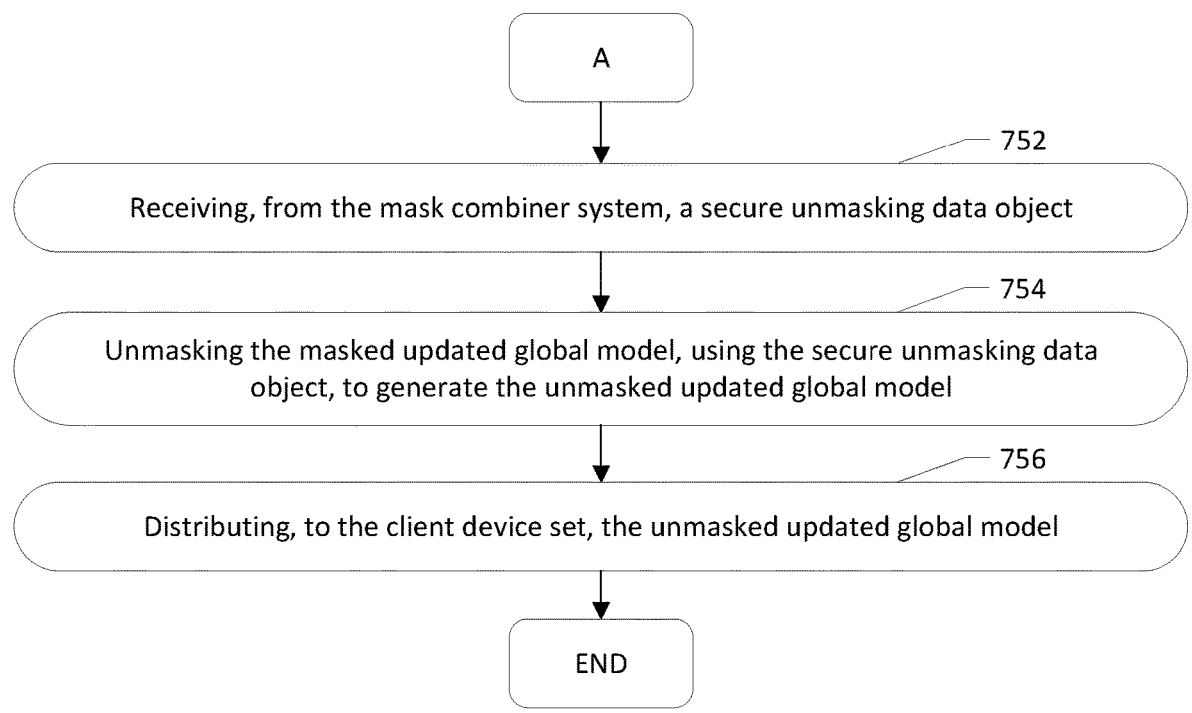
Figure 8A:
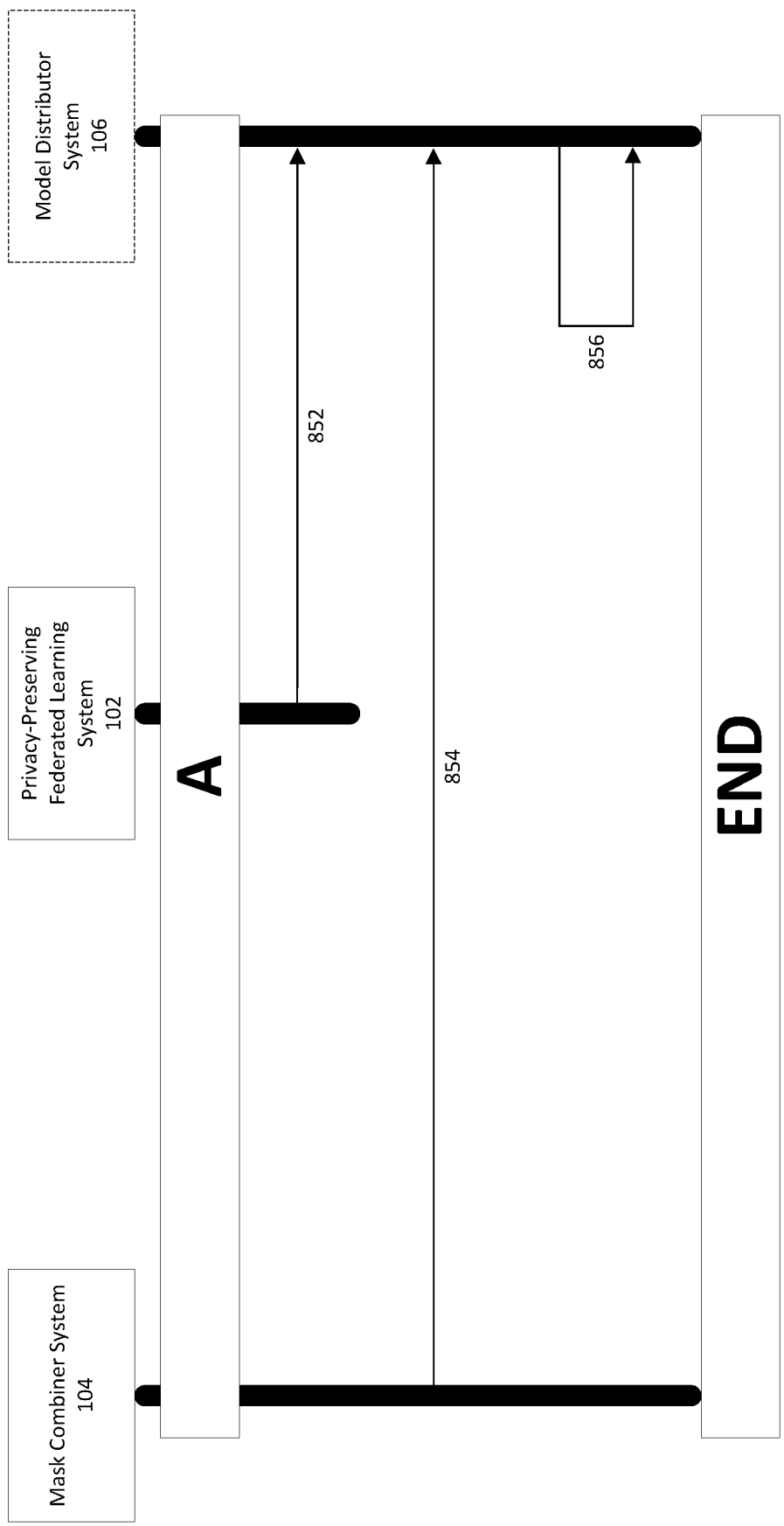
Figure 8B:
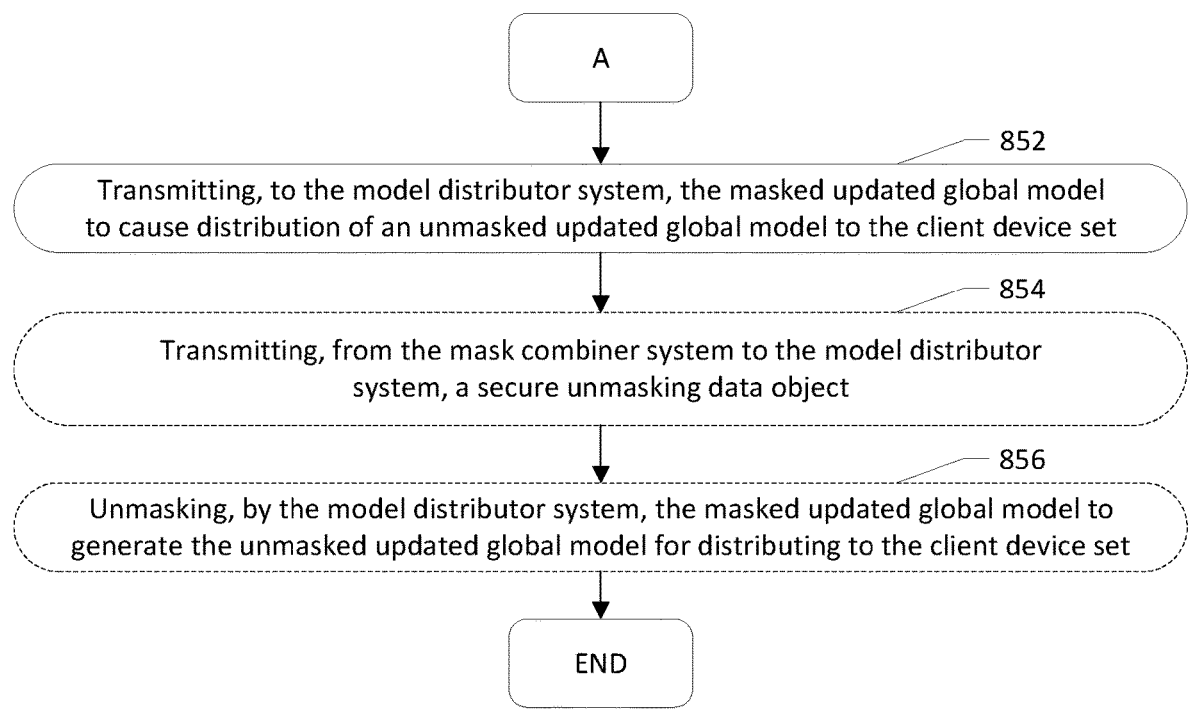
Figure 9B:
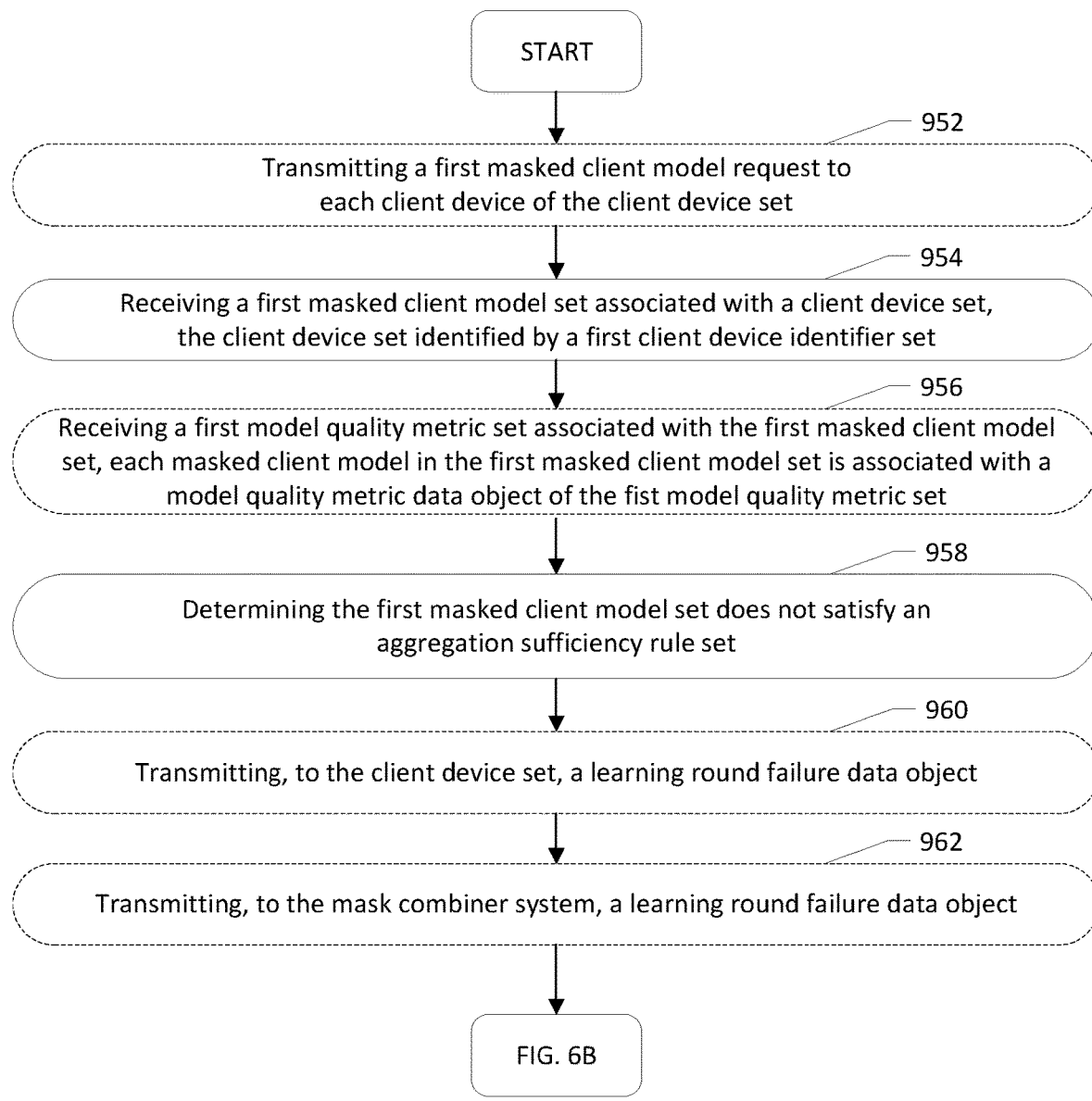
Figure 10A:
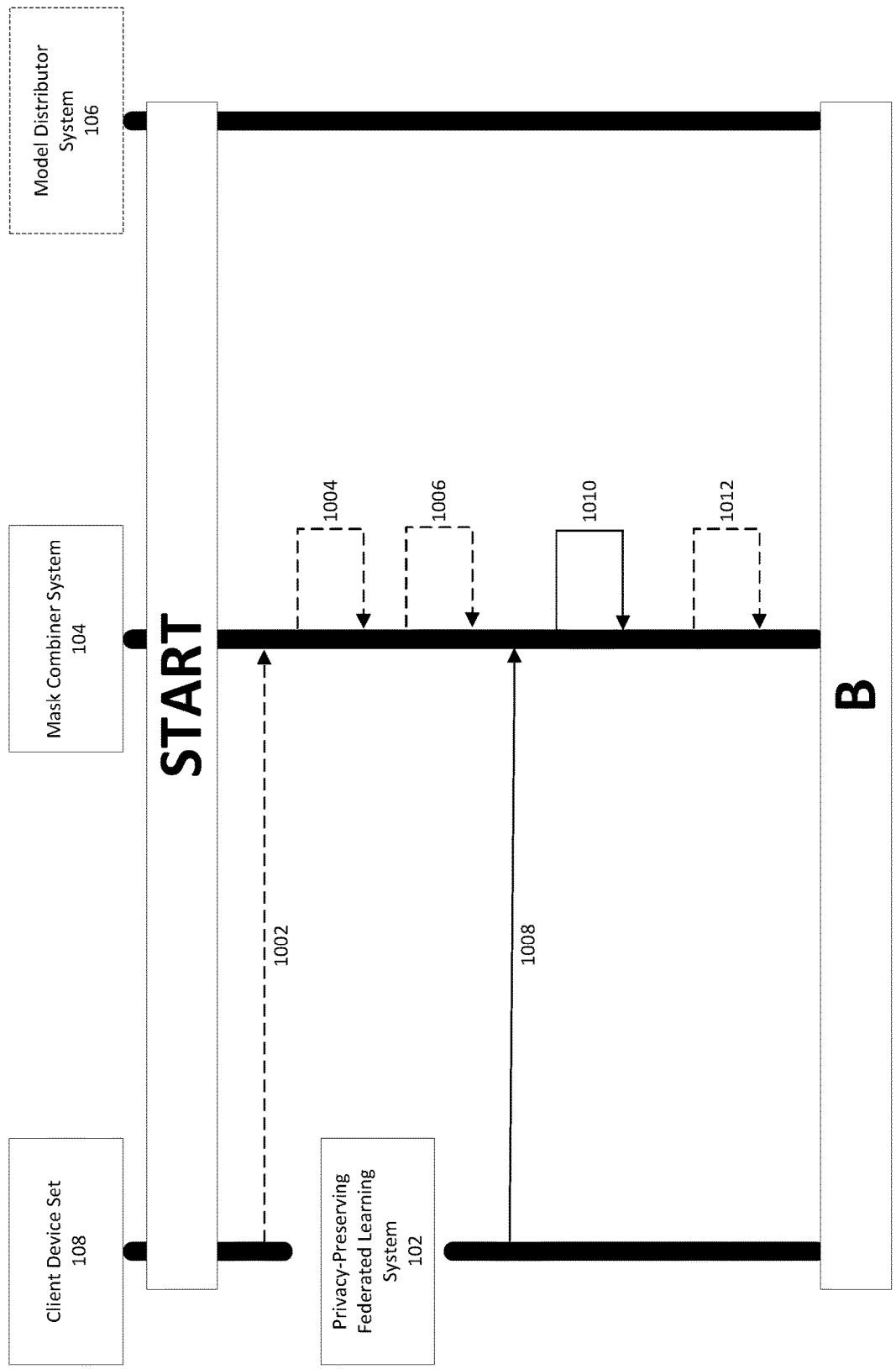
Figure 10B:
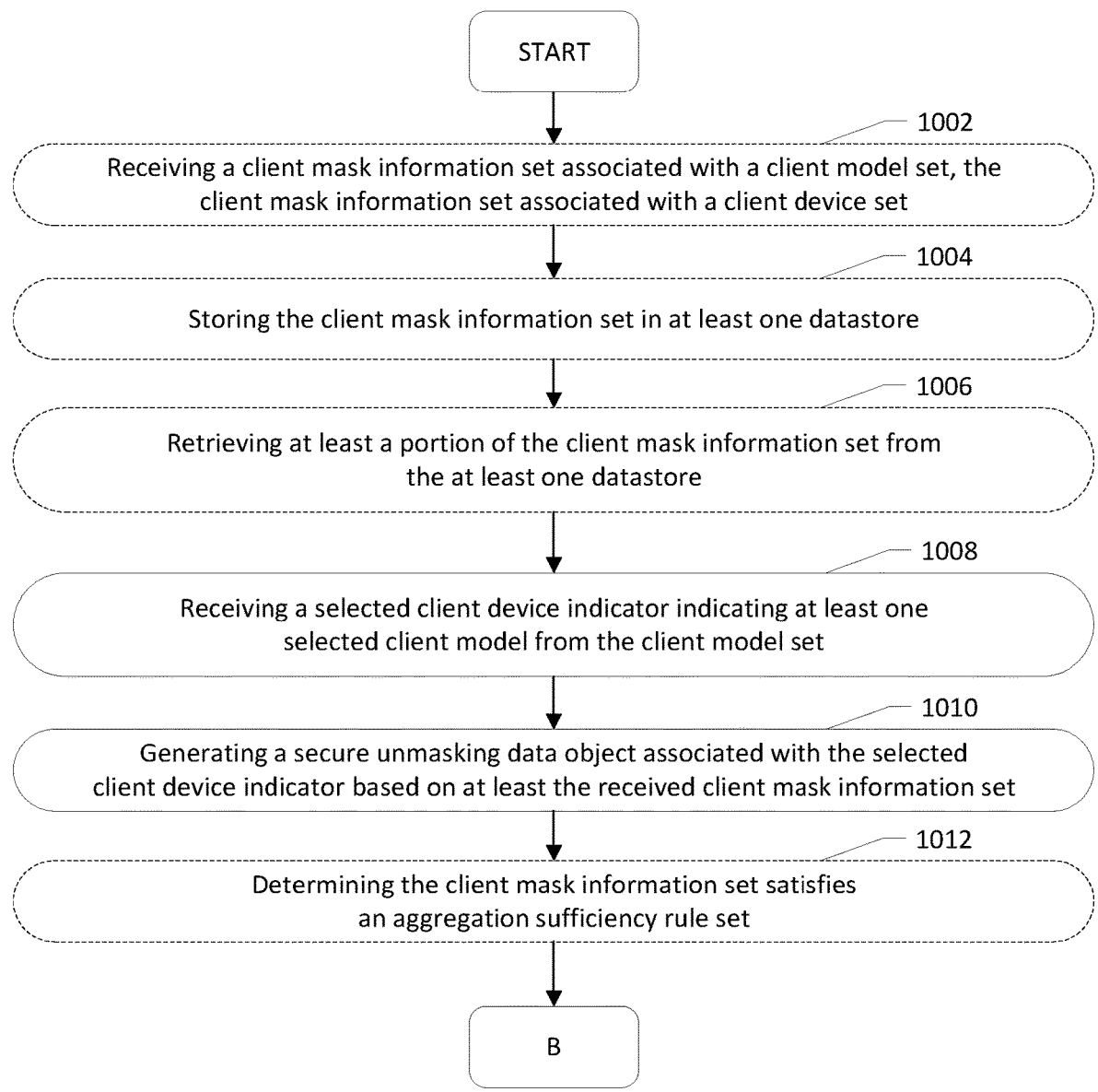
Figure 10C:
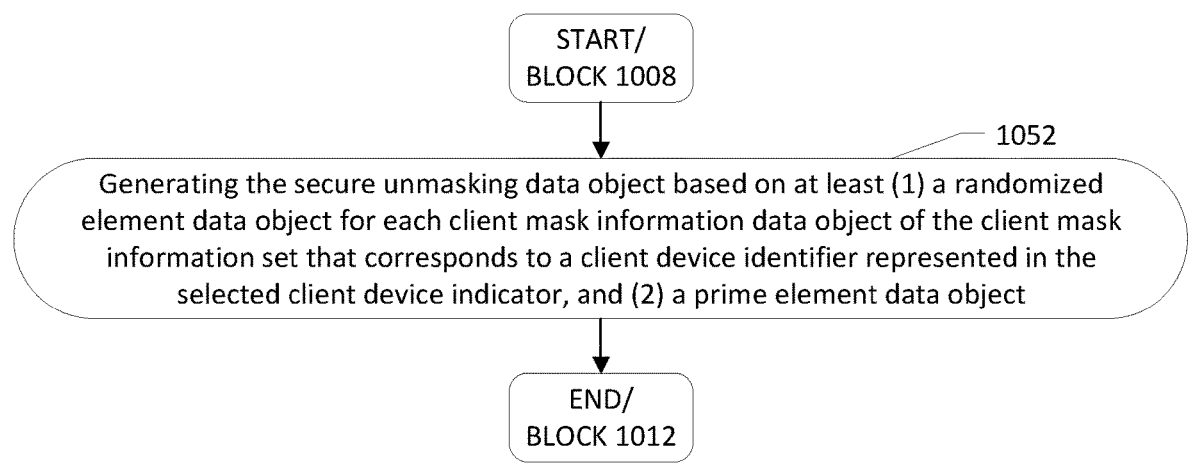
Figure 11A:
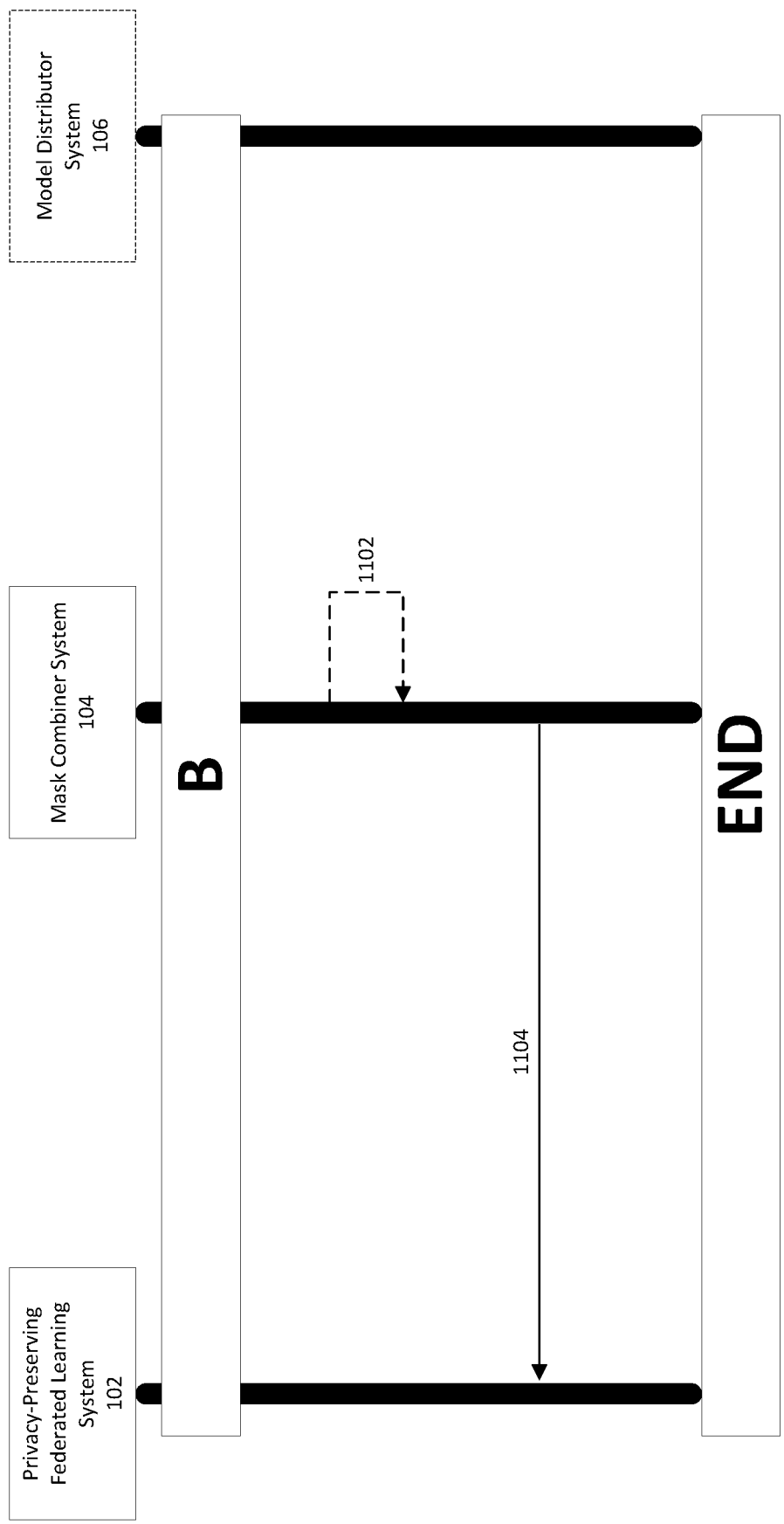
Figure 11B:
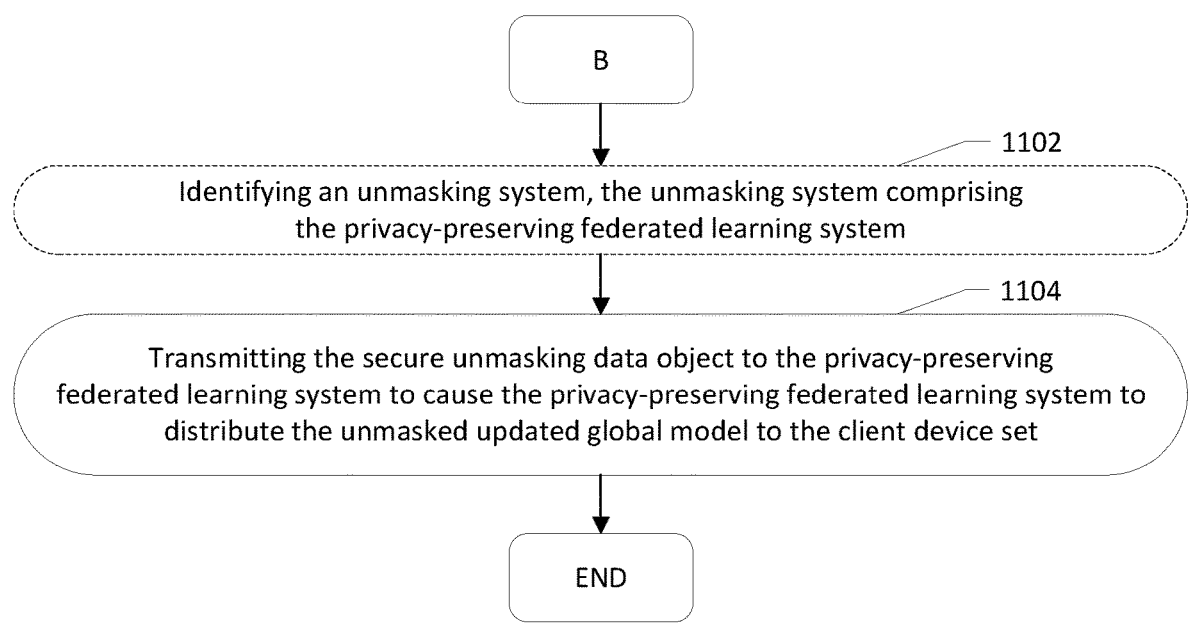
Figure 12A:
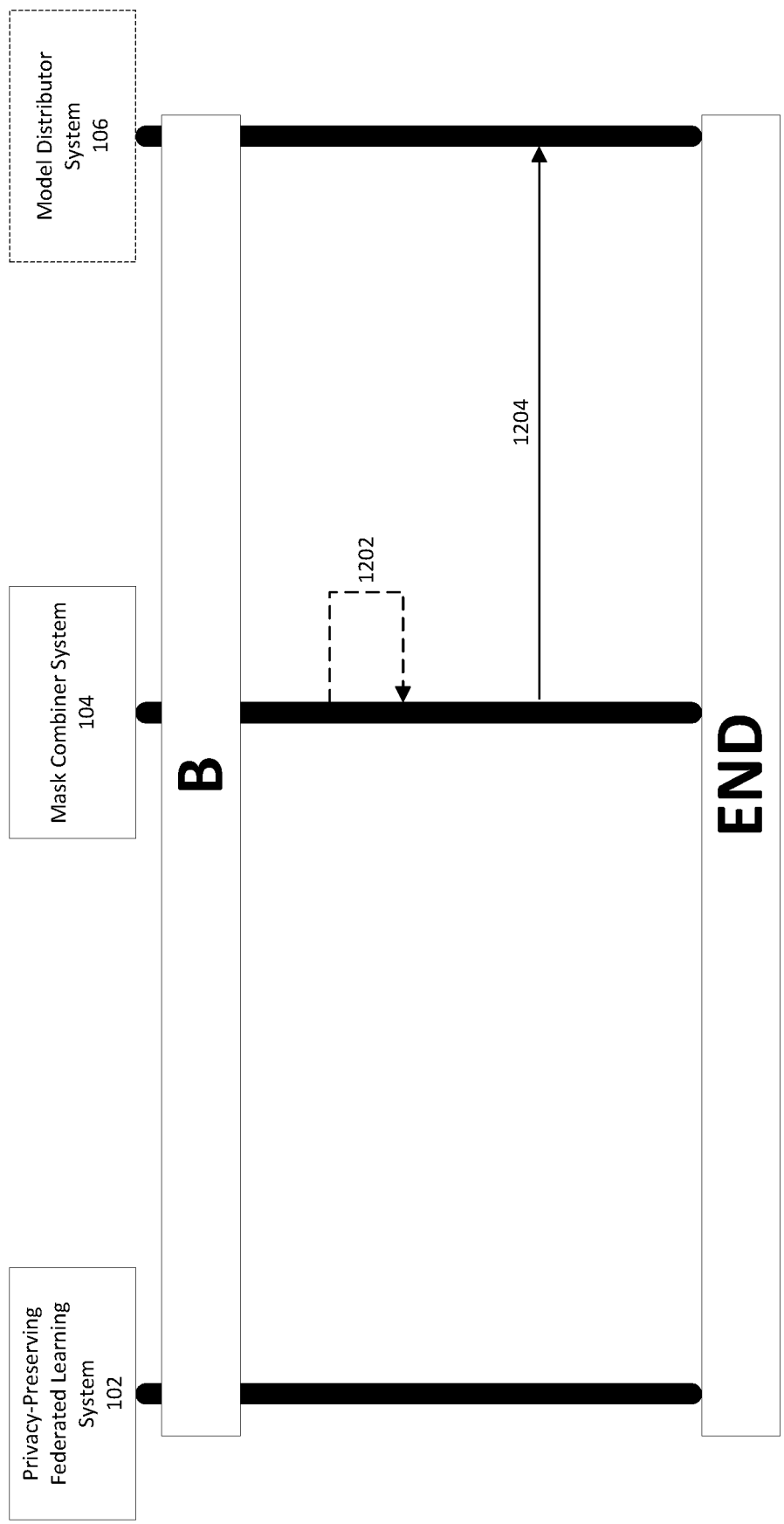
Figure 12B:
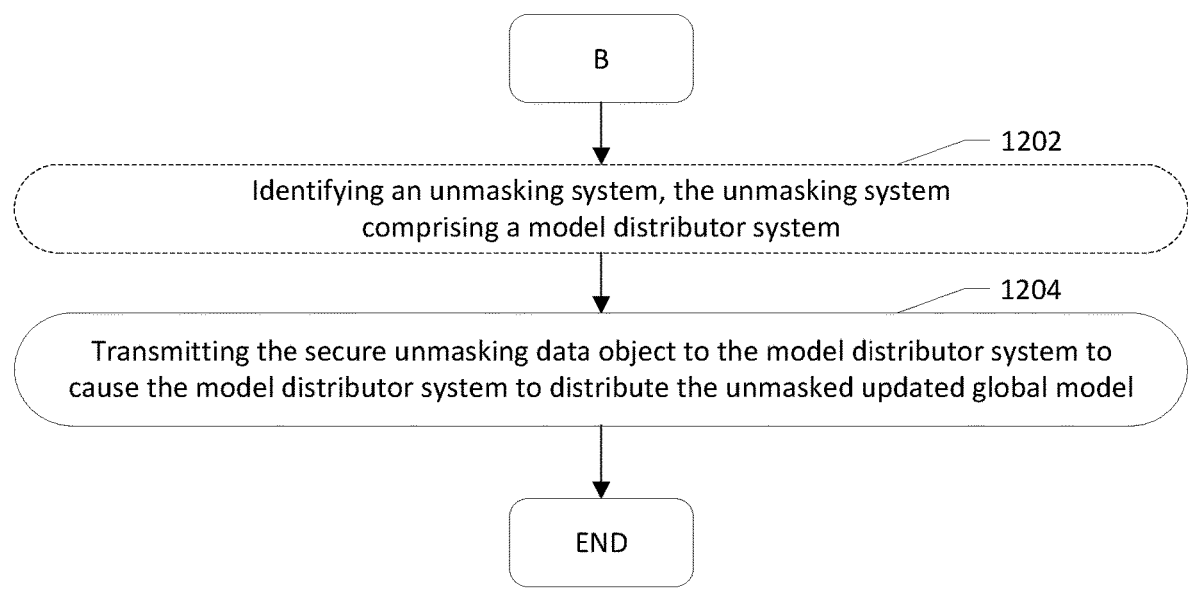
Figure 13B:
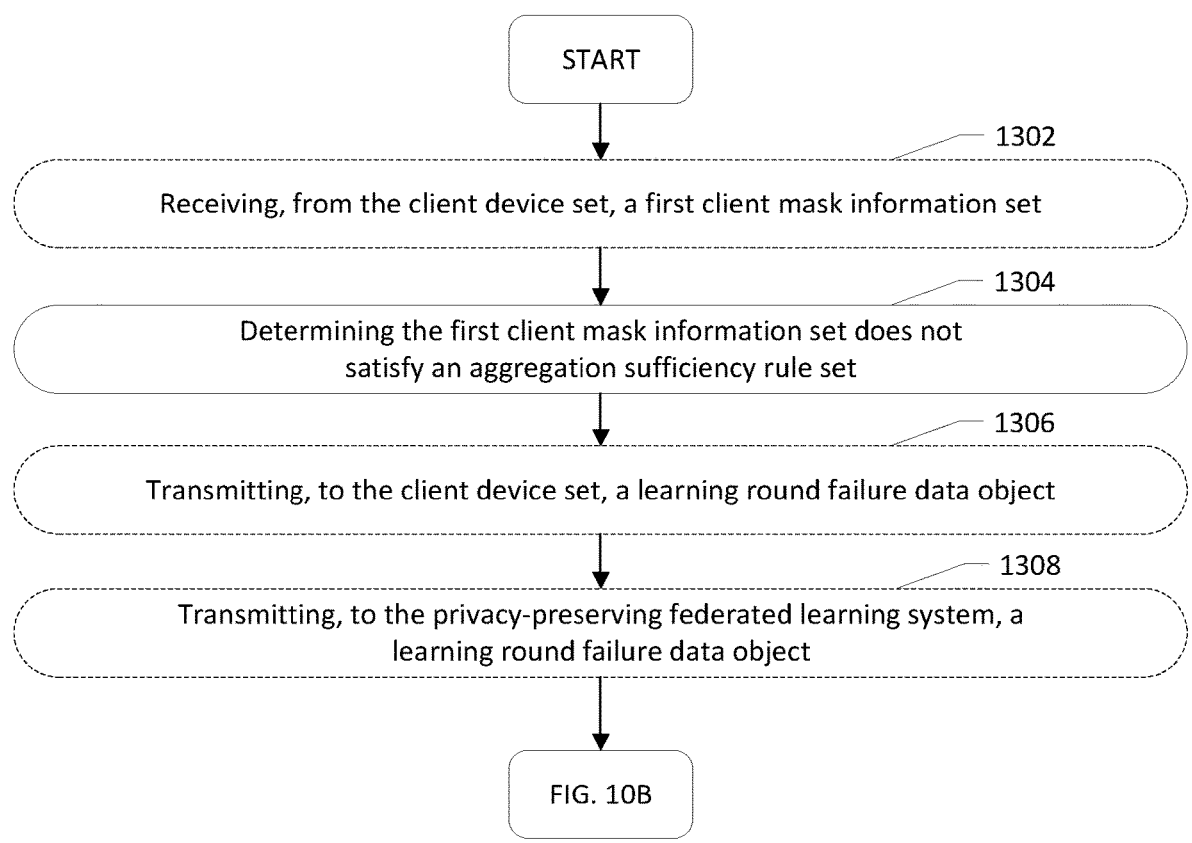
Figure 14B:
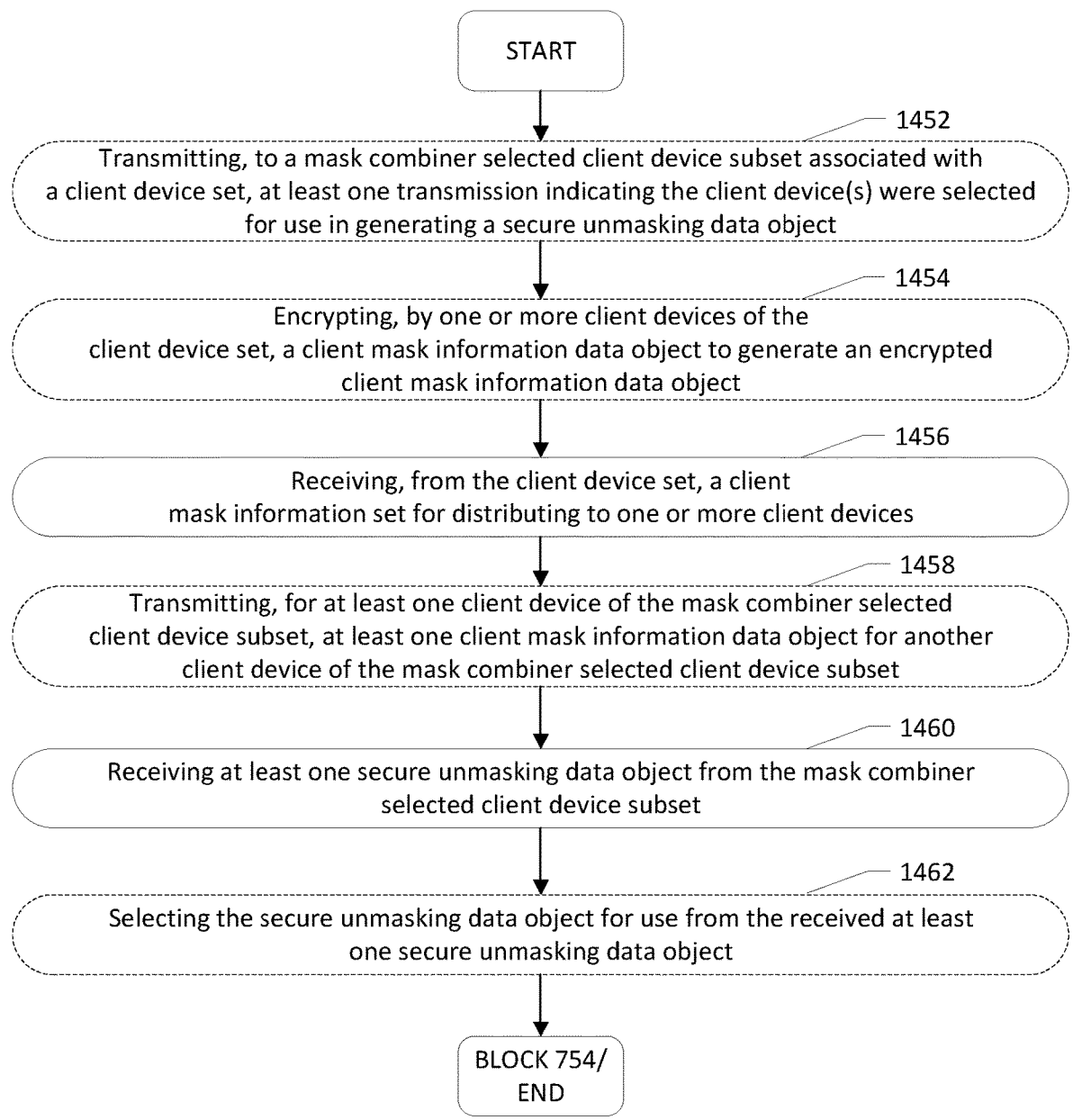

Having thus described the embodiments of the disclosure in general terms, reference now will be made to the accompanying drawings, which are not necessarily drawn to scale, and wherein:

FIG. 1A illustrates a block diagram of a system that may be specially configured within which embodiments of the present disclosure may operate;

FIG. 1B illustrates a block diagram of another system that may be specially configured within which embodiments of the present disclosure may operate;

FIG. 1C illustrates a block diagram of another system that may be specially configured within which embodiments of the present disclosure may operate;

FIG. 2 illustrates a block diagram of an example apparatus that may be specially configured in accordance with an example embodiment of the present disclosure;

FIG. 3 illustrates a block diagram of another example apparatus that may be specially configured in accordance with an example embodiment of the present disclosure;

FIG. 4 illustrates a block diagram of an example apparatus that may be specially configured in accordance with an example embodiment of the present disclosure;

FIG. 5A illustrates an example computing environment and data topology for generating a masked updated global model, in accordance with at least one example embodiment of the present disclosure;

FIG. 5B illustrates yet another example computing environment and data topology for generating a secure unmasking data object, in accordance with at least one example embodiment of the present disclosure;

FIG. 6A illustrates an example data flow diagram of an example process for privacy-preserving federated learning, in accordance with at least one example embodiment of the present disclosure;

FIG. 6B illustrates an example flowchart of the data flow operations the example process for privacy-preserving federated learning, as depicted in FIG. 6A, in accordance with at least some example embodiments of the present disclosure;

FIG. 6C illustrates an example subprocess for selecting an aggregation masked model set from the masked client model set, in accordance with at least one example embodiment of the present disclosure;

FIG. 7A illustrates an example data flow diagram of additional operations for an example process for privacy-preserving federated learning, in accordance with at least one example embodiment of the present disclosure;

FIG. 7B illustrates an example flowchart of the data flow operations the example process for privacy-preserving federated learning, as depicted in FIG. 7A, in accordance with at least some example embodiments of the present disclosure;

FIG. 8A illustrates another example data flow diagram of additional operations for an example process for privacy-preserving federated learning, in accordance with at least one example embodiment of the present disclosure;

FIG. 8B illustrates an example flowchart of the data flow operations the example process for privacy-preserving federated learning, as depicted in FIG. 8A, in accordance with at least some example embodiments of the present disclosure;

FIG. 9A illustrates another example data flow diagram of additional operations for an example process for privacy-preserving federated learning, in accordance with at least one example embodiment of the present disclosure;

FIG. 9B illustrates an example flowchart of the data flow operations the example process for privacy-preserving federated learning, as depicted in FIG. 9A, in accordance with at least some example embodiments of the present disclosure;

FIG. 10A illustrates an example data flow diagram of an example process for privacy-preserving federated learning, in accordance with at least one example embodiment of the present disclosure;

FIG. 10B illustrates an example flowchart of the data flow operations the example process for privacy-preserving federated learning, as depicted in FIG. 10A, in accordance with at least some example embodiments of the present disclosure;

FIG. 10C illustrates an example subprocess for generating a secure unmasking data object based on at least the received client mask information set, in accordance with at least one example embodiment of the present disclosure;

FIG. 11A illustrates an example data flow diagram of additional operations for an example process for privacy-preserving federated learning, in accordance with at least one example embodiment of the present disclosure;

FIG. 11B illustrates an example flowchart of the data flow operations the example process for privacy-preserving federated learning, as depicted in FIG. 11A, in accordance with at least some example embodiments of the present disclosure;

FIG. 12A illustrates another example data flow diagram of additional operations for an example process for privacy-preserving federated learning, in accordance with at least one example embodiment of the present disclosure;

FIG. 12B illustrates an example flowchart of the data flow operations the example process for privacy-preserving federated learning, as depicted in FIG. 12A, in accordance with at least some example embodiments of the present disclosure;

FIG. 13A illustrates another example data flow diagram of additional operations for an example process for privacy-preserving federated learning, in accordance with at least one example embodiment of the present disclosure;

FIG. 13B illustrates an example flowchart of the data flow operations the example process for privacy-preserving federated learning, as depicted in FIG. 13A, in accordance with at least some example embodiments of the present disclosure;

FIG. 14A illustrates an example data flow diagram of additional operations for an example process for privacy-preserving federated learning, specifically in a context where a mask combiner system is embodied by one or more client device(s), in accordance with at least one example embodiment of the present disclosure; and FIG. 14B illustrates an example flowchart of the data flow operations the example process for privacy-preserving federated learning, as depicted in FIG. 14A, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Federated learning involves generating a single, updated global model from any number of client machine learning models. Each of the client model may be associated with a different client device, for example where each client device individually trains and/or maintains a corresponding client model. During a round of privacy-preserving federated learning, any number of client models may be combined, or otherwise "aggregated," into a single, updated global model. The updated global model may be distributed to replace each of the client models for each client device. In this regard, using multiple client models enables the client devices to train their client model using its own data and without directly exposing the data used in the training. At the same time, the updated global model may be generated based on data values learned from each of the client models, such that patterns, trends, and other learned information from any of the client models may be reflected in the updated global model. Once distributed, a client device may accept the updated global model as its new client model, and proceed to locally train the updated global model local to the client device, for example for further training as new data is collected or otherwise becomes available. Accordingly, this cycle may continue for any number of federated learning rounds, for example for as many federated learning rounds as desired or determined as appropriate by a computing system.

To perform the combination of multiple client models, the client models may each be transmitted to a central computing system configured to generate the updated global model (for example, by aggregating the multiple received client models). Such a setup may prevent the centralized computing system from having access to the data utilized to train each client model, thus improving data privacy and preventing the centralized computing system from accessing personally identifiable information and/or other sensitive data that may be used in training each client model. However, such traditional implementations of federated learning do not prevent indirect assumptions, inferences, and/or statistical assertions from being generated by the true data values embodying the client models themselves. For example, a client model may indicate that men from a particular geographic area have a higher likelihood of developing a particular disease. In this regard, although each client model may not explicitly include personally identifiable information and/or other sensitive data, the client model may nevertheless be deemed to represent personally identifiable information or other sensitive data. Similarly, a global model may also be deemed to represent personally identifiable information, or other sensitive data, due to inferences and/or other assumptions that may be derived from the combination of each client model.

While such classifications as personally identifiable and/or sensitive may not pose a problem in the abstract, real-world implications of such classifications can be extreme. In view of different regulatory landscapes, business promises, and/or the like, personally identifiable information and/or sensitive data is often required to be treated in certain stringent manners, with certain required security frameworks in place, and/or with various other requirements. Violation of such requirements may result in significant fines and/or other legal recourse, and may require significant revamping of internal computing systems to account for the data privacy requirements.

Traditional implementations for avoiding such classifications as personally identifiable information and/or other sensitive data have proven ineffective. For example, anonymizing and/or generalizing training data has often been utilized in attempts to avoid labels as personally identifiable information. However, anonymizing data has significant consequences by rapidly diminishing the accuracy of machine learning models developed therefrom. The accuracy of models drops off considerably as data is anonymized and/or generalized, and continues to drop off rapidly as the level of generality increases, thus resulting in local and global models that are statistically ineffective or, in some cases, completely unusable. Additionally, even in such implementations, inferences may be drawn from the models developed therefrom, nevertheless leading to a characterization as personally identifiable and/or sensitive. In other implementations, synthetic data is generated and/or utilized at the client model level, but nevertheless such information may be deemed personally identifiable or sensitive due to inferences that may be drawn from the client models and/or global model. Furthermore, synthetic data implementations have proven ineffective for certain types of learning, such as dynamic learning, and ineffective for certain machine learning tasks, such as rare-event detection (e.g., anomaly detection at an airport security checkpoint).

Embodiments of the present disclosure provide privacy-preserving federated learning. In this regard, masks are utilized to cryptographically obfuscate the data values embodying a client model by generating a masked client model. The masked client model may maintain the properties of combinability for purposes of federated learning, but until unmasking occurs, each of the data values appears to be totally random. The client mask information that was used to generate each masked client model may be transmitted to a mask combiner system—for example embodied by one or more system(s) controlled by the owner (e.g., IP rights holder and/or privacy rights holder) of the AI project or a platform provider, and/or embodied by any number of client devices configured for interaction with a privacy-preserving federated learning system. Additionally or alternatively, in some example embodiments, the masked client model(s) are transmitted to a privacy-preserving federated learning system for combining. In this regard, the privacy-preserving federated learning system may receive any number of masked client models, but due to the masked nature of the model, has no way to determine what each value represents or any inferences, patterns, or the like to be drawn therefrom. To provide additional data privacy, each client device may communicate under an alias such that possible data inferences based on knowledge about a particular client device, or can be avoided across multiple rounds of learning by altering an alias for one or more rounds of federated learning. In some example embodiments where the mask combiner system is embodied by one or more client device(s) of a client device set, the privacy-preserving federated learning system is configured to select one or more client device(s) for use in mask combining, and/or select one or more other clients for use in generating a masked updated global model, in a round of privacy-preserving federated learning, for example to improve the resiliency of the system to actions by client device(s) and/or other systems attempting to act maliciously by causing errors in processing via the system.

The masked client models are nevertheless cryptographically preserved such that the privacy-preserving federated learning system may generate an updated masked global model from the received masked client models. In this regard, the privacy-preserving federated learning system may select all, or a subset, of the received masked client models to be used in the current round of generating the updated global model. As with the data values for each masked client model, the data values embodying the masked updated global model similarly obfuscate what the updated global model truly represents. The privacy-preserving federated learning system may communicate information associated with and/or identifying the client devices (or more particularly, the masked client models) used to generate the current updated masked global model. With such information, the mask combiner system may utilize the received masking information for such client devices to generate secure unmasking data utilized for unmasking the masked updated global model, for example based on the combination of the masking information used to mask the individual client models.

The generated secure unmasking data may thus be delivered to the appropriate system for unmasking the masked updated global model for distribution and/or use. In this regard, neither the privacy-preserving federated learning system nor the mask combiner system (or any client devices embodying the mask combiner system) has access to the true values for the masked client model(s) and/or the masked updated global model without the cooperation with the other system, as the privacy-preserving federated learning system lacks the "key" to unlocking the masked updated global model, and the mask combiner system lacks the actual masked updated global model itself. As such, these data objects may be transmitted to the appropriate system responsible for unmasking the masked updated global model, and/or utilizing the unmasked updated global model and/or distributing the unmasked updated global model to the client devices. In this regard, in at least one example context, embodiments of the present disclosure are specially configured to ensure that intermediary systems never have access to the true values embodying the unmasked global model unless intended for such purposes, such that the unmasking is performed in a particular environment in which the data privacy rights in the global model should reside and be protected.

Embodiments here provide numerous advantages over implementations of conventional federated learning. In one example context, example embodiments enable federated learning in a manner that ensures sensitive data is not exposed to systems not intended for such exposure. Further, example embodiments provide such privacy-preserving federated learning without diminishing the accuracy of resulting global models. Additionally or alternatively, example embodiments described herein are configurable to enable the data flow between various environments, systems, devices, and/or the like, to meet specific use cases and/or customer-based needs. In circumstances where a user environment and a participant environment are to be separated, and the user environment is further not to be exposed to sensitive data, additional data privacy implementations may be utilized to secure communications and/or data transmitted between the user environment (e.g., a mask combiner system) and participant environment (e.g., client device(s)) based on known data privacy algorithms and/or methodologies. Additionally or alternatively, example embodiments enable privacy-preserving federated learning in circumstances where the user environment is the same as the environment of the privacy-preserving federated learning system (e.g., in a circumstance where a company runs a voice assistant application with its customers, but also provides the federated learning system). Further, in this regard, the embodiments described herein enable data privacy to be maintained for any distribution of user environment and participant environment (e.g., fully disjoint, partially disjoint, or entirely contained) in communication with a privacy-preserving federated learning system.

Additionally or alternatively, embodiments provided herein rely on aggregating masked client models, which are client models that have been masked utilizing a particular masking process that retains the cryptographic—and/or algebraic—properties of the client masks for aggregation. In this regard, the masked client models may be aggregated without corrupting the data values associated therewith, but while retaining the obfuscation provided by the masks. Some such embodiments rely on the requirement of utilizing a secure masking data object that may be used to remove the mask from the masked updated global model. The secure masking data object, in this regard, functions as "secret" data that—if not known—removes all means reasonably likely to unmask the masked updated global model other than having access to a corresponding secure unmasking data object.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "privacy-preserving federated learning system" refers to one or more computing systems, embodied in software, hardware, firmware, and/or a combination thereof, for generating a masked updated global model from a masked client model set. In some embodiments, the privacy-preserving federated learning system is configured to generate the masked updated global model without the requisite information to unmask the masked updated global model, unless provided by one or more additional transmissions, for example by a mask combiner system and/or one or more client device(s) selected for the round of privacy-preserving federated learning. In some embodiments, the privacy-preserving federated learning system is uniquely identified by a "privacy-preserving federated learning system identifier," which may embody a pseudonym, randomized identifier, system identifier, network identifier, or any combination thereof, uniquely identifying the privacy-preserving federated learning system. In some embodiments, the privacy-preserving federated learning system identifier persists for any number of rounds of federated learning. For example, in various example contexts, the privacy-preserving federated learning system identifier persists for all rounds privacy-preserving federated learning for all AI projects, persists for all rounds of a particular AI project (e.g., such that the identifier changes across various AI projects), and/or persists only for a desired number of rounds for a given AI project (e.g., the identifier is regenerated after each round, after 2 rounds, after 5 rounds, or after X rounds for any number of rounds).

The term "client model" refers to a machine learning model stored on and/or otherwise managed by a client device. In an example context, the client model is trained, or at least partially trained, based on client data collected by, maintained by, and/or otherwise accessible to the client device. In this regard, it should be appreciated that, in at least some embodiments, each client device maintains its own client model and/or corresponding client data. The term "client model set" refers to zero or more client models associated with zero or more client devices in a client device set. In some embodiments, each client model in a client model set is associated with exactly one client device of a client device set (for example, client model A is associated with client device A, client model B is associated with client device B, and so on).

The term "masked client model" refers to a client model having some, or all, of the true data values embodying the client model obfuscated using at least one data masking process, such that the true data values embodying the client model are computationally impossible, or sufficiently difficult, to determine without client mask information used in the data masking process. In some embodiments, a masked client model is generated from a client model by applying at least one algorithmic masking process to the model. The term "masked client model set" refers to zero or more masked client models associated with zero or mode client devices in a client device set. In some embodiments, each masked client model in a masked client model set is associated with exactly one client device of a client device set (for example, masked client model A is associated with client model A is associated with client device A, masked client model B is associated with client model B is associated with client device B, and so on).

The term "aggregation masked model set" refers to a masked client model set, or a subset thereof, received by a privacy-preserving federated learning system and selected by the privacy-preserving federated learning system for use in generating a masked updated global model.

The term "masked client model request" refers to electronically managed data, transmitted by a privacy-preserving federated learning system to at least one client device, representing a request for a masked client model from one or more client device(s). In at least one example context, a masked client model request is transmitted to each client device selected for use in a round of privacy-preserving federated learning. In some embodiments, the masked client model request is embodied by one or more generic values published by the privacy-preserving federated learning system to one or more client device(s) of a client device set, where each client device may non-interactively and autonomously determine whether the masked client model request indicates the client device was selected for use in a round of privacy-preserving federated learning. Additionally or alternatively, in some embodiments, each client device that determines, based on at least the masked client model request, it has been selected for a round of privacy-preserving federated learning may utilize the masked client model request to authenticate, via communication with the privacy-preserving federated learning system, that the client device was indeed selected. In some embodiments, a masked client model is received from the client device in response to the masked client model request.

The term "selected device identifier" refers to an electronically managed data object representing at least one client device identifier for at least one client device corresponding to an aggregation masked model set selected by a privacy-preserving federated learning system for use in generating a masked updated global model.

The term "client device" refers to one or more computing devices controlled by a participant entity, including a human user, business, or other entity, configured to maintain and/or access a trained, or partially trained, machine learning model embodying a client data model. In some embodiments, a client device includes, or is otherwise configured for accessing, one or more datastores configured for storing client data for use in training a client data model. The term "client device set" refers to zero or more client devices. In some embodiments, the term "client device set" refers to any number of client devices in communication with a privacy-preserving federated learning system, mask combiner system, and/or model distributor system. In some embodiments, some or all of a client device set is associated with one or more other systems, such as a mask combiner system and/or model distributor system, such that all such systems and/or devices are controlled by a single shared entity. Non-limiting examples of a client device include any number of servers, personal computers, smartphone, tablet, smart home device, Internet-of-Things enabled device, personal digital assistant, laptop, and/or the like.

The term "client device identifier" refers to an electronically managed data object that uniquely identifies a client device. In at least one example context, a client device identifier is utilized by a privacy-preserving federated learning system, mask combiner system, and/or model distributor system to uniquely identify the client device. In some embodiments, a client device identifier embodies, and/or partially includes, one or more network identifiers, device identifiers, pseudonyms, randomized data, cryptographic credentials, and/or system identifiers associated with the client device. The term "client device identifier set" refers to an electronically managed data object including zero or more client device identifiers for a client device set. In some embodiments, each client device identifier in a client device identifier set is associated with exactly one client device of a client device set (for example, client device A is associated with client device identifier A, client device B is associated with client device identifier B, and so on). The term "client device identifier set" refers to an electronically managed data object embodying any number of client device identifier(s). In some embodiments, client device identifiers are certified by a trusted authority (e.g., the entity that controls and/or owns the AI project associated with the federated learning system, for example a service provider) such that one or more systems and/or devices, such as the privacy-preserving federated learning system, is configured to receive and/or identify the client device identifiers once a round of privacy-preserving federated learning commences. In some embodiments, the mask combiner system is embodied by one or more client device(s), and the client device identifier(s) for those client device(s) are shared, by the privacy-preserving federated learning system, with those client device(s) that are selected to participate in the current round of privacy-preserving federated learning. In some embodiments, such sharing of client device identifier(s) is facilitated through the privacy-preserving federated learning system without compromising security and privacy of this shared information. In some embodiments, client device identifiers for one or more client device(s) may persist across various user cases of federated learning such that a client device has the same client device identifier for all rounds of privacy-preserving federated learning for any number of AI projects, may persist for a sole use case such that a client device has the same client identifier for all rounds of privacy-preserving federated learning for a specific AI project but may have different client identifier(s) for other AI projects, and/or may persist only for a set number of rounds for a specific AI project (such that a new set of client device identifier(s) are generated for after the desired number of rounds of privacy-preserving federated learning, such as after every round, every 2 rounds, every 5 rounds, or otherwise after every X rounds of any number).

The term "anonymized device identifier" refers to a client device identifier that functions as an alias for the client device without exposing a permanent identifier associated with the client device (e.g., a network identifier, device identifier, and/or the like. For example in some embodiments an anonymized device identifier is embodied by randomly generated data, and/or semi-random data, or a sequence based on an order in which data is received from a client device (e.g., the first client from which data is received is client A, the next is client B, and so on).

The term "masked updated global model" refers to an updated machine learning model generated by a privacy-preserving federated learning system based at least on combination of a masked client models from a masked client model set, such as an aggregation model set selected by the privacy-preserving federated learning system. The masked updated global model is generated such that, with requisite data embodied by a secure unmasking data object, the masked updated global model can be unmasked for use. In this regard, the masked updated global model is generated such that the underlying data values embodying each masked client model are not exposed to the privacy-preserving federated learning system, and the underlying data values embodying the masked updated global model are not exposed to the privacy-preserving federated learning system. In this regard, the masked updated global model reflects model parameters with what appears to be random data, but can be unmasked to expose an unmasked global data model representing the true data values for each of the parameters embodying the properly updated global model.

The term "unmasked updated global model" refers to an updated global model embodied by data values for parameters that reflect the true data values for such parameters, such that the unmasked updated global model is usable for one or more machine learning actions. In some embodiments, the privacy-preserving federated learning system is configured to terminate, and/or otherwise abort, a round of federated learning in a circumstance where the unmasked updated global model may contain personally identifiable information and/or otherwise sensitive information. For example, in at least one example context, the privacy-preserving federated learning system would not aggregate only two masked client models into a masked updated global model for subsequent unmasking, as the owner of one client model(s) could then reconstruct the other from the unmasked updated global model.

The term "mask combiner system" refers to one or more computing systems configured at least for generating a secure unmasking data object from a set of data including one or more data objects embodying client mask information associated with a client device set comprising one or more client devices. In some embodiments, a mask combiner system is embodied by one or more client device(s) of a client device set, for example a set of client device(s) selected by the privacy-preserving federated learning system for use in generating a secure unmasking data object in a round of federated learning. In at least some embodiments, a mask combiner system is configured for communication with a client device set for receiving client mask information from each of the client devices, and a privacy-preserving federated learning system for receiving a selected client model indicator. In at least some embodiments, a mask combiner system is configured for communication with a privacy-preserving federated learning system, and/or a model distributor system, for transmitting a generated secured unmasking data object for use in unmasking a masked updated global model. In some embodiments, a mask combiner system, or each component embodying a mask combiner there (e.g., each client device selected for use in mask combining) is uniquely identified by a "mask combiner system identifier," which may embody a pseudonym, randomized identifier, system identifier, network identifier, or any combination thereof, uniquely identifying the mask combiner system and/or component thereof.

The term "selected client model indicator" refers to an electronically managed data object, generated by a privacy-preserving federated learning system, representing one or more masked client models of an aggregation masked model set selected for use in generating a masked updated global model, and/or representing one or more client device identifiers associated with client devices corresponding to an aggregation masked model set. In this regard, the selected client model indicator represents the client device identifiers selected by a privacy-preserving federated learning system for use in generating a masked updated data model.

The term "model quality metric data object" refers to an electronically managed data object representing a determined error rate, suitability factor, and/or other accuracy rate for a masked client model. For example, in some embodiments, a model quality metric data object refers to an electronically managed data value for an F1 score associated with the masked client model. In at least some embodiments, a privacy-preserving federated learning system and/or mask combiner system is configured to verify the trustworthiness of one or more model quality metric data object(s), for example using one or more machine learning, artificial intelligence, and/or statistical analysis methodologies.

The term "model quality metric set" refers to an electronically managed data object representing zero or more model quality metric data objects. In some embodiments, each model quality metric data object in a model quality metric set is associated with exactly one masked client data model of a masked client model set (for example, masked client model A is associated with model quality metric data object A, masked client model B is associated with model quality metric data object B, and so on).

The term "aggregation sufficiency rule set" refers to electronically managed data representing one or more algorithms, procedures, and/or computer-implemented processes for determining whether an aggregation masked model set includes masked client data models sufficient to meet one or more thresholds, for example an accuracy threshold and/or privacy threshold or to meet system requirements that ensure the unmasked updated global model does not contain personally identifiable information and/or otherwise sensitive data.

The term "secure unmasking data object" refers to an electronically managed data object, generated by a mask combiner system, usable to unmask a masked updated global model to generate an unmasked updated global model. In this regard, in some embodiments, the secure unmasking data object represents one or more data objects, or a combination of one or more data objects, for use in performing an unmasking process performed by a mask combiner system embodied by a dedicated system and/or one or more client device(s), as described herein.

The term "model distributor system" refers to one or more computing systems configured for distributing an unmasked updated global model to a client device set for use and/or further training, and/or for use in decision support system(s) via model inference. In some embodiments, a mask combiner system and a model distributor system are both controlled by a single shared entity.

The term "client mask information data object" refers to one or more data values utilized by a client device to mask a client model to generate a corresponding masked client model. The term "client mask information set" refers to an electronically managed data object including zero or more client mask information data objects for a client device set.

In some embodiments, each client mask information data object in a client mask information set is associated with exactly one client device of a client device set (for example, client device A is associated with client mask information data object A, client device B is associated with client mask information data object B, and so on).

The term "unmasking system" refers to one or more computing systems configured for unmasking a masked updated global model using a secure unmasking data object received from a mask combiner system. In some embodiments, an unmasking system refers to a privacy-preserving federated learning system. In some embodiments, an unmasking system refers to a model distributor system. In some embodiments, a mask combiner system is configured to identify an unmasking system to be used. In some embodiments, the unmasking system is configured to receive more than one secure unmasking data object to perform an unmasking process, and may select a secure unmasking data object for use based on one or more contextual information processing algorithms, electronically-implemented business rules, and/or other algorithms. To reduce the effects of malicious actor(s), in some embodiments where the mask combiner system is embodied by one or more client device(s), each of a plurality of client device(s) may generate a secure unmasking data object, and the secure unmasking data object may be selected based on having a value that was returned most often and/or satisfying one or more other computer-implemented business rules.

The term "learning round failure data object" refers to electronically managed data indicating that a current round of privacy-preserving federated learning has been, or is being, aborted in response to one or more determinations. In some embodiments, the learning round failure data object is configured to cause a system receiving the learning round failure data object to restart one or more processes for performing a round of privacy-preserving federated learning.

The term "randomized element data object" refers to at least one electronically managed data value of one example client mask information data object that is randomly data generated by a client device for use in masking a client model to generate a masked client model. In at least one example embodiment, knowledge of such a randomized element data object is sufficient for reproducing the value of a secure mask applied to generate a masked client model, allowing the secure masks for one or more client model(s) to be more efficiently communicated through transmission of the corresponding randomized element data object(s). In some embodiments, the randomized element data object comprises a random bit string of a predetermined and/or agreed upon length that it utilized as a random seed for a pseudorandom number generator. In this regard, various systems, such as a privacy-preserving federated learning system, mask combiner system, model distributor system, and/or client device(s), are each configured to utilize the same pseudorandom number generator such that the seed is deterministic for expanding the seed to a random vector that serves as a mask for client model. In some such embodiments, it should be appreciated that by sharing only the randomized element data object from a client device to a recipient system preconfigured with the pseudorandom number generator, the recipient system is able to expand the randomized element data object to the same random vector utilized to mask the client model of maintained by the client device.

The term "additional element data object" refers to at least one additional electronically managed data value of one example client mask information data object that is used by a client device for masking a client model to generate a masked client model, and that is configured to be shared with and/or otherwise known by (e.g., shared knowledge) one or more associated systems, such as a federated learning system and/or one or more devices embodying a mask combiner system. The additional element data object may satisfy one or more thresholds for ensuring the masked client model is secured to a desired level of certainty (e.g., computationally impossible to calculate without all components). In some embodiments, an additional element data object represents a natural number, for example above a minimum numerical threshold. Alternatively or additionally, in some embodiments, an additional element data object represents a number utilized for performing one or more modulo operations while masking the client model. Alternatively or additionally, in some embodiments, the additional element data object represents a character, string, and/or other data type. Additionally or alternatively still, in some embodiments, an additional element data object represents a prime number above a minimum prime threshold.

The term "datastore" refers to one or more computing devices configured for storing one or more data values associated with information to be used for retrieving the data values. In some embodiments, a datastore is configured to store data values as one or more records, with each data value corresponding to a data parameter within the data record, such that the data record is retrievable using one or more data keys. Non-limiting examples of a datastore include a local memory device, network attached storage device, remote or "cloud" database, data lake, software-enabled database, and/or any combination thereof.

The term "computationally impossible" refers to a length of time required to calculate one or more data values that is above a desired time interval threshold, is greater than a length of time before which one or more secure data values used in a computation is changed, or otherwise represents an unreasonable length of time. In some contexts, "computationally impossible" additionally or alternatively refers to a length of time such that after the length of time security and/or privacy of the processed, and/or stored data, is no longer required.

Example System Implementations

FIGS. 1A and 1B each illustrate example computing systems in which embodiments of the present disclosure may operate, in accordance with at least some embodiments of the present disclosure. Specifically, FIG. 1A depicts an example computing system 100. The example computing system 100 includes client devices 108A-108N (collectively "client device set 108"), a mask combiner system 104, a model distributor system 106, and a privacy-preserving distributed learning system 102. As illustrated, the computing system 100 includes a first communications network 110 and a second communications network 112.

Each of the client devices in the client device set 108 may be embodied by any number of computing devices. Each client device of the client device set 108 is configured to generate and/or otherwise maintain one or more client model(s). Each client model may embody a machine learning model configured for a particular purpose, for example for use in accordance with a particular machine learning task. In this regard, each client device of the client device set 108 may be configured to collect, transmit, store, and/or access, various data used for training the client model. In at least one example embodiment, one or more client device(s)

of the client device set 108 comprises an edge device, such as a user device, associated with one or more users. In some other embodiments, one or more client device(s) of the client device set 108 embodies one or more servers further associated with one or more user devices (e.g., a server configured to collect data from the user device(s) for processing). The client device(s) of the client device set 108 may each generate, configure, and/or otherwise maintain a client model based on data collected by and/or otherwise accessible to the client device.

The mask combiner system 104 may be embodied by any number of computing devices, including one or more client devices and/or one or more server(s), terminals, and/or standalone systems, configured for receiving client mask information data object(s), generating a secure unmasking data object based on the received client mask information data object(s), and/or transmitting the secure unmasking data object to an identified system for unmasking a masked updated global model. In some embodiments, the mask combiner system 104 is embodied by one or more servers and/or datastores, which may be configured in communication with one another to provide such functionality. For example, in at least one such example context, the mask combiner system 104 is embodied by at least one server comprising at least one processor and at least one non-transitory memory having computer-coded instructions for performing such functionality as described herein, and at least one datastore to store data utilized, received, and/or otherwise generated by the server in providing such functionality. In some such embodiments, the datastore is directly controlled by the server, and/or may share one or more software, hardware, and/or firmware components with the server. The mask combiner system 104 may communicate with one or more other devices to provide such functionality, for example with the privacy-preserving federated learning system 102, model distributor system 106, and/or the client device set 108.

The model distributor system 106 may be embodied by one or more computing devices. For example, in some embodiments, the model distributor system 106 comprises at least a server and/or a datastore, which may each be embodied in hardware, software, firmware, and/or a combination thereof. In some such embodiments, the server is specially configured, via hardware, software, firmware, and/or a combination thereof, to provide the functionality described herein. Additionally or alternatively, in some embodiments, the datastore is configured to provide data storage, maintenance, and/or retrieval functionality. For example, in at least one embodiment, the datastore may be configured to store a last received updated global model, identification and/or connection information for communicating with the client device set 108 and/or privacy-preserving federated learning system 102.

The model distributor system 106 is configured for functionality associated with distributing an unmasked updated global model. In this regard, in at least some embodiments, the model distributor system 106 is configured for receiving an updated global model, for example a masked updated global model and/or an unmasked updated global model. Additionally or alternatively, in at least one example context where the model distributor system 106 receives a masked updated global model, the model distributor system 106 is configured to receive a secure unmasking data object and/or utilize the secure unmasking data object for generating an unmasked updated global model for distribution. Additionally or alternatively still, in some embodiments, the model distributor system 106 is configured to distribute an unmasked updated global model to one or more other devices, for example to the client device set 108.

In some embodiments, for example as illustrated, the mask combiner system 104 and the model distributor system 106 are each controlled in a shared user environment, for example user environment 114. The user environment 114 may be controlled and/or owned by a single entity, for example a single user, organization, group, and/or the like, such that the data systems therein are considered jointly controlled by said singly entity. For example, in some embodiments, the mask combiner system 104 and the model distributor system 106 are embodied within the same computing system (e.g., a single server or combination of servers and/or other computing hardware). In other embodiments, the mask combiner system 104 and the model distributor system 106 are embodied share one or more computing devices, are embodied by the same subsystem of one or more computing device(s), and/or each embody distinct sub-systems of a shared computing device. In this regard, the client device set 108 may represent one or more different environments (e.g., a participant environment), and the privacy-preserving federated learning system 102 may represent another environment (e.g., a software-as-a-service environment) controlled by other entities, and/or physically located remote from the user environment 114.

In one example context, the participant environments embodied by one or more client devices of client device set 108 are entirely disjoint from the user environment embodying at least the mask combiner system 104. In this regard, a user controlling a client device may be in some form of normal commercial relationship with the entity controlling at least the mask combiner system 104. A client device controlled by a user ("participant environment"), for example a smart wristband with fitness capabilities, may generate biometric data via the client device. A health services app provider may be restricted from processing such biometric data on one or more centralized servers ("user environment") for example for training and/or utilizing one or more machine learning models. Accordingly, the health services app provider may provide hardware, firmware, and/or software to the client device to configure each client device to maintain a client model local to the client device. In this regard, the participant environment and user environment remain disjoint, such that the entity controlling the user environment may also not gain access to the biometric data, and/or inferences derivable therefrom, during privacy-preserving federated learning as described herein. Additionally, any third-party controlled systems, such as the privacy-preserving federated learning system, similarly cannot access such biometric data and/or inferences derivable therefrom within the client model(s) and/or generated global model, without additional permission from the user for configuring additional transmissions (e.g., transmission of a secure unmasking data object as described herein). In some such embodiments, an embodiment system may be configured such that one or more user environment systems are not enabled to access the data and/or information from which inferences may be derived therefrom, to restrict such access only to the client devices and/or associated systems for distribution of a global model, for example the model distributor system 106.

In another example context, the participant environment is entirely contained within, and/or otherwise embodied by, the user environment. For example, an entity controlling a large bank may control one or more servers ("user environment") configured for learning an AI model for each customer that learns from the personal interaction history between the customer and the bank, where each AI model is hosted on a bank-controlled server ("participant environment"). Accordingly, while each customer may represent a participant, the participant environment containing the data for the participant is entirely controlled by the bank on the banks servers, and not on any customer-controlled systems. In some such embodiments, an embodiment system may be configured such that one or more bank-controlled systems may be enabled to access the data and/or information derived therefrom, for example such that the bank may control the mask combiner system 104 and/or a model distributor system 106 for distributing unmasked updated global model(s).

In another example context, the participant environment partially overlaps with the user environment. For example, various client devices may embody smartphones, and/or other user devices, controlled by a user in a commercial relationship with a car insurance company. The user device may be configured to collect driving behavior data associated with the user. The car insurance company may control an AI model for each user, such that the AI model is trained based on the driving behavior data for the corresponding user. The car insurance company may control one or more servers ("user environment"), whereas some of the one or more servers maintain data and/or such AI models associated with the users ("participant environment 1"). However, the car insurance company may offer an opt-in program with a discount for the user to maintain, and run, such AI models on their user device for a discount ("participant environment 2"), as this reduces the required computational resources maintained by the car insurance company. As some users may opt-in, and others may not, the participant environment 1 may be contained with the user environment, while participant environment 2 may not. In some such embodiments, an embodiment system may be configured such that access to applicable data is maintained in accordance with the permissions based on the opt-in data for each user, for example such that the data associated with one or more client devices may be appropriately restricted from the user environment.

The privacy-preserving federated learning system 102 may be embodied by one or more computing devices. For example, in at least one embodiments, the privacy-preserving federated learning system 102 comprises at least one server and at least one datastore, which may each be embodied in hardware, software, firmware, and/or a combination thereof. In some embodiments, the server is specially configured, via hardware, software, firmware, and/or a combination thereof, to provide the functionality described herein. Additionally or alternatively, in some embodiments, the datastore is configured to provide data storage, maintenance, and/or retrieval functionality for the privacy-preserving federated learning system 102. For example, in at least one embodiment, the datastore may be configured to store received masked client model(s), associated client device identifier(s), generated and/or otherwise determined parameters associated with the received masked client models, generated masked updated global model(s), generated unmasked updated global model(s), communication information (e.g., for identifying and/or communicating with the mask combiner system 104, model distributor system 106, and/or the client device set 108), and/or the like.

In some embodiments, the privacy-preserving federated learning system 102 is configured for functionality associated with generating a masked updated global model. For example, in at least one example context, the privacy-preserving federated learning system 102 is configured to receive a masked client model set, for example from the client device set 108, for use in generating the masked updated global model. Additionally or alternatively, in at least some embodiments, the privacy-preserving federated learning system 102 is configured for selecting an aggregation model set for use in generating the masked updated global model from the masked client model set, and subsequently generating the masked updated global model. Alternatively or additionally, in some embodiments, the privacy-preserving federated learning system 102 is configured to communicate with the mask combiner system 104 for generating a corresponding secure unmasking data object to be used in unmasking the masked updated global model. Additionally or alternatively still, in some embodiments, the privacy-preserving federated learning system 102 is configured to distribute the updated global model either as the masked updated global model and/or as the unmasked updated global model after unmasking, for example by distributing through communication with the model distributor system 106. In other embodiments, the privacy-preserving federated learning system 102 is configured to perform one or more processes to determine the acceptability of received and/or selected masked client models for use in generating the masked updated global model, as described herein. In other embodiments, the privacy-preserving federated learning system 102 is configured to perform on or more processes to determine the acceptability of received secure unmasking data objects, such as in circumstances in which the mask combiner system is embodied by one or more client device(s) that may each send a secure unmasking data object to the privacy-preserving federated learning system 102. For example, the privacy-preserving federated learning system 102 may perform such process(es) to reduce or eliminate the possibility of malicious actors corrupting and/or negatively impacting the current round of privacy-preserving federated learning.

As illustrated, the various systems depicted may communicate in a myriad of ways. For example, in some embodiments, the privacy-preserving federated learning system 102 may communicate with the mask combiner system 104 and/or the model distributor system 106 over a first communications network 110. The first communications network 110 may embody any of a number of networks, base stations, relays, local networking devices, intermediate networking devices, and/or the like. For example, in at least one example embodiment, the communications network 110 is embodied by the Internet to enable the privacy-preserving federated learning system 102 to communicate with the mask combiner system 104 and/or model distributor system 106 using any of a myriad of known Internet communication protocols, for example HTTP(S). Similarly in this regard, the communications network 110 may be embodied in any number of public networks, private networks, and/or a combination thereof.

Similarly, the mask combiner system 104 and/or model distributor system 106 may communicate with the client device set 108 over a second communications network 112. In at least some embodiments, the second communications network 112 is embodied by the first communications network 112, and/or shares at least one sub-component thereof. For example, in at least some embodiments, the communications network 110 and the communications network 112 are both embodied by the Internet. However, in other embodiments, the communications network 110 and the communications network 112 may be entirely, and/or at least partially, distinct. For example, in some embodiments, the mask combiner system 104 and/or model distributor system 106 may be configured to communicate with one or more client device(s) of the client device set 108 over a private network, and/or over a hybrid network including private and public networking devices.

Additionally or alternatively, the mask combiner system 104 and the model distributor system 106 may be configured to communicate in a myriad of manners. For example, in some embodiments, the mask combiner system 104 and model distributor system 106 are configured for direct communication (e.g., wired with one another and/or embodied as sub-systems of a master system). Additionally or alternatively, in some embodiments, the mask combiner system 104 and the model distributor system 106 are configured to communicate over the communications network 110, the communications network 112, and/or a combination thereof. Additionally or alternatively still, in yet other embodiments, the mask combiner system 104 and the model distributor system 106 are configured to communicate over a third communications network.

Additionally or alternatively, the client devices 108 may be configured to enable communication with the privacy-preserving federated learning system 102. In some such embodiments, the privacy-preserving federated learning system 102 is configured to communicate with the client device(s) of the client device set 108 for providing client device identifier(s) and/or a privacy-preserving federated learning system identifier to enable future communication between the device(s) for the current round of privacy-preserving federated learning. Additionally or alternatively, in some embodiments, the privacy-preserving federated learning system 102 is configured to communicate with the client device set 108 for purposes of selecting one or more client device(s) to use in a current round of privacy-preserving federated learning, such as by transmitting a masked client model request to one or more client device(s). Additionally or alternatively still, the client device set 108 may be configured to communicate directly with the privacy-preserving federated learning system 102 to provide masked client model(s) for use in generating a masked updated global model, for example in response to receiving and/or successfully processing a masked client model request.

The client device set 108 and the privacy-preserving federated learning system 102 may be configured to communicate in a myriad of manners. For example, in some embodiments, the privacy-preserving federated learning system 102 and the client device set 108 are configured for communication over the communications network 116. The communications network may be embodied, in whole or in part, by one or more components of the communications networks 110 and/or 112. For example, in some embodiments, the communications network 116 is embodied by the Internet access over one or more public and/or hybrid communications networks. In some other embodiments, the privacy-preserving federated learning system 102 comprises a secured and/or private communications network enabling communication of each client device of the client device set 108 with the privacy-preserving federated learning system 102.

As illustrated in FIG. 1B, in some embodiments, the model distributor system 106 is embodied entirely separate from the mask combiner system 104. In some such embodiments, the mask combiner system 104 is associated with a user environment (such as the user environment 114), and the model distributor system 106 is associated with a separate, third-party environment (e.g., a distributor environment). In this regard, the model distributor system 106 is controlled by, owned by, and/or otherwise associated with a separate entity from the mask combiner system 104. Each of the devices and/or systems may be configured to communicate over one or more communications networks, such as the communications network 110.

Additionally or alternatively, in some such embodiments, the model distributor system 106 may be optional. For example, in some embodiments, the privacy-preserving distributed learning system 102 may be configured to transmit a masked updated global model to the model distributor system 106 for unmasking and distribution, or an unmasked updated global model (unmasked via data received from the mask combiner system 104) for distribution. Alternatively or additionally, in yet some embodiments, the model distributor system 106 is embodied by, or a sub-system of, the privacy-preserving distributed learning system 102. For example, in some such embodiments, the privacy-preserving federated learning system 102 is configured to communicate directly with the client device set 108 to distribute the unmasked updated global model.

In yet other embodiments, one or more of the systems are embodied as sub-systems and/or modules of one or more of the other depicted systems. For example, as illustrated in FIG. 1C, one or more client device(s), such as the client devices 152A-152N ("client device set 152") include and/or embody and/or otherwise be configured to perform functionality of the mask combiner system, such as the mask combiner system 104. In some such embodiments, the privacy-preserving federated learning system 102 may select one or more client devices of the client device set 152 for use in a round of privacy-preserving federated learning. In this regard, the client mask information for such client device(s) may be made available to the remaining client device(s) of the client device set to enable the remaining client device (e.g., at least those not selected for use in the current round of privacy-preserving federated learning) to generate a secure unmasking data object based on the client masking for the selected client devices. The selected client device(s) may provide the client mask information indirectly through communication with one or more associated device(s) and/or systems, and/or may communicate directly with the client device(s) to retrieve and/or receive the client mask information data object from each selected client device. In some embodiments, each client device that generated a secure unmasking data object may transmit the secure unmasking data object to the privacy-preserving federated learning system 102 and/or model distributor system 106, for example to enable such systems to select a secure unmasking data object for use based on one or more rule sets, algorithms, and/or the like (for example, by picking the secure unmasking data object having a value most reported by each of the client devices). Some such embodiments may prevent one or a few malicious actors from affecting the fidelity of the system, and/or otherwise prevent processing errors associated with untrusted actors. In some embodiments, such as where trust associated with the client device set 152 is not at issue, only one (or a predetermined number) of the client device(s) may transmit their generated secure unmasking data object.

In some such embodiments, generation of the secure unmasking data object remains in a computing environment controlled by an entity associated with the client device(s), for example a participant environment separate from a user environment associated with a service provider, such that an additional device, system, and/or the like for performing such operations is not utilized. Such a system configuration may reduce the required additional computing resources by eliminating the requirement of the separate system to perform such functionality. Additionally or alternatively, in some embodiments, the system configuration does not cause any additional data privacy concerns, such as in a circumstance where the same entity is the platform provider associated with the client device(s) and the artificial intelligence project owner associated with one or more central server(s). One non-limiting example context is where a service provider is associated with providing a platform including learning functionality for execution on a smart television (a client device in a participant environment), and the service provider maintains one or more central server(s) also executing the same or associated learning functionality. It should be appreciated that, in some embodiments, one or more aspects of a participant environment is controlled by an entity other than the participant, for example where the controller of a user environment (e.g., a service provider) controls and/or otherwise provides software functionality via one or more apps executed on a client device. In some such embodiments, the structure and nature of communications between the client device and one or more central server(s) (for example, application servers and/or database servers) may define whether the portion of the participant environment is to be further considered an extension of the user environment.

Example Embodiment Apparatuses

The privacy-preserving federated learning system 102 may be embodied by one or more computing systems, such as the apparatus 200 as depicted in FIG. 2. The apparatus 200 includes a processor 202, a memory 204, input/output module 206, communications module 208, and privacy-preserving learning module 210. The apparatus 200 may be configured, using one or more of the modules depicted, to execute the operations described herein.

Although the components are described with respect to functional limitations, it should be understood that the particular implementations necessarily include the use of particular hardware. It should also be understood that certain of the components described herein may include similar or common hardware. For example, two modules may both leverage user use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular modules as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/out devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate array(s) (FPGA(s)), graphics processing unit(s) (GPU(s)), and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to generate a masked updated global model for distribution. For example, in some embodiments, the processor 202 is configured at least to generate a masked updated global model, and cause transmission of a selected client model indicator to a mask combiner system. Additionally or alternatively, the processor 202 may be configured, alone or in combination with one or more other modules such as the communications module 208, to receive data associated with generating the masked updated global model, for example a masked client model set. Additionally or alternatively, the processor 202 may be configured, alone or in combination with one or more other modules such as the communications module 208, to transmit data associated with the masked updated global model. Further, additionally or alternatively in at least some embodiments, the apparatus 200 is configured to perform one or more sufficiency checks associated with generating the masked updated global model.

In some embodiments, the apparatus 200 may include input/output module 206 that may, in turn, be in communication with processor 202 to provide output to the user and, in some embodiments, to receive an indication of a user input. The input/output module 206 may comprise a user interface and may include a display (e.g., for rendering one or more user interfaces). The user interfaces comprise a web user interface, a mobile application, a desktop application, a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, a network interface for enabling communications with a wired or wireless communications network. For example, the communications module 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The privacy-preserving learning module 210 includes hardware, software, firmware, and/or a combination thereof, configured to support privacy-preserving federated learning, for example by generating a masked updated global model from one or more masked client model(s). The privacy-preserving learning module 210 may utilize processing circuitry, such as the processor 202, to perform some or all of these actions. In at least one embodiment, the privacy-preserving learning module 210 includes hardware, software, firmware, and/or a combination thereof, configured to receive a masked client model set from one or more client devices of a client device set. Additionally or alternatively, in some embodiments, the privacy-preserving learning module 210 includes hardware, software, firmware, and/or a combination thereof, configured for selecting an aggregation masked model set. Additionally or alternatively, in some embodiments, the privacy-preserving learning module 210 includes hardware, software, firmware, and/or a combination thereof, configured for generating a masked updated global model, for example based on at least the aggregation model set. Additionally or alternatively, in some embodiments, the privacy-preserving learning module 210 includes hardware, software, firmware, and/or a combination thereof, configured for transmitting a selected client model indicator to a mask combiner system. Additionally or alternatively, in some embodiments, the privacy-preserving learning module 210 includes hardware, software, firmware, and/or a combination thereof, configured for distributing the masked updated global model, or a corresponding unmasked updated global model, to one or more client device(s) of a client device set. In yet some embodiments, additionally or alternatively, the privacy-preserving learning module 210 further includes hardware, software, firmware, and/or a combination thereof, configured for performing one or more sufficiency checks, such as determining whether an aggregation masked model set satisfies an aggregation sufficiency rule set, and/or performing one or more actions based on the determination.

In some embodiments, the privacy-preserving learning module 210 may include a separate processor, specially configured FPGA, or a specially configured application-specific integrated circuit (ASIC). It should also be noted that some or all of the data and/or information discussed herein can be based on data received, generated, and/or otherwise maintained by one or more components of the apparatus 200. In some embodiments, for example, one or more external systems (such as cloud computing devices and/or data storage system(s), and/or the like) are leveraged to provide at least some of the functionality described herein. It should be appreciated that, in some embodiments, one or more modules utilizes another module for providing some or all functionality with respect to performing one or more actions. For example, in at least one embodiment, the privacy-preserving learning module 210 utilizes the communications module 208 for transmitting, directly or indirectly through one or more intermediary devices, one or more data objects to various devices, and/or receiving one or more data objects from various devices. Additionally or alternatively still, in at least some embodiments, one or more of the modules are combined into a single module configured to perform some, or all, of the actions described with respect to the individual modules. For example, in some embodiments, the privacy-preserving learning module 210 and processor 202 are combined into a single module configured to perform the functionality of both modules as described herein.

The mask combiner system 104 may be embodied by one or more computing devices, such as the apparatus 300 shown in FIG. 3. In some embodiments, the mask combiner system 104 is embodied by, and/or embodied as a subcomponent of, one or more client devices of a set of client devices. In this regard, one or more of the modules depicted may provide additional and/or alternative functionality for supporting functionality described with respect to one or more client device(s), such as a client device of the client device set 108 and/or 152. The apparatus 300 may include a processor 302, memory 304 input/output module 306, communications module 308, and mask management module 310. The apparatus 300 may be configured, using one or more of the modules, to execute the operations described herein. The components 302-308 may function similar or identical to the similarly named components depicted and described above with respect to the apparatus 200. For purposes of brevity, repeated disclosure with regard to the functionality of such similarly named components is omitted.

The mask management module 310 includes hardware, software, firmware, and/or a combination thereof, configured to support functionality associated with generating and/or utilizing a secure unmasking data object. In this regard, in some embodiments, the mask management module 310 includes hardware, software, firmware, and/or a combination thereof, configured for identifying a received client mask information set associated with a masked client model set, for example by receiving some or all of the client mask information set and/or retrieving some or all of the client mask information set. Additionally or alternatively, in some embodiments, the mask management module 310 includes hardware, software, firmware, and/or a combination thereof, configured for receiving a selected client model indicator, and generating a secure unmasking data object, for example based on at least the received client mask information set and the selected client model indicator. Additionally or alternatively, in some embodiments, the mask management module 310 includes hardware, software, firmware, and/or a combination thereof, configured for transmitting the secure unmasking data object to an unmasking system, for example a privacy-preserving federated learning system 102 and/or a model distributor system 106. It at least some embodiments, additionally or alternatively, the mask management module 310 includes hardware, software, and/or a combination thereof, configured for performing one or more sufficiency checks, for example for determining whether selected client model indicator satisfies an aggregation sufficiency rule set, and/or performing one or more actions based on the determination.

In some embodiments, the mask management module 310 may include a separate processor, specially configured field programmable gate array (FPGA), or a specially configured application-specific integrated circuit (ASIC). It should also be noted that some or all of the data and/or information discussed herein can be based on data received, generated, and/or otherwise maintained by one or more components of the apparatus 300. In some embodiments, for example, one or more external systems (such as cloud computing devices and/or data storage system(s), and/or the like) are leveraged to provide at least some of the functionality described herein. It should be appreciated that, in some embodiments, one or more modules utilizes another module for providing some or all functionality with respect to performing one or more actions.

For example, in at least one embodiment, the mask management module 310 utilizes the communications module 308 for transmitting, directly or indirectly through one or more intermediary devices, one or more data objects to various devices, and/or receiving one or more data objects from various devices, for example one or more client device(s), a privacy-preserving federated learning system, and/or a model distributor system. Additionally or alternatively still, in at least some embodiments, one or more of the modules of the apparatus 300 are combined into a single module configured to perform some, or all, of the actions described with respect to the individual modules. For example, in some embodiments, the mask management module 310 and processor 302 are combined into a single module configured to perform the functionality of both modules as described herein.

The model distributor system 106 may be embodied by one or more computing devices, such as the apparatus 400 shown in FIG. 4. The apparatus 400 may include a processor 402, memory 404. input/output module 406, communications module 408, and model distribution module 410. The apparatus 400 may be configured, using one or more of the modules, to execute the operations described herein. The components 402-408 may function similar or identical to the similarly named components depicted and described above with respect to the apparatus 200. For purposes of brevity, repeated disclosure with regard to the functionality of such similarly named components is omitted.

The model distribution module 410 includes hardware, software, firmware, and/or a combination thereof, configured to support functionality associated with distributing an unmasked updated global model. In this regard, in some embodiments, the model distribution module 410 includes hardware, software, firmware, and/or a combination thereof, configured for receiving an unmasked updated global model for distribution to one or more client device(s). Additionally or alternatively, in some embodiments, the model distribution module 410 includes hardware, software, firmware, and/or a combination thereof, configured for receiving a masked updated global model from a privacy-preserving federated learning system, and receiving a secure unmasking data object from a mask combiner system. Further, additionally or alternatively in at least some embodiments, the model distribution module 410 includes hardware, software, firmware, and/or a combination thereof, configured for unmasking the masked updated global model using the secure unmasking data object to generate the unmasked updated global model for distribution.

In some embodiments, the model distribution module 410 may include a separate processor, specially configured field programmable gate array (FPGA), or a specially configured application-specific integrated circuit (ASIC). It should also be noted that some or all of the data and/or information discussed herein can be based on data received, generated, and/or otherwise maintained by one or more components of the apparatus 400. In some embodiments, for example, one or more external systems (such as cloud computing devices and/or data storage system(s), and/or the like) are leveraged to provide at least some of the functionality described herein. It should be appreciated that, in some embodiments, one or more modules utilizes another module for providing some or all functionality with respect to performing one or more actions. For example, in at least one embodiment, the model distribution module 410 utilizes the communications module 408 for transmitting, directly or indirectly through one or more intermediary devices, one or more data objects to various devices, and/or receiving one or more data objects from various devices, for example one or more client device(s), a privacy-preserving federated learning system, and/or a mask combiner system. Additionally or alternatively still, in at least some embodiments, one or more of the modules of the apparatus 400 are combined into a single module configured to perform some, or all, of the actions described with respect to the individual modules. For example, in some embodiments, the model distribution module 410 and processor 402 are combined into a single module configured to perform the functionality of both modules as described herein.

Example Computing Environment and Data Topology

FIG. 5A illustrates an example computing environment and data topology for generating a masked updated global model, in accordance with at least one example embodiment of the present disclosure. As illustrated, FIG. 5A includes a plurality of client devices 502A-502N (collectively "client device set 502"). Each of the client devices 502 embodies a separate participant computing environment within which various data and/or data objects derived therefrom may be generated and/or maintained. Further as illustrated, FIG. 5A includes a privacy-preserving federated learning system 102. The privacy-preserving federated learning system 102 embodies a computing environment separate from the participant computing environments associated with the client device set 502. In this regard, the separate computing environments may be controlled by, and/or owned by, separate entities, and/or represent distinct computing device(s).

As illustrated, each client device of the client device set 502 is associated with, and/or otherwise configured to maintain, a client datastore such as the client data 504A-504N. The client data 504A-504N may include one or more data records associated with various user activity. For example, in some embodiments, client data 504A embodies data records associated with sales activity for a certain user or group of users performed via the client device 502A. Similarly, client data 504B may embody data records associated with sales activity for a certain user or group of users performed via the client device 502B, and so on. In some embodiments, each of the client data 504A-504N includes data collected by the corresponding client device, and/or received by the client device from another device, system, and/or the like (e.g., a centralized database, a data collection service, and/or the like). In this regard, one or more of the client data 504A-504N may be collected and stored locally by each of client devices 502. Additionally or alternatively, it should be appreciated that one or more of the client data 504A-504N may, at least in part, be represented in a remote and/or cloud datastore accessible to the client device.

Each client device of the client device set 502 is configured for utilizing the client data for the corresponding device in training a client model, such as the client models 506A-506N (collectively "client models 506"). For example, in at least one embodiment, the client device 502A is configured to train and maintain a client model 506A utilizing the client data 504A, and similarly the client device 502B is configured to train and maintain a client model 506B utilizing the client data 504B, and so on. In this regard, each of the client models 506A-506N may be trained to learn patterns, trends, and/or other data considerations identified from the corresponding client data of client data 504A-504N. Accordingly, each of the client models 506 may be embodied by parameter values (e.g., feature weights) that represents the learned data representations based on the client data 504A-504N. It should be appreciated that each of the client models 506 may also be maintained and associated with one or more model quality metric data objects, for example an F1 score for each client model, that indicates the accuracy, robustness, and/or other quality of the client model.

As illustrated, each client device of the client device set 502 may further be configured to generate a masked client model, such as the masked client models 508A-508N, based on at least the client model of the client models 506. For example, client device 502A may generate the masked client model 508A by masking the client model 506A using masking information generated and/or otherwise identified by the client device 502A. In this regard, the masked client model 508A may obfuscate the true values for each parameter embodying the client model 506A, such that the true values cannot be identified without unmasking the masked client model 508A to reveal the client model 506A. The masked client model 508A may preserve one or more data properties of the client model 506A, for example such that the masked client model 508A is aggregable with one or more of the other masked client models 508B-508N. It should be appreciated that each client device of the client device set 502 may be configured to generate a corresponding masked client model of the masked client models 508 using masking information data object(s) specific to each client device, such that a different mask is applied to each of the client models 506 to generate the masked client models 508. In some embodiments, the one or more masked client models 506 are generated based on one or more shared elements, for example an additional element shared for each client device such that the generated masks are generated within the same defined range.

Each client device of the client device set 502, and/or a subset thereof, may be configured to transmit the masked client model of the masked client models 508 to a privacy-preserving federated learning system 102, as illustrated. In some embodiments, the client device of the client device set 502 is configured to transmit its corresponding masked client model of the masked client models 508 at one or more defined timestamp intervals. Alternatively or additionally, in some embodiments, the client device of the client device set 502 is configured to transmit its corresponding masked client model upon request from the privacy-preserving federated learning system 102. In some embodiments, these requests are randomized such that neither the privacy-preserving federated learning system 102 nor the client device(s) of the client device set 502 can manipulate the random selection. In some such embodiments, the privacy-preserving federated learning system 102 nevertheless is configured to control one or more parameters associated with the client devices that receive such a request, for example for controlling a percentage of clients that receive a masked client model request, for example via one or more determinations and/or user inputs. In such embodiments, the privacy-preserving federated learning system 102 may not know which client device(s) received a masked client model request, such that only the client device(s) that receive such request(s) are aware. In some such embodiments, the client device(s) that received the request may be able to notify the privacy-preserving federated learning system 102 that it received the request, and/or may be able to authenticate (e.g., for the client device and/or to prove to another device such as the privacy-preserving federated learning system 102) that the client device truly did receive the request, for example using data included in the masked client model request. Such embodiments, for example, provide an improved level of data security against malicious actors who compromise client devices and attempt to utilize the same mechanics for requesting information from such client devices. It should be appreciated that, in at least some embodiments, each masked client model is received separately over a particular time interval.

The privacy-preserving federated learning system 102 may maintain a masked client model set 510. The masked client model set 510 may embody each masked client model, of the masked client models 508, that was received by the privacy-preserving federated learning system 102. In some such embodiments, the masked client model set 510 is configured such that each masked client model is stored associated with a client device identifier uniquely identifying the client device that transmitted the masked client model. In this regard, the privacy-preserving federated learning system 102 may be configured to identify the client device that is associated with generating each of the received masked client model of the masked client models 508. In some embodiments, for example, the privacy-preserving federated learning system 102 receives a client device identifier each client device of the client device set 502 together with the masked client model for that client device, and stores the masked client model in the masked client model set 510 and the client device identifier in the masked client model set 510 and/or an associated data object. In some embodiments, each client device identifier is embodied by a pseudonym or cryptographic credentials.

The privacy-preserving federated learning system 102 may be configured to select one or more masked client models from the masked client model set 510 for use in generating a masked updated global model 512. For example, in at least one embodiment, the privacy-preserving federated learning system 102 is configured for selecting an aggregation masked model set from the masked client model set 510, wherein the aggregation masked model set includes one or more masked client model from the masked client model set 510 (e.g., the whole set or a subset thereof). In some embodiments, the privacy-preserving federated learning system 102 is configured for performing one or more sufficiency checks regarding the aggregation masked model set, for example before proceeding to generate the masked updated global model 512, and/or performing one or more actions based on the determination (e.g., aborting the federated learning round or continuing). Upon generating the aggregation model set, and/or determining the aggregation model set satisfies one or more sufficiency checks, the privacy-preserving federated learning system 102 may transmit one or more data messages (e.g., a selected client model indicator based on at least the aggregation masked model set and/or the corresponding client device identifier set). Alternatively or additionally, in some embodiments, the privacy-preserving federated learning system 102 selects the client device(s) to use in the current round of privacy-preserving federated learning based on the one or more sufficiency check(s). In some embodiments, the selected client model indicator is transmitted to a mask combiner system, as depicted and described, which may be embodied by one or more client devices of a client device set 502. For example, in at least one example context, the mask combiner system is embodied by the client device(s) selected by the privacy-preserving federated learning system for use in the current round of privacy-preserving federated learning, and/or with which one or more data messages were exchanged. In yet some other embodiments, the mask combiner system is embodied by a system separate from the client device set 502 (e.g., a server maintained by a service provider).

As illustrated, the privacy-preserving federated learning system 102 is further configured to generate the masked updated global model 512, and/or maintain the masked updated global model 512. In some embodiments, the privacy-preserving federated learning system 102 is configured to generate the masked updated global model 512 based at least on the masked client model set 510, for example based on an aggregation model set selected therefrom. In at least one example context, the privacy-preserving federated learning system 102 is configured to aggregate, and/or otherwise combine, each masked client model of the aggregation model set to generate the masked updated global model 512. In this regard, although the true values of each parameter value embodying the masked client model(s) are obfuscated by the mask, the masked values may still be aggregated to produce a usable result that generates that embodies parameter values that, when unmasked, are as though the unmasked client models were combined instead. In this regard. the masked updated global model 512 may include data representing trends, patterns, and/or other data significances learned from any of the masked client model(s) used to generate the masked updated global model 512.

FIG. 5B illustrates yet another example computing environment and data topology for generating a secure unmasking data object, in accordance with at least one example embodiment of the present disclosure. As illustrated, FIG. 5A includes the client device set 502. Further as illustrated, FIG. 5A includes a mask combiner system 104. The mask combiner system embodies a computing environment separate from the participant computing environments associated with the client device set, as well as the computing environment from the computing environment associated with the privacy-preserving federated learning system 102. In this regard, the separate computing environments may each be controlled by, and/or owned by, separate entities, and/or otherwise represent distinct computing device(s).

As illustrated, each client device of the client device set 502 is configured to generate and/or otherwise maintain a client mask information data object, for example, the client mask information data objects 552A-552N. In this regard, the client mask information data object for each client device of the client device set 502 may comprise one or more data objects utilized for masking the client model to generate the masked client model. For example, in at least some embodiments as illustrated, the client device 502A is configured to utilize the client mask information data object 552A for masking the client model 506A to generate the masked client model 508A. Similarly, in at least some embodiments as illustrated, the client device 502B is configured to utilize the client mask information data object 552B for masking the client model 506B to generate the masked client model 508B. In this regard, each client mask information data object may be utilized in one or more algorithmic and/or cryptographic processes for masking a client model, and similarly using a reverse algorithmic and/or cryptographic processes for unmasking the corresponding masked client model. In some embodiments, each client mask information data object of the client mask information data objects 552 comprises at least a randomized element data object, for example which is used to generate a random mask data object to mask a client model, and which makes the corresponding masked client model computationally impossible to unmask without the randomized element data object. For example, the randomized element data object may comprise a randomized bit string embodying a seed to be used for reconstructing the mask via a pseudorandom number generated shared between and/or otherwise agreed upon by various systems, such as the client device set 502, privacy-preserving federated learning system 102, and/or mask combiner system 104.

In some embodiments, the randomized element data object is to be utilized together with an additional element data object, for example a number and/or other data value shared between the various systems such as the privacy-preserving federated learning system, mask combiner system, and/or model distributor system, and utilized for performing one or more modulo operations. In some such embodiments, such systems are preconfigured to utilize the additional element data object, such that subsequent transmission of the additional element data object is not required. Additionally or alternatively, in some embodiments, each client mask information data object of the client mask information data object 552 comprises at least an additional element data object representing a natural number, a prime value, and/or one or more characters (e.g., a string) defining a range for use in defining the client mask information data object. As illustrated, each client device of the client device set 502 may be configured to store a client mask information data object of the client mask information data objects 552 upon utilizing such information for masking a client model of the client models 506.

Each client device of the client device set 502, and/or a subset thereof, may be configured to transmit the client mask information data object of the client mask information data object(s) 552 to a mask combiner system 104, as illustrated. In some embodiments, a client device of the client device set 502 is configured to transmit its corresponding client mask information data object of the client mask information data objects 552 to the mask combiner system at one or more defined timestamp intervals. Alternatively or additionally, in some embodiments, the client device of the client device set 502 is configured to transmit its corresponding client mask information data object of the client mask information data objects 552 to the mask combiner system 104 upon request, for example in response to a request transmitted by a privacy-preserving federated learning system 102, mask combiner system 104, and/or another associated system. In some embodiments, transmission of the client mask information data object(s) 552 to the mask combiner system 104 may occur such that the client mask information data object(s) 552 are each first semantically secure encrypted, for example utilizing one or more known encryption methodologies. In this regard, the securely encrypted version of the client mask information data object(s) 552 may be transmitted to the privacy-preserving federated learning system 102, which may then pass these secure cipher text(s) on to the mask combiner system 104, for example embodied in a separate system and/or client device(s) embodying the mask combiner system. In some embodiments, the client mask information data object is transmitted together with a client device identifier to be used for identifying the client device of the client device 502 that transmitted the corresponding client mask information data object. It should be appreciated that the client mask information data object from each client device of the client device set 502 may be received over a particular time interval.

The mask combiner system 104 may maintain a client mask information set 554. The client mask information set 554 may embody each client mask information data object, of the client mask information data objects 552, received by the mask combiner system 104. In some such embodiments, the mask combiner system 104 is configured such that each client mask information data object is stored associated with the client device identifier uniquely identifying the client device that transmitted the client mask information data. In this regard, the mask combiner system 104 may be configured to identify the client device that is associated with each received client mask information data object stored in the client mask information set 554.

The mask combiner system 104 may be configured to receive a selected client model indicator associated with an aggregation client model set selected for use in generating a masked updated global model. In at least some embodiments, the selected client model indicator comprises and/or otherwise represents the client device identifiers associated with the client devices from the client device set 502 that correspond to masked client models selected for use. In this regard, the mask combiner system 104 may be configured to retrieve the corresponding client mask information data objects from the client mask information set 554 for the client device identifiers embodied in the selected client model indicator, and utilize the retrieved client mask information data object(s) to generate a secure unmasking data object 556. For example, in at least one example context, the mask combiner system 104 generates the secure unmasking data object 556 by aggregating, combining, and/or otherwise transforming the client mask information data objects associated with each client device corresponding to a masked client model selected by the privacy-preserving federated learning system 102 for use in generating the masked updated global model 512. In this regard, in at least some embodiments, the secure unmasking data object 556 embodies data that enables unmasking of a masked updated global model, such as the masked updated global model 512, generated using the masked client models identified in the selected client model indicator.

As described, in some embodiments the mask combiner system 104 is embodied by one or more of the client devices of the client device set 502. In this regard, in some such embodiments, the client mask information for each client device may be transmitted to the client device(s) embodying the mask combiner system 104, and stored by the client device(s) embodying the mask combiner system 104 as the client mask information set 554. Similarly, the client device(s) embodying the mask combiner system 104 may generate the secure unmasking data object 556 based on the client mask information set 554, and/or receive a selected client device indicator for use in generating the secure unmasking data object 556. Additionally or alternatively, the client device(s) embodying the mask combiner system 104 may transmit the secure unmasking data object 556 to an appropriate unmasking system as described herein. In this regard, in some such embodiments, it should be appreciated that the mask combiner system 104 may not be embodied by one or more systems and/or devices separate from the client device set 502.

Additionally or alternatively, as described herein, the mask combiner system 104 and the privacy-preserving federated learning system 102 may work in conjunction with one another to enable distribution of an unmasked updated global model in a manner that satisfies desired privacy restrictions, for example based on whether the privacy-preserving federated learning system is permissioned to access the unmasked updated global model corresponding to the masked updated global model 512. In this regard, the privacy-preserving federated learning system 102 may utilize the masked updated global model 512 for distributing an unmasked updated global model to one or more devices, for example to the client device set 502. For example, in at least one embodiment, the privacy-preserving federated learning system 102 may receive the secure unmasking data object 556 from the mask combiner system for use in unmasking the masked updated data object to generate an unmasked updated data object for distribution. Additionally or alternatively, in some embodiments, the privacy-preserving federated learning system 102 is configured to distribute the unmasked updated data object directly to the client devices of the client device set 502. In yet some other embodiments, the privacy-preserving federated learning system 102 is configured to distribute the unmasked updated data object via transmission to another system, for example a model distributor system as described herein. In some such embodiments, the privacy-preserving federated learning system 102 may perform such unmasking and distribution in circumstances where the privacy-preserving federated learning system is associated with access to corresponding intellectual property rights and/or data privacy rights enabling access to the true values of the unmasked updated global model. For example, in at least one example context, the privacy-preserving federated learning system is configured to access the unmasked updated global model in circumstances where the privacy-preserving federated learning system is configured under contractual obligations that the system will not utilize the unmasked updated global model for its own purposes in decision support, and/or for example will merely utilize the unmasked updated global model for providing one or more agreed upon services.

Alternatively or additionally still, in at least some embodiments, the privacy-preserving federated learning system 102 is configured to distribute the masked updated global model 512 to a model distributor system for distributing a corresponding unmasked updated global model. In this regard, in at least some example embodiments, the privacy-preserving federated learning system 102 is configured to transmit the masked updated global model 512 to the model distributor system for unmasking to generate the unmasked updated global model for distribution. For example, the model distributor system may receive the masked updated global model 512 from the privacy-preserving federated learning system 102, and receive the secure unmasking data object 556 from a mask combiner system. The model distributor system may subsequently utilize the secure unmasking data object 556 for unmasking the masked updated global model 512 to generate a corresponding unmasked updated global model, and distribute the unmasked updated global model to one or more devices, such as the client device set 502. Additionally or alternatively, in some embodiments, the privacy-preserving federated learning system 102 is configured to distribute the masked updated data object directly to the client devices of the client device set 502 without receiving the secure unmasking data object 556. In this regard, the privacy-preserving federated learning system 102 protects the privacy-preserving federated learning system 102 from intentional and/or accidental exposure to intellectual property, personally identifiable data, and/or other sensitive data that may be embodied by the true values of the unmasked updated global model.

In an example context, each client device of index k of the client device set 502 is configured to store a vector of model parameters $w^k$ of d-dimensions (e.g., an ordered tuple of d many rational numbers), which encodes the client model with coordinates $w_i^k$. Additionally, in at least some embodiments, the model parameter vector is associated with a vector of parameter weights $\alpha_k$, with the weights falling between an upper bound and a lower bound, for example [0, 1]. In this regard, each client device may utilize the model parameter vector and parameter weight vector to generate a corresponding client model embodied by coordinates $\alpha_k \cdot w_i^k$. Alternatively or additionally, in some such embodiments, the model parameter value and/or the parameter weight vector may be transmitted to the mask combiner system 104, and/or otherwise accessible to the mask combiner system 104, for use in further processing. Such client model(s) may be aggregated to generate an updated global model, for example according to the formula $\Sigma_{k \in K} \alpha_k \cdot w^k$. However, without masking, the true data values of each client model and/or the updated global model are exposed, which may expose personally identifiable information and/or other sensitive information, or information derivable therefrom, in violation of one or more legal regimes, business promises, and/or other regulations. Accordingly, in contexts where maintaining privacy or the otherwise sensitive nature of the model requires such data values not be exposed, mere aggregation of the unmasked client models, such as the client model set 506, may be insufficient.

In this regard, each client device may be configured to mask the client model of the client model set 506 into the masked client model of the masked client model set 508 in a manner that ensures computational impossibility of arbitrarily determining the client model from the corresponding masked client model. For example, in an example context, each client device is configured based on a sufficiently large additional element data object having the value which may embody a prime in some embodiments and/or any other natural number in other implementations. As such, M defines a cyclic additive group $Z_M$, which performs addition "modulo M" and implicitly defines a unique size number of rationals with l digits after the decimal. A non-deterministically chosen shift s may be chosen such that each embedding $y_i^k$ of $\alpha_k \cdot w_i^k$ are natural numbers according to the formula: $y_i^k = (\alpha_k \cdot w_i^k + s) \cdot 10^l$. Accordingly, each embedding $y_i^k$ is an element in the finite group $Z_M$. Such embeddings may be masked by adding a random element data object, $r_i^k$, of the finite group $Z_M$, according to the formula: $x_i^k = y_i^k + r_i^k$ mod M.

In this regard, a random additive shift further enhances the overall security of the masking process. In some embodiments, M is chosen such that M−max is small where max represents an informed upper bound on the value of the unmasked aggregation sums $\Sigma_{k \in K} \alpha_k \cdot w_i^k$ for all values of i and k. In some such embodiments, M is selected to minimize the flow of information about possible values of $r_i^k$ when the value of $x_i^k$ is known.

In this regard, each client device may generate a masked client model $x_i^k$ in the group $(Z_M)^d$. The privacy-preserving federated learning system 102 may receive any number of such masked client model(s), for example in response to a transmission from one or more client device(s) of the client device set 502. Accordingly, the privacy-preserving federated learning system 102 may receive a masked client model set 510 embodying a subset of all the masked client models 508. In other words, the privacy-preserving federated learning system 102 receives a subset $\{x^k | k \in K'\}$, where $K' \subseteq K$. As described herein, in at least one example context, K' embodies a proper subset, for example due to communication errors with one or more client device(s) of the client device set 502.

The privacy-preserving federated learning system 102 may be configured to generate the masked client model set represented by $\{x^k | k \in K'\}$. For example, in some embodiments, the privacy-preserving federated learning system 102 is configured to select an aggregation model set for aggregation to generate the masked updated global model. In at least one example context where the masked client model set embodies the aggregation model set (e.g., all masked client model(s) are utilized in generating the masked updated global model), the privacy-preserving federated learning system may generate the masked updated global model, o, according to the formula: $o = \Sigma_{k \in K'} x^k$ mod M. In this regard, the generated masked updated global model o preserves the true values of the combination of masked client model(s) while retaining the obfuscation via the multiple masks associated therewith. Accordingly, the true values of the masked updated global model o remain obfuscated, but can be removed based on a combination of the masking information data object(s) used to mask the various masked client model(s) K' used to generate the masked updated global model o. The privacy-preserving federated learning system 102 may subsequently notify the mask combiner system 104 regarding the masked client device models and/or associated client devices were utilized in generating the masked updated global model, for example by generating and transmitting a selected model indicator embodying, and/or including data representing, K'.

In this regard, the mask combiner system 104 may generate a secure unmasking data object configured to enable unmasking of the masked updated global model. For example, in at least some embodiments, the mask combiner system 104 receives the masking information data object(s) from each client device of the client device set 102, or indirectly and in a privacy-preserving manner through the privacy-preserving federated learning system 102. Each masking information data object may comprise the random element data object $r^k$ for each client device utilized for masking the client model for client device k. As such, in some such embodiments, the mask combiner system 104 receives the selected model indicator embodying or including data representing K', and may generate the corresponding secure unmasking data object based on the selected model indicator. In this regard, the mask combiner system 104 may generate the vector r according to the formula: $r = \Sigma_{k \in K'} r^k$ mod M. Each $r^k$ may be identified from the received masking information set based on the received selected model indicator.

In this example context, the privacy-preserving federated learning system generates the masked updated global model, o, and the mask combiner system 104 generates the secure unmasking data object, r, configured for unmasking the masked updated global model o. A system that accesses both o and r, together with the metadata l and s, may generate the unmasked updated global model. It should be appreciated that l and s may readily be transmitted between one or more systems as metadata. For example, using o and r, a system can recover $o-r=\Sigma_{k \in K} y^k$ mod M. This may be utilized for any value coordinate i. Subsequently, utilizing o–r, the system may generate the unmasked updated global model represented by $\Sigma_{k \in K} \alpha_k \cdot w_i^k$ for the various coordinates i by dividing by $10^l$ and subsequently subtracting $s \cdot |K'|$. For example, the following defines the manipulations proving the generation of the unmasked updated global model utilizing o, r, l, and s for a given coordinate i, in accordance with the equations provided above:

$$(o-r)_i \cdot 10^{-l} - s = \left(\sum_{k \in K'} x_i^k - r_i^k\right) \cdot 10^{-l} - s \cdot |K'|$$

$$= \left(\sum_{k \in K'} y_i^k \cdot 10^{-l}\right) - s \cdot |K'|$$

$$= \left(\sum_{k \in K'} (\alpha_k \cdot w_i^k + s) \cdot 10^l \cdot 10^{-l}\right) - s \cdot |K'|$$

$$= \left(\sum_{k \in K'} (\alpha_k \cdot w_i^k + s)\right) - s \cdot |K'|$$

$$= \left(\sum_{k \in K'} \alpha_k \cdot w_i^k\right) + s \cdot |K'| - s \cdot |K'|$$

$$= \sum_{k \in K'} \alpha_k \cdot w_i^k$$

Accordingly, the privacy-preserving federated learning system 102, mask combiner system 104, and/or model distributor system may be configured with, and/or receive as metadata to one or more transmissions, the data embodying l and/or s. Additionally in this regard, receiving the masked updated global model and secure unmasking data object enables any such system to generate the unmasked updated global model, which cannot be generated without all such data objects (e.g., the privacy-preserving federated learning system in possession of the masked updated global model alone cannot access the true values of represented by the unmasked updated global model without the secure unmasking data object). The mask combiner system 104 may thus transmit the secure unmasking data object to the appropriate system, such as an unmasking system, and the privacy-preserving federated learning system 102 may thus transmit the masked updated global model to the appropriate system to enable the system to generate the unmasked updated global model for use and/or distribution. For example, in one such example context, the privacy-preserving federated learning system 102 transmits the masked updated global model, and the mask combiner system 104 transmits the secure unmasking data object, to a model distributor system 106 to enable the model distributor system 106 to generate the unmasked updated global model and distribute it to each client device of the client device set 502. In yet some other embodiments, the mask combiner system 104 transmits the secure unmasking data object to the privacy-preserving federated learning system 102 to enable the privacy-preserving federated learning system 102 to generate the unmasked updated global model, without requiring any additional transmissions, for use and/or distribution. Similarly, in some other embodiments, the privacy-preserving federated learning system 102 transmits the secure unmasking data object to the mask combiner system 104 to enable the mask combiner system 104 to generate the unmasked updated global model, without requiring any additional transmissions, for use and/or distribution. The privacy-preserving federated learning system 102 may select the client devices to provide a masked client model. Additionally or alternatively, in some embodiments, the privacy-preserving feder-ated learning system 102 may select a different set of client device(s) for performing the task of mask combining to generate a secure unmasking data object, for example where each of the client devices (or one further selected client device of the selected set) embodies the mask combiner system. In some such embodiments, the selection of the client device(s) selected as having their masked client model utilized in generating a masked updated global model may similarly cause such client device(s) to transmit client mask information to one or more systems, for example directly to a mask combiner system, or indirectly to a mask combiner system (embodied as a separate device or one or more client device(s)) through the privacy-preserving federated learning system. In some such embodiments where the mask information is to be passed through the privacy-preserving federated learning system, the client mask information may be transmitted to the privacy-preserving federated learning system 102 as semantically secured from the client devices, such that the mask combiner system (and/or client devices embodying the mask combiner system) may decrypt the client mask information for further processing. In some embodiments, the client devices are selected using a publicly verifiable random function, such as by transmitting to all client devices a random block Q and one or more numerical threshold values, such as threshold a and/or threshold b. In some such embodiments, each client device can then verify whether it is selected by verifying whether the cryptographic hash of its own digital signature on Q, and/or some metadata, is below or otherwise satisfies threshold a. Similarly, in some embodiments, a client device can verify whether it is selected for performing functionality of a mask combiner system by verifying whether the client device's own digital signature on Q, and/or some other metadata, is below or otherwise satisfies threshold b. It should be appreciated that the algebraic nature of such verification processes enable these facts to be readily proven to and/or by the privacy-preserving federated learning system 102 via the verification of digital signature(s).

Example Data Flow for Privacy-Preserving Federated Learning

FIG. 6A illustrates an example data flow diagram of an example process for privacy-preserving federated learning, in accordance with at least one example embodiment of the present disclosure. Specifically, as illustrated, FIG. 6A depicts operational data flow between various devices and/or systems, specifically a privacy-preserving federated learning system 102, client device set 108, mask combiner system 104, and, optionally, a model distributor system 106. As described herein, in some embodiments, the model distributor system is embodied by one or more other systems. For example, in at least one embodiment, the privacy-preserving federated learning system 102 embodies the model distributor system 106, and performs some or all of the functions described with respect to the model distributor system 106. Additionally or alternatively, in at least some embodiments, the mask combiner system 104 embodies the model distributor system 106, and performs some or all of the functions described with respect to the model distributor system 106.

FIG. 6B illustrates an example flowchart of the data flow operations the example process for privacy-preserving federated learning, as depicted in FIG. 6A, in accordance with at least some example embodiments of the present disclosure. In this regard, the example operations are depicted and described with respect to the perspective of privacy-preserving federated learning system 102. In this regard, the privacy-preserving federated learning system 102 may be embodied by any number of computing devices, for example the apparatus 200 as depicted and described herein with respect to FIG. 2. It should be appreciated that one or more of the corresponding device(s) and/or system(s) may be embodied by the specially configured apparatuses as described herein, for example the mask combiner system 104 may be embodied by the apparatus 300 as depicted and described herein with respect to FIG. 3, and/or the model distributor system 106 may be embodied by the apparatus 400 as depicted and described herein with respect to FIG. 4. In this regard, each operation will be described from the perspective of the privacy-preserving federated learning system embodied by the specially configured apparatus 200.

At optional block 652, the apparatus 200 includes means, such as the privacy-preserving learning module 210, input/output module 206, communications module 208, processor 202, and/or the like, or a combination thereof, for transmitting a masked local model request to each client device of a client device set, such as the client device set 108. In some example embodiments, the masked client model request indicates the beginning of a new round of privacy-preserving federated learning. The apparatus 200 may, in some embodiments, transmit a masked client model request to all client devices communicable with the apparatus 200 and associated with a particular client device set, and/or may select one or more client devices of a client device set for which to send the masked client model request. In some embodiments, the masked local model request is configured to cause each client device of the client device set to perform one or more actions. For example, in at least some example embodiments, the masked local model request is configured to cause each client device to retrieve and respond with a masked client model. Additionally or alternatively, in at least some embodiments, the masked client model request is configured to cause each client device to transmit a client mask information data object to a mask combiner system, such as the mask combiner system 104. In at least some embodiments, each request contains sufficient redundancy to allow for some client devices not to respond as requested, for example in response to one or more communication failures with the client device(s).

At block 654, the apparatus 200 includes means, such as the privacy-preserving learning module 210, input/output module 206, communications module 208, processor 202, and/or the like, or a combination thereof, for receiving a masked client model set associated with a client device set, for example the client device set 108. In this regard, in some embodiments, the apparatus 200 receives a masked client model from one or more client device(s) over a time interval. For example, in some embodiments, the apparatus 200 receives a masked client model from at least a subset of a client device set communicable with the apparatus 200. Alternatively or additionally, in at least some embodiments, the apparatus 200 receives a masked client model from each client device to which a masked client model request was transmitted, for example at an earlier block such as block 652. The received masked client models may be stored within one or more data object(s) embodying the masked client model set.

Additionally or alternatively, in at least one embodiment, each masked client model is received from a client device set together with a client device identifier for the client device. The client device identifier may similarly be stored, for example in one or more data object(s) embodying a client device identifier set, such that each masked client model is retrievable from the masked client model set utilizing the corresponding client device identifier associated with the masked client model. In some embodiments, the client device identifier for a client device is received from the client device itself. Alternatively or additionally, in at least some embodiments, the apparatus 200 generates the client device identifier for some or all masked client model(s) received from the client device(s) of the client device set.

In some embodiments, each client device identifier in the client device identifier set is an anonymized client device identifier. In this regard, the anonymized client device identifier may be utilized to refer to associated data (e.g., a masked client model on the without exposing information about the client device. Additionally or alternatively, the anonymized client device identifier may be altered for different privacy-preserving federated learning rounds. By altering the anonymized client device identifier(s), the client device identifiers cannot be utilized to generate trends based on the masked client model(s) received from one or more particular client device(s), and/or knowledge associated with a particular client device cannot be utilized for analyzing the client device, as the client device cannot be sufficiently identified with certainty due to the anonymous nature of each identifier.

In some embodiments, the apparatus 200 receives one or more messages including information from which the masked client model set may be constructed. For example, in at least one example embodiment, the apparatus 200 is configured to receive messages including, directly or indirectly, masked weights for various parameters embodying a client model. In this regard, each masked client model may be generated based on the corresponding weights for the various parameters, such as via one or more summation operations.

At optional block 656, the apparatus 200 includes means, such as the privacy-preserving learning module 210, input/output module 206, communications module 208, processor 202, and/or the like, or a combination thereof, for receiving a model quality metric set associated with the masked client model set. In at least some embodiments, the model quality metric set is received from one or more client device(s) of a client device set, for example client device set 108. For example, in at least some embodiments, each masked client model in the masked client model set is associated with a model quality metric data object of the model quality metric set. Each quality metric data object may represent the accuracy and/or robustness of the corresponding masked client metric data object. For example, in at least one example embodiment, the model quality metric set includes F1 scores for each masked client model. In some embodiments, the model quality metric set is received together with the masked client model set. For example, in at least some embodiments, a single transmission is received, in a given round, from client devices selected to submit masked client models, including the masked client model set and the model quality metric set.

At block 658, the apparatus 200 includes means, such as the privacy-preserving learning module 210, input/output module 206, communications module 208, processor 202, and/or the like, or a combination thereof, for selecting an aggregation masked model set from the masked client model set. In at least some example embodiments, the aggregation masked model set is associated with a selected device identifier set from the client device identifier set. In this regard, the apparatus 200 may select the aggregation masked model set embodying the masked client model(s) selected for use in generating a corresponding masked updated global model. Additionally or alternatively, in at least some embodiments, the apparatus 200 is configured for identifying the client device identifier(s) for each client device associated with a masked client model of the aggregation masked model set, for example embodying the selected device identifier set. In some embodiments, the apparatus 200 is configured to select all received masked client model(s), such that the aggregation model set is embodied by the masked client model set, and/or otherwise includes all data objects from the masked client model set. In at least some embodiments, the apparatus 200 is configured to select the masked client model(s) based on received model quality metric data object(s), for example as described herein with respect to FIG. 6C.

In this regard, FIG. 6C illustrates an example subprocess for privacy-preserving federated learning, in accordance with at least one example embodiment of the present disclosure. Specifically, FIG. 6C depicts an example subprocess for selecting an aggregation masked model set from the masked client model set. As illustrated, the process depicted in FIG. 6C may begin after some or all operations of another process, for example after at least block 656 as depicted and described. Additionally, as illustrated, the process depicted in FIG. 6C may proceed to one or more other operations upon completion of the blocks depicted. For example, in at least one embodiment, flow may return to block 660 as depicted and described with respect to FIG. 6B upon completion of the process depicted with respect to FIG. 6C. In yet other embodiments, the flow may end upon completion of the process depicted with respect to FIG. 6C.

At block 666, the apparatus 200 includes means, such as the privacy-preserving learning module 210, input/output module 206, communications module 208, processor 202, and/or the like, or a combination thereof, for selecting the aggregation masked model set based on at least the model quality metric set. In some such embodiments, the apparatus 200 is configured to select all masked client models associated with one or more model quality metric data object(s) that satisfy one or more corresponding model quality threshold(s). For example, in at least one example context, each masked client model is associated with a model quality metric data object embodying an F1 score, or other determined accuracy score and/or error score, for the masked client model. The apparatus 200 may compare each model quality metric data object to an accuracy score threshold, and select each masked client model associated with a model quality metric data object that satisfies the accuracy score threshold (e.g., all models more accurate than the accuracy score threshold). It should be appreciated that, in some embodiments, each type of model quality metric data object may be compared with a different model quality metric threshold, for example where accuracy scores are compared to an accuracy score threshold, robustness scores are compared to a robustness score threshold, and/or the like.

Returning to block 658, flow continues to optional block 660. At optional block 660, the apparatus 200 includes means, such as the privacy-preserving learning module 210, input/output module 206, communications module 208, processor 202, and/or the like, or a combination thereof, for determining the masked client model set satisfies an aggregation sufficiency rule set. In some example embodiments, the apparatus 200 is configured to identify the aggregation sufficiency rule set. In at least some embodiments, the aggregation sufficiency rule set embodies one or more algorithmic processes for determining whether the masked client model set, and/or one or more associated data objects such as the aggregation masked model set, satisfies one or more sufficiency checks. For example, in some embodiments, the apparatus 200 is configured to determine whether the masked client model set, and/or the aggregation masked model set, includes a requisite number of masked client model(s) so as to satisfy a minimum model count threshold. Additionally or alternatively, in at least some embodiments, the aggregation sufficiency rule set includes one or more algorithm(s) for determining whether the error values associated with the masked client model set or a combination thereof, the selected masked client model(s) embodied in the aggregation masked model set or a combination thereof, and/or the like, satisfies a maximum error threshold. In some embodiments, in a circumstance where the masked client model set, and/or the aggregation masked model set, does not satisfy the aggregation sufficiency rule set, the apparatus 200 may perform one or more actions for aborting the current round of privacy-preserving federated learning.

At block 662, the apparatus 200 includes means, such as the privacy-preserving learning module 210, input/output module 206, communications module 208, processor 202, and/or the like, or a combination thereof, for transmitting a selected client model indicator based on at least the selected device identifier set and the aggregation masked model set. In some embodiments, the apparatus 200 is configured for transmitting the selected client model indicator to a mask combiner system, for example to the mask combiner system 104. The selected client model indicator may embody the client device identifiers for the selected masked client model(s) represented in the aggregation masked model set. In this regard, the selected client model indicator may be parsed by the mask combiner system 104 to identify the client devices utilized to identify the client devices, and/or the corresponding client mask information associated with each client device. For example, the client mask information for the client device identifiers embodied in the selected client model indicator to generate a secure unmasking data object associated with the associated masked client model(s) in the aggregation masked model set.

At block 664, the apparatus 200 includes means, such as the privacy-preserving learning module 210, input/output module 206, communications module 208, processor 202, and/or the like, or a combination thereof, for generating a masked updated global model based on at least the aggregation model set. In this regard, the masked updated global model may represent the combination of learned values embodying each of the masked client model(s) in the aggregation model set. For example, in at least one embodiment, the masked updated global model is generated by aggregating the aggregation model set together, such that the various data values are aggregated to merge the various learned trends, patterns, and/or other knowledge embodied therein. It should be appreciated that the masked updated global model may similarly be embodied by obfuscated data values, such that the true value of the aggregated data values cannot be determined without subsequent unmasking.

In at least some embodiments, flow then proceeds to block A. In this regard, at block A, the apparatus 200 may be configured for distributing, to the client device set 108, a masked updated global model or an unmasked updated global model. The unmasked updated global model may be based on at least the masked updated global model, for example by unmasking the masked updated global model as described herein. In this regard, in at least some embodiments, the apparatus 200 proceeds to block A as depicted and described with respect to FIG. 7A. Alternatively or additionally, in at least some embodiments, the apparatus 200 proceeds to block A as depicted and described with respect to FIG. 8A.

FIG. 7A illustrates an example data flow diagram of additional operations for an example process for privacy-preserving federated learning, in accordance with at least one example embodiment of the present disclosure. Specifically, the operational data flow depicted represents an example subprocess for distributing a masked updated global model and/or an unmasked updated global model. As illustrated, FIG. 7A depicts the operational data flow between the various devices and/or systems depicted and described with respect to FIG. 6A.

FIG. 7B illustrates an example flowchart of the data flow operations the example process for privacy-preserving federated learning, as depicted in FIG. 7A, in accordance with at least some example embodiments of the present disclosure. Specifically, FIG. 7B depicts the operations performed for the example subprocess for distributing a masked updated global model and/or an unmasked updated global model. As described and depicted with respect to FIG. 6B, the example operations are depicted and described with respect to the perspective of privacy-preserving federated learning system 102, for example embodied by the specially configured apparatus 200.

At block 752, the apparatus 200 includes means, such as the privacy-preserving learning module 210, input/output module 206, communications module 208, processor 202, and/or the like, or a combination thereof, for receiving, from the mask combiner system such as the mask combiner system 104, a secure unmasking data object. In at least some embodiments, the secure unmasking data object embodies data generated from a combination of client mask information associated with the various masked client models of the aggregation model set. In this regard, the secure unmasking data object corresponds to the combination of client mask information for the various masked client models that the apparatus 200 utilized in generating the masked updated global model. Accordingly, the secure unmasking data object may have been generated such that the secure unmasking data object may be utilized to unmask the corresponding masked updated global model, such that the secure unmasking data object functions as the "key" to accessing the true values for the various parameters embodying the masked updated global model. In some embodiments, the secure unmasking data object is received in response to, and/or based at least in part on, the transmission of the selected client model indicator to the mask combiner system. For example, the transmission of the selected client model indicator may be configured to cause the mask combiner system to generate the secure unmasking data object based at least on specific client device identifier(s), for example those corresponding to the masked client model(s) included in the aggregation model set utilized to generate the masked updated global model.

At block 754, the apparatus 200 includes means, such as the privacy-preserving learning module 210, input/output module 206, communications module 208, processor 202, and/or the like, or a combination thereof, for unmasking the masked updated global model to generate the unmasked updated global model. In at least some embodiments, the apparatus 200 is configured to unmask the masked updated global model utilizing the secure unmasking data object. For example, in at least one example embodiment, the apparatus 200 may have received from the client device(s) of the client device set, such as the client device set 108, and/or may receive from the mask combiner system, such as the mask combiner system 104, all other data values except the secure unmasking data object required for performing an algorithmic and/or cryptographic masking process. In this regard, the secure unmasking data object may be utilized to perform the algorithmic and/or cryptographic unmasking process, such that unmasking may be performed with certainty and/or is not computationally impossible. Upon completion of the unmasking process, the unmasked updated global model is generated embodying the true values for the various parameters embodying the updated global model. In some example contexts, exposing the apparatus 200 to the true values for the updated global model (which may include personally identifiable information and/or other sensitive data) is not problematic, for example where the apparatus 200 is associated with permission(s) for collecting and/or processing such data.

At block 756, the apparatus 200 includes means, such as the privacy-preserving learning module 210, input/output module 206, communications module 208, processor 202, and/or the like, or a combination thereof, for distributing, to the client device set such as the client device set 108, the unmasked updated global model. In some embodiments, for example as illustrated, the apparatus 200 is configured to distribute the unmasked updated global model via a model distributor system, for example the model distributor system 106. In some such embodiments, the apparatus 200 is configured to distribute the unmasked updated global model by transmitting at least the unmasked updated global model to the model distributor system, such as the model distributor system 106. In some such embodiments, the apparatus 200 transmits the unmasked updated global model to cause the model distributor system 106 to further transmit the unmasked updated global model to each client device of a client device set, for example client device set 108. For example, in at least one such embodiment, the apparatus 200 is configured to transmit the unmasked updated global model to a model distributor system within the same user environment as the mask combiner system, for example where the mask combiner system 104 and model distributor system 106 are controlled and/or otherwise owned by the same entity, and/or are embodied by a shared system. It should be appreciated that, in other embodiments, to distribute the unmasked updated global model the apparatus 200 is configured to transmit the unmasked updated global model directly to the client device(s) of the client device set. In this regard, for example, the apparatus 200 may embody the model distributor system 106, and transmits the unmasked updated global model without communication with a separately controlled-additional system, device, and/or the like. In some embodiments, the apparatus 200 is configured to publish and/or otherwise transmit one or more parameter values that may be captured and/or received by one or more client devices to enable such client devices to determine its own model weights embodying an updated client model and/or updated global model.

FIG. 8A illustrates another example data flow diagram of additional operations for an example process for privacy-preserving federated learning, in accordance with at least one example embodiment of the present disclosure. Specifically, the operational data flow depicted represents another example subprocess for distributing a masked updated global model and/or an unmasked updated global model. As illustrated, FIG. 8A depicts the operational data flow between the various devices and/or systems depicted and described with respect to FIG. 6A.

FIG. 8B illustrates an example flowchart of the data flow operations the example process for privacy-preserving federated learning, as depicted in FIG. 8A, in accordance with at least some example embodiments of the present disclosure. Specifically, FIG. 8B depicts the operations performed for another example subprocess for distributing a masked updated global model and/or an unmasked updated global model. As described and depicted with respect to FIG. 6B, the example operations are depicted and described with respect to the perspective of privacy-preserving federated learning system 102, for example embodied by the specially configured apparatus 200.

Distribution via the model distributor system ensures that the privacy-preserving federated learning system, for example embodied by the apparatus 200, never gains access to the data underlying the unmasked updated global model. The updated unmasked global model may nevertheless be provided to one or more client device(s) for use without such exposure. A non-limiting example context where such data privacy may be desirable is in the context of a bank in a relationship with hundreds, thousands, and/or millions of bank customers. The bank may wish to be in control of the logic by which client devices (e.g., applications on mobile smartphones for each of the customers) are updated associated with an updated global model. Additionally or alternatively, the bank may want to distribute the global model to its servers (e.g., controlled by the bank) for use in various support decision making processes, such as for loan application processing. The model distributor system enables such distribution mechanisms without exposing the data to a third-party, such as the apparatus 200.

At block 852, the apparatus 200 includes means, such as the privacy-preserving learning module 210, input/output module 206, communications module 208, processor 202, and/or the like, or a combination thereof, for transmitting, to the model distributor system such as the model distributor system 106, the masked updated global model to cause distribution of an unmasked updated global model to the client device set, such as the client device set 108. In at least one example context, transmitting the masked updated global model to the model distributor system causes the model distributor system to unmask the masked updated global model to generate the unmasked updated global model for distribution. In this regard, the apparatus 200 is configured to distribute the unmasked updated global model indirectly through the model distributor system. Additionally, the apparatus 200 never possesses the unmasked, true values for the various parameters embodying the updated global model, and indeed does not have the requisite data for performing such unmasking. Accordingly, the apparatus 200 is never at risk of being exposed to, or improperly exposing, the true values of the masked updated global model, which may include or otherwise represent personally identifiable information and/or other sensitive data. Instead, the only entity having access to such true values are the model distributor system, such as the model distributor system 106, through generating the unmasked updated global model, and the recipient client device(s) of the client device set, such as the client device set 108.

It should be appreciated that, as described herein, the model distributor system may require additional data to complete the unmasking process, for example the secure unmasking data object from a mask combiner system, such as the mask combiner system 104. At optional block 854, the subprocess further includes transmitting, from the mask combiner system to the model distributor system, a secure unmasking data object. In some such embodiments, the mask combiner system, such as the mask combiner system 104, is configured to automatically transmit the secure unmasking data object to the model distributor system upon generating the secure unmasking data object. Alternatively or additionally, in at least some embodiments, the apparatus 200 is configured to transmit one or more model transmission notice(s) to the mask combiner system, such as the mask combiner system 104, which indicate that the apparatus 200 has transmitted the masked updated global model to the model distributor system. Alternatively or additionally still, in yet at least some other embodiments, the apparatus 200 is configured to cause the model distributor system, such as the model distributor system 106, to generate and/or transmit one or more model transmission notice(s) to the mask combiner system, such as the mask combiner system 104, which indicate that the model distributor system has received the masked updated global model. In some such embodiments, the model transmission notice(s) from either system are configured to cause the model distributor system to transmit the secure unmasking data object to the model distributor system.

At optional block 856, the subprocess further includes unmasking, by the model distributor system such as the model distributor system 106, the masked updated global model to generate the unmasked updated global model for distributing to the client device set. As described herein, the model distributor system may be configured to complete one or more unmasking process(es) utilizing the secure unmasking data object, for example such that use of the secure unmasking data object makes the unmasking process(es) no longer computationally impossible. In this regard, upon generating the unmasked updated global model, the model distributor system, such as the model distributor system 106, may identify the client device set for which the unmasked updated global model is to be distributed, and transmit the unmasked updated global model to each of the client device(s) in the identified client device set.

FIG. 9A illustrates another example data flow diagram of additional operations for an example process for privacy-preserving federated learning, in accordance with at least one example embodiment of the present disclosure. Specifically, the operational data flow depicted represents an example subprocess for terminating a round of privacy-preserving federated learning, in accordance with at least one example embodiment of the present disclosure. As illustrated, FIG. 9A depicts the operational data flow between the various devices and/or systems depicted and described with respect to FIG. 6A.

FIG. 9B illustrates an example flowchart of the data flow operations the example process for privacy-preserving federated learning, as depicted in FIG. 9A, in accordance with at least some example embodiments of the present disclosure. Specifically, FIG. 9B depicts the operations performed for an example subprocess for terminating a round of privacy-preserving federated learning, in accordance with at least one example embodiment of the present disclosure. As described and depicted with respect to FIG. 6B, the example operations are depicted and described with respect to the perspective of privacy-preserving federated learning system 102, for example embodied by the specially configured apparatus 200.

At optional block 952, the apparatus 200 includes means, such as the privacy-preserving learning module 210, input/output module 206, communications module 208, processor 202, and/or the like, or a combination thereof, for transmitting a first masked local model request to each client device of the client device set. In this regard, the first masked client model request may indicate a new round of privacy-preserving federated learning, and the apparatus 200 may transmit such request(s) in a manner similar to that described above with respect to block 652 of FIG. 6B. It should be appreciated, however, that in at least some embodiments the client device set for which masked client model request(s) are transmitting may include one or more alternative, additional, and/or fewer client devices than the client device set described with respect to block 652. For example, one or more client device(s) may become inaccessible via one or more communications networks, and thus the apparatus 200 may become unable to communicate with the client device. Alternatively or additionally, one or more client device(s) may become available for communication via the one or more communications networks.

At block 954, the apparatus 200 includes means, such as the privacy-preserving learning module 210, input/output module 206, communications module 208, processor 202, and/or the like, or a combination thereof, for receiving a first masked model set associated with a client device set, the client device set identified by a first client device identifier set. In this regard, the first masked client model set may represent the masked client model(s) received from each client device of the client device set, and the apparatus 200 may receive the first masked client model set associated with the client device set in a manner similar to that described above with respect to block 654 of FIG. 6B. In some embodiments, the first client device identifier set includes at least one client device identifier, for a client device, that differs from the client device identifier for the client device during another round of privacy-preserving federated learning, for example at block 654. In this regard, the client device identifier may embody an anonymized client device identifier generated and/or otherwise identified by the client device for use in this round of privacy-preserving federated learning. In some such embodiments, the client device identifier for each client device may be different from client device identifier for the client device in one or more other rounds of federated learning. In yet other embodiments, the client device identifier for one or more, or all, client devices of the client device set remains the same for one or more rounds of federated learning.

At optional block 956, the apparatus 200 includes means, such as the privacy-preserving learning module 210, input/output module 206, communications module 208, processor 202, and/or the like, or a combination thereof, for receiving a first model quality metric set associated with the masked client model set. In some such embodiments, each masked client model in the first masked client model set is associated with at least one model quality metric data object of the first model quality metric data set. In this regard, each model quality metric data object may represent the accuracy, robustness, and/or other quality score for the corresponding masked client model, and the apparatus 200 may receive the first model quality metric set associated with the first masked client model set in a manner similar to that described above with respect to block 656 of FIG. 6B. In some embodiments, the model quality metric data object for a particular masked client model may change over time, for example as the associated client model is further trained. In this regard, it should be appreciated that the value for each model quality metric data object in the first model quality metric set corresponding to a masked client model may differ from the value for the corresponding model quality metric data object during a different round of privacy-preserving federated learning.

At block 958, the apparatus 200 includes means, such as the privacy-preserving learning module 210, input/output module 206, communications module 208, processor 202, and/or the like, or a combination thereof, for determining the first masked client model set does not satisfy an aggregation sufficiency rule set. In some embodiments, for example, the apparatus 200 is configured to compare the first masked client model set with one or more thresholds. For example, in some embodiments, the aggregation sufficiency rule set includes determining whether the first masked client model set satisfies a minimum model count threshold. In this regard, the apparatus 200 may determine that the first masked client model set does not satisfy a minimum model count threshold by comparing the number of masked client model(s) received in the first masked client model set with the minimum model count threshold. The minimum model count threshold may be predetermined by the apparatus 200, and/or determined based on one or more received and/or generated data values and/or one or more previous rounds of federated learning. For example, in some embodiments, the minimum model count threshold represents two-thirds of a known or expected number of communicable client devices, for example such that the minimum model count threshold is satisfied if masked client model(s) are received from two-thirds or more of the known or expected number of communicable client devices, and not satisfied otherwise. Additionally or alternatively, in at least some embodiments, the aggregation sufficiency rule set may include one or more additional sufficiency checks. For example, in at least one embodiment, the aggregation sufficiency rule set may include determining whether the combined error score for masked client model set satisfies a maximum error threshold. In other embodiments, the aggregation sufficiency rule set is configured to include one or more use-case specific sufficiency checks, for example set by a user entity offering services to the client devices of the client device set, controlling the data associated with the client devices of the client device set. and/or utilizing or otherwise providing the client model(s) to the client devices of the client device set utilizing the client model(s). In this regard, the user entity may embody a customer of the service offered via the apparatus 200, such as the entity controlling a mask combiner system and/or model distributor system. In some embodiments, the first masked client model set does not satisfy the aggregation sufficiency rule set if at least one sufficiency check in the aggregation sufficiency rule set is not satisfied. In one or more other embodiments, the first masked client model set does not satisfy the aggregation sufficiency rule set if all sufficiency checks in the aggregation sufficiency rule set are not satisfied. In some such embodiments, for example, the failure to satisfy the aggregation sufficiency rule set indicates that the received masked client model(s) of the first masked client model set does not include sufficient data to preserve the desired level of privacy and/or suitability for a particular purpose, and thus that the round of privacy-preserving federated learning should be restarted.

In at least some embodiments the apparatus 200 includes means, such as the privacy-preserving learning module 210, input/output module 206, communications module 208, processor 202, and/or the like, or a combination thereof, for transmitting at least one learning round failure data object in response to determining the first masked client model set does not satisfy an aggregation sufficiency rule set. For example, at optional block 960, the apparatus 200 includes means, such as the privacy-preserving learning module 210, input/output module 206, communications module 208, processor 202, and/or the like, or a combination thereof, for transmitting, to the client device set such as the client device set 108, a learning round failure data object. In some embodiments, the learning round failure data object represents a signal to abort the current round of privacy-preserving federated learning. Additionally or alternatively, in at least some embodiments, the learning round failure data object causes the recipient client device(s) of the client device set to restart the process to begin another round of privacy-preserving federated learning, and perform one or more actions associated therewith (e.g., again masking their client model and transmitting the masked client model to the apparatus 200, and/or at least one client mask information data object to a mask combiner system). The apparatus 200 may generate the learning round failure object, for example to include explanatory data indicating the reason the aggregation sufficiency rule set was not satisfied. In this regard, in at least some embodiments, the learning round failure data object includes one or more data values indicating a sufficiency check of the aggregation sufficiency rule set that was not satisfied.

Additionally or alternatively, at optional block 962, the apparatus 200 includes means, such as the privacy-preserving learning module 210, input/output module 206, communications module 208, processor 202, and/or the like, or a combination thereof, for transmitting, to the mask combiner system, a learning round failure data object. It should be appreciated that the learning round failure data object similarly represents a signal for the mask combiner system to abort the current round of privacy-preserving federated learning. Additionally or alternatively, in at least some embodiments, the learning round failure data object similarly causes the mask combiner system to restart the process to being another round of privacy-preserving federated learning, and perform one or more actions associated therewith (e.g., deleting previously stored client mask information to prepare for receiving new client mask information set from the client device set, and/or deleting a previously generated secured unmasking data object). It should similarly be appreciated that the learning round failure data object transmitted to the mask combiner system may similarly indicate the sufficiency check of the aggregation rule set that was not satisfied.

Additionally or alternatively, in at least one embodiment, the apparatus 200 is configured to transmit one or more learning round failure data object(s) to one or more associated systems. For example, in at least one embodiment, the apparatus 200 is configured to transmit a learning round failure data object to the model distributor system, such as the model distributor system 106. In this regard, the learning round failure data object may cause the model distributor system to delete a previously received secure unmasking data object, for example to prepare the model distributor system for a new round of privacy-preserving federated learning.

It should be appreciated that any number of federated learning rounds may be failed before a round of privacy-preserving federated learning is successful. In this regard, the process depicted with respect to FIG. 10A/FIG. 10B may be repeated for any number of times before proceeding to FIG. 6A/FIG. 6B. Similarly, in yet another context, an attempted round of privacy-preserving federated learning may be successful on the first attempt, such that the process depicted with respect to FIG. 10A/FIG. 10B is not performed and the process begins at FIG. 6A/FIG. 6B.

FIG. 10A illustrates an example data flow diagram of an example process for privacy-preserving federated learning, in accordance with at least one example embodiment of the present disclosure. Specifically, as illustrated, FIG. 10A depicts operational data flow between various devices and/or systems, specifically a privacy-preserving federated learning system 102, client device set 108, mask combiner system 104, and, optionally, a model distributor system 106. As described herein, in some embodiments, the model distributor system is embodied by one or more other systems. For example, in at least one embodiment, the privacy-preserving federated learning system 102 embodies the model distributor system 106, and performs some or all of the functions described with respect to the model distributor system 106. Additionally or alternatively, in at least some embodiments, the mask combiner system 104 embodies the model distributor system 106, and performs some or all of the functions described with respect to the model distributor system 106.

FIG. 10B illustrates an example flowchart of the data flow operations the example process for privacy-preserving federated learning, as depicted in FIG. 10A, in accordance with at least some example embodiments of the present disclosure. In this regard, the example operations are depicted and described with respect to the perspective of mask combiner system 104. In this regard, the mask combiner system 104 may be embodied by any number of computing devices, for example the apparatus 300 as depicted and described herein with respect to FIG. 3. It should be appreciated that one or more of the corresponding device(s) and/or system(s) may be embodied by the specially configured apparatuses as described herein, for example the privacy-preserving federated learning system 102 may be embodied by the apparatus 200 as depicted and described herein with respect to FIG. 2, and/or the model distributor system 106 may be embodied by the apparatus 400 as depicted and described herein with respect to FIG. 4. In this regard, each operation will be described from the perspective of the mask combiner system 104 embodied by the specially configured apparatus 300.

Additionally or alternatively, in some embodiments, the mask combiner system 104 is embodied by one or more client device(s), such as a client device of the client device set 108. In this regard, each client device embodying the mask combiner system 104 may be embodied, in whole or in part, by the apparatus 300.

At optional block 1002, the apparatus 300 includes means, such as the mask management module 310, input/output module 306, communications module 308, processor 302, and/or the like, or a combination thereof, for receiving a client mask information set associated with a client model set. Additionally or alternatively, in at least some embodiments, the apparatus 300 is configured for receiving a client device identifier set, for example where each client mask information data object in the client mask information set corresponds to a client mask information data object of the client mask information set. In this regard, in some embodiments, the client mask information set is further associated with the client device set. For example, as described, each client device may be associated with a client device identifier, and the client device may be associated with both a masked client model and a corresponding client mask information data object. The client mask information set may include any number of client mask information data object(s). Each client mask information data object may include one or more data objects utilized in masking the corresponding client model to generate the masked client model. It should be appreciated that, in at least one example embodiment, each client mask information data object comprises at least a randomized element data object and/or an additional element data object utilized in generating the masked client model.

At optional block 1004, the apparatus 300 includes means, such as the mask management module 310, input/output module 306, communications module 308, processor 302, and/or the like, or a combination thereof, for storing the client mask information set in at least one datastore. In this regard, the apparatus 300 may maintain one or more local and/or remote datastores configured to enable storage, retrieval, and/or maintenance of at least client mask information data object(s). In this regard, in some embodiments, the client mask information set is stored such that each client mask information data object is stored associated with a corresponding client device identifier. It should be appreciated that, in at least some embodiments, one or more datastores is configured for storing the client mask information set in any number of databases, tables, data records, and/or the like.

At optional block 1006, the apparatus 300 includes means, such as the mask management module 310, input/output module 306, communications module 308, processor 302, and/or the like, or a combination thereof, for retrieving at least a portion of the client mask information set from the at least one datastore. In at least one embodiment, for example, the portion of the client mask information set is retrieved to return the stored client mask information set to working memory for processing. For example, in at least one example embodiment, the apparatus 300 is configured for retrieving one or more client mask information data object(s) from the at least one datastore once a predetermined number of client mask information data object(s) were received from the client device(s) of the client device set.

At block 1008, the apparatus 300 includes means, such as the mask management module 310, input/output module 306, communications module 308, processor 302, and/or the like, or a combination thereof, for receiving a selected client model indicator indicating at least one selected client model from the client model set. In some embodiments, the selected client model indicator is received from a privacy-preserving federated learning system, for example the privacy-preserving federated learning system 102. In this regard, the selected client model indicator may include data associated with and/or otherwise representing the masked client model(s) selected in an aggregation masked model set. For example, in at least one embodiment, the selected client model indicator comprises at least a client device identifier associated with each masked client model in the aggregation model set selected by the privacy-preserving federated learning system, for example the privacy-preserving federated learning system 102. In this regard, in some such embodiments, the client device identifier(s) represented in the selected client model indicator may each correspond to a client mask information data object of the client mask information set for use in generating a secure unmasking data object to be used for unmasking a masked updated global model generated from the corresponding masked client model(s).

At block 1010, the apparatus 300 includes means, such as the mask management module 310, input/output module 306, communications module 308, processor 302, and/or the like, or a combination thereof, for generating a secure unmasking data object associated with the selected client model indicator. In at least some embodiments, the secure unmasking data object is generated using one or more algorithms for combining any number of client mask information data object(s). In this regard, the client mask information set may be combined to generate a secure unmasking data object that is configured for use in unmasking a masked updated global model generated based on an aggregation model set corresponding to the selected client model indicator. In an example context where one or more masked client models were not selected (e.g., where the selected client model indicator does not include a client device identifier associated with the masked client model), the corresponding client mask information data object(s) may not be utilized for generating the secure unmasking data object. For example, in at least some embodiments, the apparatus 300 is configured to generate the secure unmasking data object based on at least one or more data object(s) embodied in the client mask information data object(s) in the client mask information set, for example as described herein with respect to FIG. 10C.

In this regard, FIG. 10C illustrates an example subprocess for privacy-preserving federated learning, in accordance with at least one example embodiment of the present disclosure. Specifically, FIG. 10C depicts an example subprocess for generating a secure unmasking data object based on at least the received client mask information set. As illustrated, the process depicted in FIG. 10C may begin after some or all operations of another process, for example after at least block 1008 as depicted and described. Additionally, as illustrated, the process depicted in FIG. 10C may proceed to one or more other operations upon completion of the blocks depicted. For example, in at least one embodiment, flow may return to block 1012 as depicted and described with respect to FIG. 10B upon completion of the process depicted with respect to FIG. 10C. In yet other embodiments, the flow may end upon completion of the process depicted with respect to FIG. 10C.

At block 1052, the apparatus 300 includes means, such as the mask management module 310, input/output module 306, communications module 308, processor 302, and/or the like, or a combination thereof, for generating the secure unmasking data object based on at least (1) a randomized element data object for each client mask information data object of the client mask information set that corresponds to a client device identifier represented in the selected client model indicator, and (2) an additional element data object. For example, in this regard, the apparatus 300 may generate the secure unmasking data object by summing the value of the randomized element data object (modulo the natural number element data object), for each client mask information data object that corresponds to a client device identifier represented in the selected client model indicator. In this regard, the secure unmasking data object is generated such that it is mathematically certain to be usable to decrypt the combination of masked client models corresponding to the same client device identifiers as the client mask information data object(s) utilized in generating the secure unmasking data object.

Returning to block 1010, flow continues to optional block 1012. At optional block 1012, the apparatus 300 includes means, such as the mask management module 310, input/output module 306, communications module 308, processor 302, and/or the like, or a combination thereof, for determining the client mask information set satisfies an aggregation sufficiency rule set. It should be appreciated that, in at least one embodiment, the aggregation sufficiency rule set embodies the same aggregation sufficiency rule set utilized by a corresponding privacy-preserving federated learning system, for example the privacy-preserving federated learning system 102 embodied by the specially configured apparatus 200, and/or a subset thereof. In at least one example embodiment, for example, the aggregation sufficiency rule set includes one or more sufficiency checks to determine whether the client mask information set, and/or a subset thereof for example based on the selected client model indicator, satisfies a minimum model count threshold. In this regard, the apparatus 300 may compare the number of client mask information data object(s) embodied in the client mask information set, and/or the number of client device identifiers embodied by the selected client model indicator, with a minimum model count threshold to determine whether the corresponding number of masked client model(s) satisfies the minimum model count threshold. Alternatively or additionally, in at least some embodiments, the apparatus 300 is configured to determine whether the client mask information set satisfies one or more additional threshold(s). As described herein, it should be appreciated that the flow may continue in a circumstance where the apparatus 300 determines the client mask information set, and/or one or more associated data objects such as the selected client model indicator, satisfies the aggregation sufficiency rule set.

In at least some embodiments, flow then proceeds to block B. In this regard, at block B, the apparatus 300 may be configured for transmitting, to an unmasking system, the secure unmasking data object. In some embodiments, the unmasking system is embodied by the privacy-preserving federated learning system, such as the privacy-preserving federated learning system 102. In some other embodiments, the unmasking system is embodied by the model distributor system, such as the model distributor system 106. In this regard, in at least some embodiments, the apparatus 300 proceeds to block B as depicted and described with respect to FIG. 11A. Alternatively or additionally, in at least some embodiments, the apparatus 300 proceeds to block B as depicted and described with respect to FIG. 12A.

FIG. 11A illustrates an example data flow diagram of additional operations for an example process for privacy-preserving federated learning, in accordance with at least one example embodiment of the present disclosure. Specifically, the operational data flow depicted represents an example subprocess for transmitting the secure unmasking data object to an unmasking system. As illustrated, FIG. 11A depicts the operational data flow between the various devices and/or systems depicted and described with respect to FIG. 10A.

FIG. 11B illustrates an example flowchart of the data flow operations the example process for privacy-preserving federated learning, as depicted in FIG. 11A, in accordance with at least some example embodiments of the present disclosure. Specifically, FIG. 11B depicts the operations performed for the example subprocess for transmitting the secure unmasking data object to an unmasking system. As described and depicted with respect to FIG. 11B, the example operations are depicted and described with respect to the perspective of a mask combiner system 104, for example embodied by the specially configured apparatus 300. Additionally or alternatively, in some embodiments, the mask combiner system 104 is embodied by one or more client device(s), such as a client device of the client device set 108. In this regard, each client device embodying the mask combiner system 104 may be embodied, in whole or in part, by the apparatus 300.

At optional block 1102, the apparatus 300 includes means, such as the mask management module 310, input/output module 306, communications module 308, processor 302, and/or the like, or a combination thereof, for identifying an unmasking system, the unmasking system comprising the privacy-preserving federated learning system. In this regard, the apparatus 300 may be configured to predetermine the unmasking system comprises, and/or otherwise is embodied by, the privacy-preserving federated learning system, for example based on one or more configuration settings of the apparatus 300. Alternatively or additionally, in at least some embodiments, the apparatus 300 identifies the unmasking system comprises, and/or otherwise is embodied by, the privacy-preserving federated learning system based on one or more determinations. For example, in at least one example embodiment, the apparatus 300 is configured to identify the unmasking system comprises, and/or otherwise is embodied by, the privacy-preserving federated learning system based on permission settings associated with the client device set from which client mask information data object(s) were received. For example, in at least one example context, if all client devices associated with received client mask information data object(s) are associated with sufficient permissions data that allows third-party entities to access the data embodied by and/or associated with the client model(s), the apparatus 300 may identify the privacy-preserving federated learning system as the unmasking system. In some such embodiments, within this example context, in a circumstance where the apparatus 300 determines one or more client device(s) are not associated with such permission data, the apparatus 300 may identify another system, such as a model distributor system, as the unmasking system, for example as described below with respect to FIG. 12A and FIG. 12B.

At block 1104, the apparatus 300 includes means, such as the mask management module 310, input/output module 306, communications module 308, processor 302, and/or the like, or a combination thereof, for transmitting the secure unmasking data object to the privacy-preserving federated learning system. In some such embodiments, transmitting the secure unmasking data object causes the privacy-preserving federated learning system to distribute an unmasked updated global model to the client device set. For example, in at least one example context, the transmission may cause the privacy-preserving federated learning system to utilize the secure unmasking data object to generate an unmasked updated global model from a masked updated global model. Additionally or alternatively, the transmission may subsequently cause the privacy-preserving federated learning system to distribute the unmasked updated global model directly to the client device(s) of the client device set, or transmit the unmasked updated global model to a model distributor system, such as the model distributor system 106, for distribution to the client device set indirectly through the model distributor system as described herein.

FIG. 12A illustrates another example data flow diagram of additional operations for an example process for privacy-preserving federated learning, in accordance with at least one example embodiment of the present disclosure. Specifically, the operational data flow depicted represents another example subprocess for transmitting the secure unmasking data object to an unmasking system. As illustrated, FIG. 12A depicts the operational data flow between the various devices and/or systems depicted and described with respect to FIG. 10A.

FIG. 12B illustrates an example flowchart of the data flow operations the example process for privacy-preserving federated learning, as depicted in FIG. 12A, in accordance with at least some example embodiments of the present disclosure. Specifically, FIG. 12B depicts the operations performed for another example subprocess for transmitting the secure unmasking data object to an unmasking system. As described and depicted with respect to FIG. 10B, the example operations are depicted and described with respect to the mask combiner system 104, for example embodied by the specially configured apparatus 300. Additionally or alternatively, in some embodiments, the mask combiner system 104 is embodied by one or more client device(s), such as a client device of the client device set 108. In this regard, each client device embodying the mask combiner system 104 may be embodied, in whole or in part, by the apparatus 300.

At optional block 1102, the apparatus 300 includes means, such as the mask management module 310, input/output module 306, communications module 308, processor 302, and/or the like, or a combination thereof, for identifying an unmasking system, the unmasking system comprising the model distributor system. In this regard, the apparatus 300 may be configured to predetermine the unmasking system comprises, and/or otherwise embodies, the model distributor system, for example based on one or more configuration settings of the apparatus 300. In some such embodiments, the apparatus 300 is configured to always transmit the secure unmasking data object to the model distributor system for use in distribution. Alternatively or additionally, in at least some embodiments, the apparatus 300 identifies the unmasking system comprises, and/or otherwise embodies, the model distributor system based on one or more determinations. For example, in at least one example embodiment, the apparatus 300 is configured to identify the unmasking system comprises, and/or otherwise embodies, the model distributor system based on permission settings associated with the client device set from which client mask information data object(s) were received. For example, in at least one example context, if any of the client devices associated with received client mask information data object(s) are not associated with sufficient permissions data that allows third-party entities to access the data embodied by and/or associated with the client model(s), the apparatus 300 may identify the model distributor system as the unmasking system. Additionally or alternatively, in some example embodiments, the apparatus 300 is configured to receive additional request data indicating a request for distribution via a model distributor system rather than through a privacy-preserving federated learning system from any of the client device(s). In some such contexts, the apparatus 300 may identify the unmasking system comprises, and/or otherwise embodies, the model distributor system in response to receiving such additional request data.

At block 1104, the apparatus 300 includes means, such as the mask management module 310, input/output module 306, communications module 308, processor 302, and/or the like, or a combination thereof, for transmitting the secure unmasking data object to the model distributor system. In some such embodiments, transmitting the secure unmasking data object causes the model distributor system to distribute an unmasked updated global model to the client device set. For example, in at least one example context, the model distributor system receives the secure unmasking data object from the apparatus 300 and a masked updated global model from the privacy-preserving federated learning system, where the masked updated global model may be received before or after the secure unmasking data object. In this regard, the model distributor system may be caused, by transmission of the secure unmasking data object, to generate the unmasked updated global model by unmasking the masked updated global model using the secure unmasking data object, and subsequently distribute the unmasked updated global model to the client device(s) of the client device set, such as the client device set 108. In this regard, the model distributor system may transmit the unmasked updated global model to each of the client device(s).

Upon receiving the unmasked updated global model, each client device may replace its client model with the unmasked updated global model. In this regard, each client model may be configured to continue to train its version of the unmasked updated global model, for example locally with respect to the privacy-preserving federated learning system. In this regard, the unmasked updated global model maintained by each client device of the client device set may be updated differently from the other unmasked updated global model(s) for the other client device(s) of the client device set. Such client device models may again be utilized in any number of rounds of federated learning, for example such that the above processes are repeated for any number of times.

FIG. 13A illustrates another example data flow diagram of additional operations for an example process for privacy-preserving federated learning, in accordance with at least one example embodiment of the present disclosure. Specifically, the operational data flow depicted represents an example subprocess for terminating a round of privacy-preserving federated learning, in accordance with at least one example embodiment of the present disclosure. As illustrated, FIG. 13A depicts the operational data flow between the various devices and/or systems depicted and described with respect to FIG. 10A.

FIG. 13B illustrates an example flowchart of the data flow operations the example process for privacy-preserving federated learning, as depicted in FIG. 13A, in accordance with at least some example embodiments of the present disclosure. Specifically, FIG. 13B depicts the operations performed for an example subprocess for terminating a round of privacy-preserving federated learning, in accordance with at least one example embodiment of the present disclosure. As described and depicted with respect to FIG. 13B, the example operations are depicted and described with respect to the perspective of mask combiner system 104, for example embodied by the specially configured apparatus 300. Additionally or alternatively, in some embodiments, the mask combiner system 104 is embodied by one or more client device(s), such as a client device of the client device set 108. In this regard, each client device embodying the mask combiner system 104 may be embodied, in whole or in part, by the apparatus 300.

At optional block 1302, the apparatus 300 includes means, such as the mask management module 310, input/output module 306, communications module 308, processor 302, and/or the like, or a combination thereof, for receiving, from the client device set such as the client device set 108, a first mask information set. The first client mask information set may be received for use in the current round of privacy-preserving federated learning, such as newly begun round of privacy-preserving federated learning. In this regard, the apparatus 300 may receive the first client mask information set from the client device set in a manner similar to that described above with respect to block 1002. It should be appreciated that, in at least some embodiments, the apparatus 300 may receive one or more alternative, additional, and/or fewer client mask information data object(s), for example as one or more client device(s) lose communication connectivity with the apparatus 300 over one or more communications networks. It should also be appreciated that, in some embodiments in which the apparatus 300 embodies at least one client device, the determination of the latter set of client devices may impact the value of the second client mask information set based on the selected client device(s).

At block 1304, the apparatus 300 includes means, such as the mask management module 310, input/output module 306, communications module 308, processor 302, and/or the like, or a combination thereof, for determining the first client mask information set does not satisfy an aggregation sufficiency rule set. In at least one example context, the aggregation sufficiency rule set embodies one or more efficiency checks to be performed associated with the data received by, and/or otherwise accessible to, the apparatus 300. In some embodiments, for example, the apparatus 300 is configured to compare the first client mask information set with one or more thresholds. For example, in some embodiments, the aggregation sufficiency rule set includes determining whether the first client mask information set satisfies a minimum model count threshold. In this regard, the apparatus 300 may determine that the first client mask information set does not satisfy a minimum model count threshold by comparing the number of client mask information data object(s) received in the first client mask information set with the minimum model count threshold. The minimum model count threshold may be predetermined by the apparatus 300, and/or determined based on one or more received and/or generated data values, and/or one or more previous rounds of federated learning. For example, in some embodiments, the minimum model count threshold represents two-thirds of a known or expected number of communicable client devices, for example such that the minimum model count threshold is satisfied if client mask information data object(s) are received from two-thirds or more of the known or expected number of communicable client devices, and not satisfied otherwise. It should be appreciated that, in at least some embodiments, the aggregation sufficiency rule set is identical, in whole or in part, to an aggregation sufficiency rule set utilized by a privacy-preserving federated learning system. Additionally or alternatively, in at least some embodiments, the aggregation sufficiency rule set maintained by the apparatus 300 may include one or more sufficiency checks similar to those embodied by an aggregation sufficiency rule set maintained by the privacy-preserving federated learning system.

In at least some embodiments, the apparatus 300 further includes means, such as the mask management module 310, input/output module 306, communications module 308, processor 302, and/or the like, or a combination thereof, for transmitting at least one learning round failure data object in response to determining the first client mask information set does not satisfy an aggregation sufficiency rule set. For example, at optional block 1306, the apparatus 300 includes means, such as the mask management module 310, input/output module 306, communications module 308, processor 302, and/or the like, or a combination thereof, for transmitting, to the client device set such as the client device set 108, a learning round failure data object. In this regard, the apparatus 300 may transmit the learning round failure data object to the client device set in a manner similar to that of the apparatus 200 as described above with respect to block 960. In this regard, in at least some embodiments, the learning round failure data object represents a signal to abort the current round of privacy-preserving federated learning. In this regard, in at least some embodiments, the learning round failure data object causes the recipient client device(s) of the client device set to restart the process to begin another round of privacy-preserving federated learning, and perform one or more actions associated therewith (e.g., again masking their client model and transmitting the client mask information to the apparatus 300, and/or at least one masked client device to a privacy-preserving federated learning system). The apparatus 300 may generate the learning round failure object, for example to include explanatory data indicating the reason the aggregation sufficiency rule set was not satisfied. In this regard, in at least some embodiments, the learning round failure data object includes one or more data values indicating a sufficiency check of the aggregation sufficiency rule set that was not satisfied.

Additionally or alternatively, at optional block 1308, the apparatus 300 includes means, such as the mask management module 310, input/output module 306, communications module 308, processor 302, and/or the like, or a combination thereof, for transmitting, to the privacy-preserving federated learning system, a learning round failure data object. It should be appreciated that the learning round failure data object similarly represents a signal for privacy-preserving federated learning system to abort the current round of privacy-preserving federated learning. Additionally or alternatively, in at least some embodiments, the learning round failure data object similarly causes the privacy-preserving federated learning system to restart the process to being another round of privacy-preserving federated learning, and perform one or more actions associated therewith (e.g., deleting previously stored masked client model(s) to prepare for receiving a new masked client model set from the client device set, and/or deleting a previously generated masked updated global model). It should similarly be appreciated that the learning round failure data object transmitted to the privacy-preserving federated learning model may similarly indicate the sufficiency check of the aggregation rule set that was not satisfied.

Additionally or alternatively, in at least one embodiment, the apparatus 300 is configured to transmit one or more learning round failure data object(s) to one or more associated systems. For example, in at least one embodiment, the apparatus 300 is configured to transmit a learning round failure data object to the model distributor system, such as the model distributor system 106. In this regard, the learning round failure data object may cause the model distributor system to delete a previously received masked updated global model, for example to prepare the model distributor system for a new round of privacy-preserving federated learning.

In some embodiments, the apparatus 300 is additionally or alternatively configured to transmit one or more learning round failure data object(s) based on one or more alternative determinations. For example, in at least one example embodiment, the apparatus 300 is configured to transmit one or more learning round failure data object(s) in a circumstance where the privacy-preserving federated learning system and/or a model distributor system becomes unresponsive. Additionally or alternatively, in some embodiments, the apparatus 300 may be configured to transmit one or more learning round failure data object(s) in a circumstance where conflicting information is received from one or more client device(s) and/or the privacy-preserving federated learning system.

It should be appreciated that any number of federated learning rounds may be failed before a round of privacy-preserving federated learning is successful. In this regard, the process depicted with respect to FIG. 13A/FIG. 13B may be repeated for any number of times before proceeding to FIG. 10A/FIG. 10B. Similarly, in yet another context, an attempted round of privacy-preserving federated learning may be successful on the first attempt, such that the process depicted with respect to FIG. 13A/FIG. 13B is not performed and the process begins at FIG. 10A/FIG. 10B.

Example Embodiments of a Mask Combiner System Embodied by One or More Client Devices FIG. 14A illustrates an example data flow diagram of additional operations for an example process for privacy-preserving federated learning, specifically in a context where a mask combiner system is embodied by one or more client device(s), in accordance with at least one example embodiment of the present disclosure. The data flow includes operations performed by a plurality of devices. For example, in at least one embodiment, the privacy-preserving federated learning system 102 is in communication with at least a mask combiner selected client device subset 152, where the mask combiner selected client device subset 152 embodies a mask combiner system. Additionally or alternatively, in some embodiments, the mask combiner selected client device subset 152 and/or privacy-preserving federated learning system 102 are configured for communicating with a model distributor system, such as the model distributor system 106. In some embodiments, the privacy-preserving federated system 102 is configured to perform some or all of the functions described with respect to the model distributor system 106.

FIG. 14B illustrates an example flowchart of the data flow operations the example process for privacy-preserving federated learning, as depicted in FIG. 14A, in accordance with at least some example embodiments of the present disclosure. Specifically, FIG. 14B depicts operations in a context where a mask combiner system is embodied by one or more client device(s). As described and depicted with respect to FIG. 14B, the example operations are depicted and described with respect to the perspective of privacy-preserving federated learning system 102, for example embodied by the specially configured apparatus 200.

In some embodiments, the process depicted with respect to FIG. 14B occurs in parallel and/or as a subprocess for one or more of the processes for privacy-preserving federated learning as described herein. For example, in some embodiments, one or more of the operations occurs in parallel with the operations as described above with respect to FIGS. 6A-13A and/or 6B-13B. In one such example context, the apparatus 200 is configured to generate a masked updated global model in series and/or in parallel with the operations depicted and described with respect to FIGS. 14A and 14B, and/or distribute the masked updated global model and/or corresponding unmasked updated global model in series or parallel with the operations depicted and described with respect to FIGS. 14A and 14B. As illustrated, for example, flow proceeds to block operation 754 upon completion of the process as depicted and described with respect to FIGS. 14A and 14B.

At optional block 1452, the apparatus 200 includes means, such as the privacy-preserving learning module 210, input/output module 206, communications module 208, processor 202, and/or the like, or a combination thereof, for transmitting to a mask combiner selected client device subset, such as the subset 152, associated with a client device set, such as the client device set 108, at least one transmission indicating the client device(s) were selected for use in generating a secure unmasking data object. In some embodiments, for example, the at least one transmission comprises at least one request provided for and/or otherwise transmitted to each client device of the selected client device subset. The one or more transmissions may be specially configure to identify the client devices selected, for example randomly or based on one or more determinations, to be included in the mask combiner selected client device subset, and/or otherwise selected for use in generating a secure unmasking data object. In this regard, each client device of the mask combiner selected client device subset may embody a mask combiner system, and/or otherwise perform mask combiner functionality such as generating the secure unmasking data object from a set of client mask data object(s). As described, for example, the apparatus 200 is configured to transmit, to the mask combiner selected client device subset and/or all client devices of a client device set, a random block Q and one or more numerical threshold values, such as threshold a and/or threshold b. Each client device selected to be included in the mask combiner selected client device subset may be configured to verify its selection by determining the cryptographic hash of its own digital signature on Q, and/or some metadata, is below or otherwise satisfies a corresponding threshold.

At optional block 1454, the process includes encrypting, by one or more client devices of the client device set, such as the client device set 108, a client mask information data object to generate an encrypted client mask information data object. In some embodiments, the encrypted client mask information data object is semantically secured, for example such that neither the underlying client mask information data object nor any information associated with and/or derived from the underlying client mask information data object may be determined without unencrypting. It should be appreciated that the encryption may be performed using any of a myriad of known encryption methodologies. For example, in at least one embodiment, the encrypted client mask information object is generated utilizing the ElGamal encryption algorithm, and/or another semantically secured encryption methodology. In some embodiments, only a portion of the client device set is configured to encrypt their respective client mask information data object(s), for example those client devices indicated as selected for use based on one or more transmissions from the apparatus 200, as described herein.

At block 1456, the apparatus 200 includes means, such as the privacy-preserving learning module 210, input/output module 206, communications module 208, processor 202, and/or the like, or a combination thereof, for receiving, from the client device set, a client mask information set. In some such embodiments, the client mask information set may be used for distributing to one or more client device(s) of the mask combiner selected client device set. For example, in some embodiments, the client mask information set includes a client mask information data object received from each client device selected for use in the current round of privacy-preserving federated learning. In this regard, in some such embodiments, the client device(s) for which client mask information data object(s) are received may further each transmit a masked client model for use in generating a corresponding masked updated global model, as described herein. In some embodiments, the client mask information set includes one or more encrypted client mask information data objects received from one or more client device(s) of the client device set. In this regard, the underlying client mask information data object(s) for such encrypted data object(s) may be inaccessible to the apparatus 200. In this regard, the apparatus 200 cannot utilize such client mask information data object(s) to unmask any corresponding masked client model(s).

At optional block 1458, the apparatus 200 includes means, such as the privacy-preserving learning module 210, input/output module 206, communications module 208, processor 202, and/or the like, or a combination thereof, for transmitting, for at least one client device of the masked combiner selected client device set, at least one client mask information data object for another client device of the mask combiner selected client device subset. In some such embodiments, the apparatus 200 is configured, for each client device of the mask combiner selected client device subset, to transmit at least the client mask information data object(s) for each other client device in the mask combiner selected client device subset. In some embodiments, the apparatus 200 may transmit the entire client mask information set to each client device of the mask combiner selected client device subset. In this regard, each client device selected as embodying a mask combiner system may utilized the received client mask information data object(s) to generate a corresponding secure unmasking data object. In one such example context, each client device may be configured to aggregate the received client mask information data objects to generate a corresponding secure unmasking data object.

At optional block 1460, the apparatus 200 includes means, such as the privacy-preserving learning module 210, input/output module 206, communications module 208, processor 202, and/or the like, or a combination thereof, for receiving at least one secure unmasking data object from the mask combiner selected client device subset. For example, in at least one example context, one client device of the mask combiner selected client device subset is configured to transmit the secure unmasking data object to the apparatus 200. In some such embodiments, the secure unmasking data object is to be utilized by the apparatus 200 for unmasking a corresponding masked updated global model, and/or for distribution to one or more system(s) intended to perform the unmasking. In some such embodiments, only a single secure unmasking data object is received, for example in contexts where the trustworthiness of the client device(s) of the mask combiner selected client device subset is not a concern. Alternatively or additionally, in some embodiments, the apparatus 200 is configured to receive a plurality of secure unmasking data object(s). For example, in some embodiments, the apparatus 200 receives a secure unmasking data object set including a secure unmasking data object from each client device of the mask combiner selected client device subset (and/or a subset thereof, for example only from client devices that remained communicable over one or more network(s)).

At optional block 1462, the apparatus 200 includes means, such as the privacy-preserving learning module 210, input/output module 206, communications module 208, processor 202, and/or the like, or a combination thereof, for selecting the secure unmasking data object for use in unmasking a corresponding masked updated global model. The apparatus 200 may be configured to select the secure unmasking data object for use from the at least one secure unmasking data object. In some embodiments, the apparatus 200 is configured for selecting the secure unmasking data object for use in a context where the trustworthiness of one or more client devices may be a concern, for example where the client devices remain under third-party control, for example by one or more consumer.

In this regard, the apparatus 200 may receive a plurality of secure unmasking data objects, for example from each client device of the mask combiner selected client device subset. In some embodiments, the apparatus 200 is configured to select the secure unmasking data object for use based on the plurality of received secure unmasking data object(s). For example, where the apparatus 200 receives a secure unmasking data object set, the apparatus 200 may be configured to select the secure unmasking data object for use that appears most frequently in the secure unmasking data object set. In this regard, the apparatus 200 may assume the secure unmasking data object is correct in circumstances where the non-malicious client devices in the mask combiner selected client device subset exceeds the number of malicious client devices in the subset. In other embodiments, the apparatus 200 may be configured to select the secure unmasking data object based on any other business rules, algorithms, and/or the like, accessible to the apparatus 200. In this regard, it should be appreciated that the apparatus 200 may be configured to select the secure unmasking data object based on any number and/or combination of determinations.

The apparatus 200 may utilize the selected secure unmasking data object for any of a myriad of purposes. In some embodiments, for example as described, the apparatus 200 may utilize the secure unmasking data object to unmask a masked updated global model received and/or generated by the apparatus 200. Similarly, in some such embodiments, the apparatus 200 may distribute the unmasked updated global model to one or more client devices, and/or all client devices, of the client device set, for example directly and/or indirectly through communication with a model distributor system. Alternatively or additionally, in some embodiments, the apparatus 200 is configured to distribute the secure unmasking data object to one or more systems, devices, and/or the like for use in unmasking a corresponding masked updated global model.

In some embodiments, it should be appreciated that the apparatus 200 may not receive the secure unmasking data object. In some such embodiments, for example, the process may end at one or more earlier blocks, for example at block 1458. In some such embodiments, the apparatus 200 may proceed, in serial and/or in parallel, with generating and/or distributing a masked updated global model corresponding to the client devices selected for use in the current round of privacy-preserving federated learning. In this regard, in some embodiments for example, the apparatus 200 may distribute the masked updated global model to one or more systems for subsequent unmasking and/or utilization. For example, in some embodiments, the apparatus 200 may distribute the masked updated global model to the client devices of the client device set, and/or one or more of the client devices of the mask combiner selected client device subset may transmit the generated secure unmasking data object(s) for use in unmasking the corresponding masked updated global model. Alternatively or additionally, in some embodiments, the apparatus 200 distributes the masked updated global model to a model distributor system, such as the model distributor system 106, and/or one or more client device(s) of the mask combiner selected client device subset transmit the secure unmasking data object(s) for use in unmasking the masked updated global model to the model distributor system. Accordingly, the model distributor system 106 may be configured to unmask the masked updated global model, and transmit the corresponding unmasked updated global model to one or more devices and/or systems, such as the client devices of the client device set 108.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array), GPU (Graphical Processing Unit), or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination, for example where a set of client devices perform the functionality of, and/or otherwise embodies, a mask combiner system.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for privacy-preserving federated learning, the apparatus comprising at least one processor and at least one non-transitory memory, the non-transitory memory comprising computer-coded instructions stored thereon, wherein the computer-coded instructions, in execution with the at least one processor, configure the apparatus to:
   receive a masked client model set, each masked client model of the masked client model set associated with a client device of a client device set, the client device set identified by a client device identifier set;
   select an aggregation masked model set from the masked client model set, wherein the aggregation masked model set is associated with a selected device identifier set associated with the client device identifier set;
   generate a masked updated global model based on at least the aggregation model set;
   transmit, to a mask combiner system, a selected client model indicator based on at least the selected device identifier set and the aggregation masked model set; and
   distribute, to the client device, the masked updated global model or an unmasked updated global model generated based on at least the masked updated global model.

2. The apparatus of claim 1, the apparatus further configured to:
   transmitting a masked client model request to each client device of the client device set,
   wherein the masked client model set is received in response to transmitting the masked client model request to each client device of the client device set.

3. The apparatus of claim 1, wherein to select the aggregation masked model set from the masked client model set, the apparatus is configured to:
   receive a model quality metric set associated with the masked client model set, wherein each masked client model in the masked client model set is associated with a model quality metric data object in the model quality metric set; and
   select the aggregation masked model set based on at least the model quality metric set.

4. The apparatus of claim 1, wherein the client device identifier set comprises an anonymized device identifier set.

5. The apparatus of claim 1, wherein the masked client model set comprises a second masked client model set, and the apparatus further configured to:
   receive a first masked client model set, each masked client model of the first masked client model set associated with the client device set, and
   wherein the apparatus is configured to receive the second client masked client model set in response to a determination the first masked client model set does not satisfy an aggregation sufficiency rule set.

6. The apparatus of claim 1, the apparatus further configured to:
   determine the aggregation masked model set satisfies an aggregation sufficiency rule set.

7. The apparatus of claim 1, the apparatus further configured to:
   receive, from the mask combiner system, a secure unmasking data object; and
   unmask the masked updated global model, using the secure unmasking data object, to generate the unmasked updated global model,
   wherein to distribute, to the client device set, the masked updated global model or the unmasked updated global model, the apparatus is configured to:
      distribute, to the client device set, the unmasked updated global model.

8. The apparatus of claim 1, wherein to distribute, to the client device, the masked updated global model or the unmasked updated global model, the apparatus is configured to:
   transmit the masked updated global model to a model distributor system, wherein the model distributor system is configured to receive a secure unmasking data object,
   wherein transmitting the masked updated global model to the model distributor system causes the model distributor system to generate the unmasked updated global model and distribute the unmasked updated global model to the client device set.

9. The apparatus of claim 1, wherein to distribute, to the client device, the masked updated global model or the unmasked updated global model, the apparatus is configured to:

transmit the masked updated global model to a model distributor system, wherein the model distributor system is configured to receive a secure unmasking data object, wherein transmitting the masked updated global model to the model distributor system causes the model distributor system to generate the unmasked updated global model and distribute the unmasked updated global model to the client device set.

10. The apparatus of claim 1, wherein the mask combiner system is embodied by a mask combiner selected client device subset associated with the client device set, and wherein to transmit, to the mask combiner system, the selected client model indicator, the apparatus is configured to:

transmit, to the mask combiner selected client device subset, at least one request indicating each client device of the mask combiner selected client device subset was selected for generating a secure unmasking data object.

11. A computer-implemented method for privacy-preserving federated learning, the computer-implemented method comprising:

receiving a masked client model set, each masked client model of the masked client model set associated with a client device of a client device set, the client device set identified by a client device identifier set;

selecting an aggregation masked model set from the masked client model set, wherein the aggregation masked model set is associated with a selected device identifier set associated with the client device identifier set;

generating a masked updated global model based on at least the aggregation model set;

transmitting, to a mask combiner system, a selected client model indicator based on at least the selected device identifier set and the aggregation masked model set; and distributing, to the client device, the masked updated global model or an unmasked updated global model generated based on at least the masked updated global model.

12. The computer-implemented method of claim 11, the computer-implemented method further comprising:

transmitting a masked client model request to each client device of the client device set, wherein the masked client model set is received in response to transmitting the masked client model request to each client device of the client device set.

13. The computer-implemented method of claim 11, wherein selecting the aggregation masked model set from the masked client model set comprises:

receiving a model quality metric set associated with the masked client model set, wherein each masked client model in the masked client model set is associated with a model quality metric data object in the model quality metric set; and selecting the aggregation masked model set based on at least the model quality metric set.

14. The computer-implemented method of claim 11, wherein the masked client model set comprises a second masked client model set, the computer-implemented method further comprising:

receiving a first masked client model set, each masked client model of the first masked client model set associated with the client device set, wherein the computer-implemented method comprises receiving the second client masked client model set in response to a determination the first masked client model set does not satisfy an aggregation sufficiency rule set.

15. The computer-implemented method of claim 11, the computer-implemented method further comprising:

determining the aggregation masked model set satisfies an aggregation sufficiency rule set.

16. The computer-implemented method of claim 11, the computer-implemented method further comprising:

receiving, from the mask combiner system, a secure unmasking data object; and unmasking the masked updated global model, using the secure unmasking data object, to generate the unmasked updated global model, wherein distributing, to the client device set, the masked updated global model or the unmasked updated global model comprises:

distributing, to the client device set, the unmasked updated global model.

17. The computer-implemented method of claim 11, wherein distributing, to the client device, the masked updated global model or the unmasked updated global model comprises:

transmitting the masked updated global model to a model distributor system, wherein the model distributor system is configured to receive a secure unmasking data object, wherein transmitting the masked updated global model to the model distributor system causes the model distributor system to generate the unmasked updated global model and distribute the unmasked updated global model to the client device set.

18. The computer-implemented method of claim 11, wherein distributing, to the client device, the masked updated global model or the unmasked updated global model comprises:

transmitting the masked updated global model to a model distributor system, wherein the model distributor system is configured to receive a secure unmasking data object, wherein transmitting the masked updated global model to the model distributor system causes the model distributor system to generate the unmasked updated global model and distribute the unmasked updated global model to the client device set.

19. The computer-implemented method of claim 11, wherein the mask combiner system is embodied by a mask combiner selected client device subset associated with the client device set, and wherein transmitting, to the mask combiner system, the selected client model indicator comprises:

transmitting, to the mask combiner selected client device subset, at least one request indicating each client device of the mask combiner selected client device subset was selected for generating a secure unmasking data object.

20. A computer program product for privacy-preserving federated learning, the computer program product comprising at least one non-transitory computer-readable storage medium having computer program code stored thereon, wherein the computer program code, in execution with at least one processor, is configured for:

receiving a masked client model set, each masked client model of the masked client model set associated with a client device of a client device set, the client device set identified by a client device identifier set;

selecting an aggregation masked model set from the masked client model set, wherein the aggregation masked model set is associated with a selected device identifier set associated with the client device identifier set;

generating a masked updated global model based on at least the aggregation model set;

transmitting, to a mask combiner system, a selected client model indicator based on at least the selected device identifier set and the aggregation masked model set; and distributing, to the client device, the masked updated global model or an unmasked updated global model generated based on at least the masked updated global model.

* * * * *